United States Patent [19]
Saether

[11] Patent Number: 5,481,699
[45] Date of Patent: Jan. 2, 1996

[54] DURABLE ATOMIC STORAGE UPDATE MANAGER

[75] Inventor: Christian D. Saether, Seattle, Wash.

[73] Assignee: Digital Equipment Corporation, Maynard, Mass.

[21] Appl. No.: 409,508

[22] Filed: Mar. 23, 1995

Related U.S. Application Data

[62] Division of Ser. No. 905,901, Jun. 26, 1992, abandoned.

[51] Int. Cl.$^6$ .......................... G06F 11/00; G06F 11/08; G06F 11/14; G01R 31/28
[52] U.S. Cl. .............. 395/182.13; 395/650; 395/182.18; 395/183.14; 364/265.6; 364/240.8; 364/271.3; 364/282.4; 364/285; 364/285.3
[58] Field of Search ...................... 395/575, 425, 395/600, 650, 700, 725; 371/20.1, 29.1, 32, 7, 10.1; 364/229.41, 230, 240.8, 251.6, 261.3, 265.6, 268.9, 271.3, 282.4, 285, 285.3

[56] References Cited

U.S. PATENT DOCUMENTS

| | | | |
|---|---|---|---|
| 5,008,786 | 4/1991 | Thatte | 364/365.3 |
| 5,201,044 | 4/1993 | Frey, Jr. et al. | 395/575 |
| 5,269,019 | 12/1993 | Peterson et al. | 395/600 |
| 5,276,872 | 1/1994 | Lomet et al. | 395/600 |
| 5,287,501 | 2/1994 | Lomet | 395/600 |
| 5,291,583 | 3/1994 | Bapat | 395/500 |
| 5,297,279 | 3/1994 | Bannon | 395/600 |
| 5,335,343 | 8/1994 | Lampson et al. | 395/575 |
| 5,369,757 | 11/1994 | Spiro et al. | 395/575 |

*Primary Examiner*—Robert W. Beausoliel, Jr.
*Assistant Examiner*—Dieu-Minh Le
*Attorney, Agent, or Firm*—Flehr, Hohbach, Test, Albritton & Herbert

[57] ABSTRACT

According to a first aspect of the invention, a DASUM (Durable Atomic Storage Update Manager) provides an extensible framework assuring complex changes to persistent storage of data within a computer system, including a distributed computer system. During normal runtime, modifications to permanent storage are broken down and organized as a plurality of simpler transactions. These simpler transactions are accomplished atomically by executing associated agents within the computer program under execution. Each agent need only have the ability to complete its own process, and need not be able to deal with side effects from other transactions. Without needing to know what steps may be required, each agent supplies three agent-specific procedures that can be called during recovery from a fault. The DASUM provides seven services that, during normal transaction execution, can store information in a logger necessary for recovery from a fault. The recovery information stored in the logger can be used to replicate a dynamic tree-like fault tolerant update set that is maintained by the DASUM on an atomic basis. According to a second aspect of the invention, the DASUM provides recovery from the effects of incompletely executed transactions in the event of a fault. During fault recovery, the DASUM calls the agent specific procedures, as needed, using the recovery and recovery sequence information stored during normal transaction execution. The present invention advantageously permits separating the agents from the logger, simplifies logger design, and improves durability of the data to be persistently stored.

2 Claims, 28 Drawing Sheets

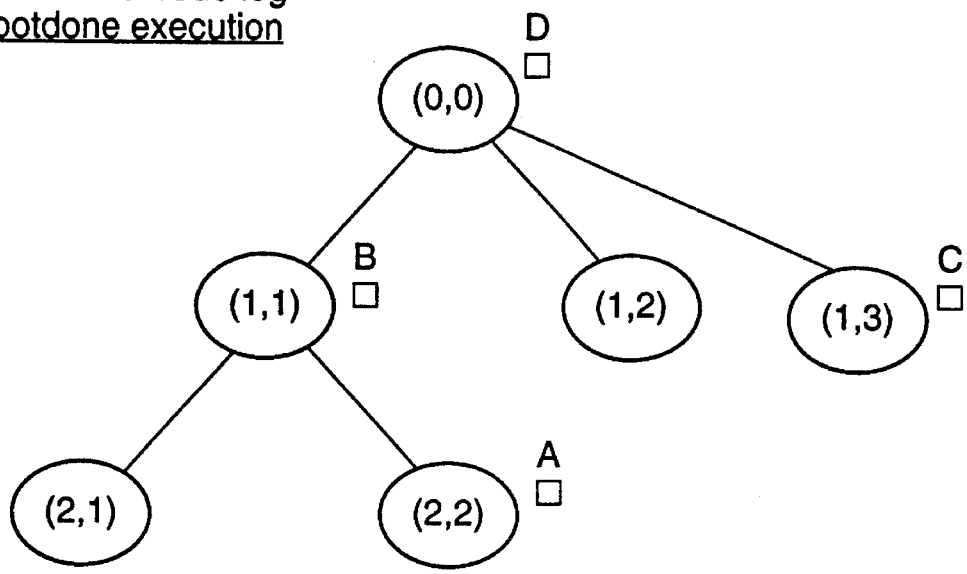

Generation of redo log by rootdone execution subftx 2, 2 specifies rootdone "A"
subftx 1, 1 specifies rootdone "B"
subftx 1, 3 specifies rootdone "C"
subftx 0, 0 specifies rootdone "D"

The sequence of records in the log for this tree:
    (level, member)

Time ↓

(2, 1)
(2, 2)
(1, 1)
(1, 2)
(1, 3)
rootdone  (0, 1)
(0, 2) will contain record redo from execution of "A"
(0, 3) will contain record redo from execution of "B"
(0, 4) will contain record redo from execution of "C"
rootdone  (0, 0) will contain record redo from execution of "D"

*FIGURE 11A*

Generation of redo log by undo execution, ftx-fail.

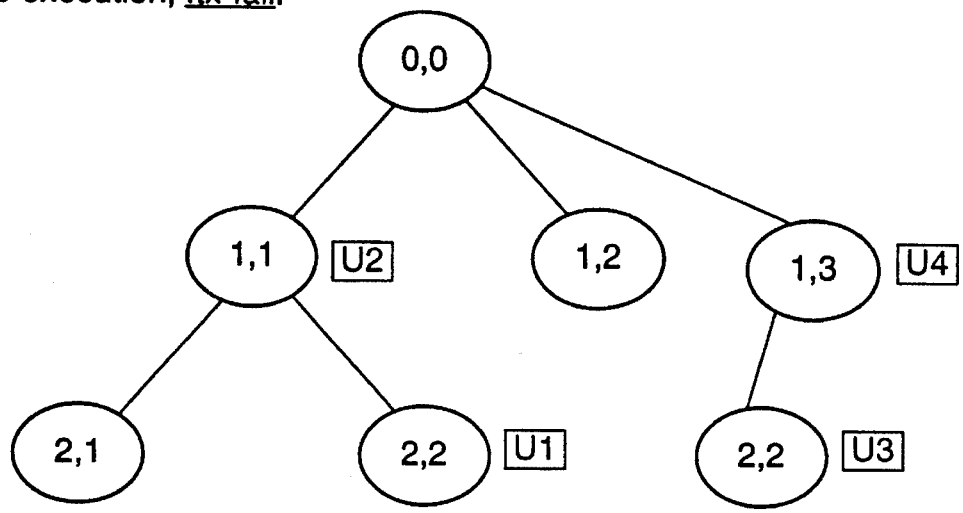

The four subtransactions with labeled boxes specify an undo record on ftx-done.

The sequence of log records written for this tree, up to just before the root is done:

Time 

(2, 1)
(2, 2)
(1, 1)
(1, 2)
(2, 3)
(1, 3)

Now assume that ftx-fail is called instead of ftx-done for the root. The following log records will be written.

(-1, 3) contains record redo from undo "U4" and backlink to (2, 3)
(-2, 3) contains record redo from undo "U3" and backlink to (1, 2)
(-1, 1) contains record redo from undo "U2" and backlink to (2, 2)
(-2, 2) contains record redo from undo "U1" and backlink to (2, 1)
(0, 0) contains nil record to terminate transaction

*FIGURE 11B*

DURABLE ATOMIC STORAGE UPDATE MANAGER

This is a division, of application Ser. No. 07/905,901 filed Jun. 26, 1992, now abandoned.

FIELD OF THE INVENTION

The present invention relates generally to persistent data storage in a digital computer system, and more particularly to a method for ensuring durability of update information required to consistently and persistently store data.

BACKGROUND OF THE INVENTION

Computing systems typically include volatile memory associated with a central processor, and persistent memory such as rotating magnetic disks or tape, for storing data. When the operating system restarts, the contents of volatile memory are lost, but the persistent memory should retain the data stored therein even when the computer system does not operate continuously.

The ability to persistently store data is useless if the data cannot be reliably retrieved at a later time. But even persistently stored data can become irretrievable due to failure in the power source, the physical hardware, or software. Such failures typically result in the loss of data that was intended to be persistently stored.

Successfully processing and managing persistent data in a computing system involves considerations of several issues including the performance of programs that process persistent data, the durability of changes to persistent data, the ability to make atomic updates to complex data structures, and the complexity of persistent data processing programs.

Disk storage devices typically store and retrieve data a vector of fixed-size blocks (e.g., 512 8-bit bytes), where a block is itself a vector of bits. Such disk storage devices are connected to computing systems through an input/output (I/O) adaptor that permits data to be bilaterally transferred between the disk device and the central processor's volatile memory. This reading and writing of disk blocks occurs under control of the central processor. The disk storage devices are addressed through bitfiles, or vectors of uniquely identified bitfile pages, where each bitfile page is a vector of disk blocks. Individual bitfile pages are accessed via a memory cache that is referenced by bitfile page, as opposed to disk block.

Consider how a computer system modifies data permanently stored on a magnetic disk. Since the central processor can only act directly on data within its processor memory, the following steps must occur to modify even a single bit of persistently stored data:

(1) A copy of the data block containing the bit to be modified is read into central processor volatile memory, a step that typically takes about 10 ms to 20 ms;

(2) The central processor modifies the copy of the bit in its volatile memory, this step typically requiring 1 μs or so. At this time, the disk data processing code regards the modification as having been "logically" written to the disk device;

(3) The copy of the disk block in the central processor volatile memory including the now modified bit is written back to the persistent disk storage device. As in step (1), this action will typically take 10 ms to 20 ms.

It is important to realize that until the modified data block is successfully written to the disk device in step (3), the modified bit is not persistently stored. If power failure or hardware or system failure prevents completion of step (3), the modified data will not be persistently stored. Note too that it takes thousands of times longer to persistently modify a single bit than to modify a bit in the central processor's volatile memory. Thus, performance is a major design concern for any program that manipulates persistent storage.

To minimize the slow access time associated with disk data, persistent data processing programs commonly use memory caching. After initially being read from the disk device, the data is cached in the central processor volatile memory for some length of time. Such caching avoids reads from the disk device when the desired data is already in the cache. Also, such caching avoids some writes by first making more than one change to data within a disk block before writing the block back to the disk device (also known as "deferred write-back caching"). Unfortunately the deferred write-back caching technique makes it impossible for an application program to know when changes to disk data are in fact persistently stored on disk.

Although of extreme importance, the durability of persistent data can be diminished by hardware failure and by the presence of deferred write-back caching.

A hardware failure (e.g., damage to the magnetic media) can prevent the disk device itself from successfully reading stored data, effectively rendering the stored data irretrievable. Often data stored on one disk device will be associated with data stored on a second disk device. The inability to access a single portion of stored data (for whatever reason) may prevent logical access to the remaining data, even though such data remains physically available on its storage device. The dependency of persistent data durability upon hardware reliability can be improved by replicating the data on several storage devices. In this manner, the probability of simultaneously losing all replicates of the data is very low, and durability is enhanced. "Shadowing" (or "mirroring") is a straightforward replication technique several disk devices are configured as exact replicas of each other. Thus, each disk block is stored in the same location, and in exactly the same format, on each disk device. Logging is a more complex form of replication, wherein a copy of modified disk data is written to a separate log file. The log file data is used in restoring disk data that cannot be retrieved from its normal disk device. The log may store an exact copy of changed disk data ("physical logging"), or may store information from which the disk data can be regenerated ("operation logging").

Durability can also be diminished through the use of write-back caching because a current copy of modified disk data exists only in volatile central processor memory until written to the disk device. A hardware or software fault abnormally shutting down the operating system at this time typically erases the memory cache contents. This erasure occurs even though the disk data processing code regards the modified data has having been logically written to the disk device. Logging can help solve the durability problem of write-back caching while retaining most of its performance benefits. Modifications to data in the buffer cache are logged so that the modifications can be restored if the modified buffer contents are lost before writing to disk. Another solution to improving durability is, of course, to not to use such caching. Alternatively "careful writing" or "write through" caching techniques can be used, wherein algorithms wait at certain steps until persistent storage changes are completely written from central processor volatile memory to the disk storage device. However such programs cannot be used with deferred write-back caching, and cannot benefit from the time-performance gains that write-back caching provides.

While durability of modifications to persistent data can be enhanced by replication, the recovery of data from the replica when a fault occurs can be more complicated. Data recovery is relatively straightforward when shadowing is used because an exact duplicate of the data is already available. But data recover from a log file is more complex and highly dependent on the particular logging technique used. Applications essentially must be custom designed to use logging techniques. Data recovery using a careful writing technique is simpler, but is limited to a small class of persistent data structure designs.

In addition to performance and durability considerations, the processing and management of persistent data must take into account the "atomicity" of persistent data updates. "Atomicity" refers to the "all or none" manner in which disk storage devices write the data contained in a disk block. This necessity to write all of the data to disk or to write none of it ensures that different fields in a data structure within a block can be modified consistently in a single action. By "consistently" it is meant that the modified data in volatile storage will coincide with the modified data as actually stored in persistent memory.

Atomicity is especially important where persistently stored data is modified or updated in a multi-step fashion often in different system locations, as required by a user program, for example. Consider for example, the steps required for the creation of a new file on persistent storage:

(1) A file creating program initially calls a first function that creates a directory in persistent storage;

(2) The file creating program then calls a second function that creates a name in the file directory portion of persistent storage;

(3) The file creating program then calls a third function that allocates storage space in persistent storage for the named new file.

Updates to the directory creating, file name creating and storage allocation creating mechanisms must be linked together according to the file creating system's data structure. All changes resulting from the multi-step process must be made together, or not at all. Conventionally, higher level functions in a user program manage and control any side effects of lower level functions involving modification or updating of persistent storage. This supervisory ability must be operative even if an error or fault occurs during a multi-step, multiple storage location modification or update. Thus, during modification or storage of data in persistent storage, including multi-step, multiple location changes, there is an interrelationship between the various functions that complicates the design of the functions. In addition, user programs involving modification or updating of persistent storage often have functions dealing directly with the log file (e.g., log writing and log trimming, or purging log file data when it is no longer needed). The necessity to directly deal with a log file further complicates the design of the user program functions. A complex system structure that can successfully manage multi-step updates involving multiple locations may be decomposed into a number of sub-functions, or "agents", that know how to manage certain types of transactions required for the overall procedure. Alternatively, and less desirably, each top level function in the system must have imbedded therein knowledge of all possible changes and side effects.

The ability to atomically update a persistent data structure can create a problem when the data structure extends beyond a single disk block. In such instance, it is possible that not all disk blocks involved in a single update will actually be written. Where singly linked lists are involved, the persistent data structures may be designed so only a single atomic write is needed to logically change the state of the data structure. A logging technique can also achieve the same result in that an atomic write of a log record determines whether a given set of changes logically occurs or not.

Not surprisingly, persistent data processing programs that provide good performance, durability and the ability to make atomic updates can readily become overly complex, especially when the persistent data structures they manage become large and complex. Traditionally such programs must deal with recovery from system and storage faults in a program specific manner. Frequently the mechanisms available to solve different problems are not integrated with each other. For example, certain logging techniques must be coordinated with the writing of modified data from the buffer cache, such as the write-ahead logging protocol. Unfortunately, the inability to control the operating system buffer cache means the data processing program must forego those benefits, or implement its own buffer cache, thus adding complexity to the solution.

One method of reducing complexity is to subdivide large programs into smaller functions that implement only a part of the overall system. However an appropriate mechanism is necessary for these independently specified parts to work together to implement a complex function with the desired atomicity, durability and performance characteristics. Distributed transaction processing models address some of these considerations by describing how independently specified systems can be used to implement complex functions atomically and durably. However, such models have complicated interfaces that require significant central processor time for implementation. Further, many persistent storage processing details, such as buffer management and fault recovery, are typically beyond the scope of the transaction management mechanisms providing the framework for the entire system. Known transaction processing systems that provide a useful conceptual structure and mechanisms addressing the above-described factors are typically complex to use and demand significant additional processing overhead, making them inappropriate for a large class of persistent storage processing systems.

In summary, there is a need for a method of providing a simple, efficient and high performance mechanism to make complex changes to the persistent storage of data within a computer system. Such method should permit data changes to persist durably, despite hardware and software faults, and should not impose significant overhead penalties in its implementation. The present invention provides such a method.

SUMMARY OF THE INVENTION

The present invention provides a general mechanism allowing a computer system to reliably store, access, and modify data intended to be persistently stored. In the event an error occurs before modified data can be written to permanent storage, the present invention provides durable and consistent update of the data that was intended to be persistently stored. The present invention permits complete recovery of even significantly complex persistent storage data, despite such failure.

There are two aspects to the present invention: (a) a real time execution that, during normal run time, generates a log containing certain information that is useful in the event of a fault during storage to persistent memory, and (b) a method of using such logged information to recover from a fault during storage to persistent memory.

A straightforward extensible framework is provided that allows a persistent storage management system to be readily decomposed into simple operations. Each such operation implements a set of primitives that are associated with each read or write modification to data in permanent storage. These primitives are organized to perform complex persistent storage updates and are reconstructed, if and as needed, to recover the data intended to be permanently stored.

A logger is provided for maintaining recovery information. This record of the volatile memory contents before and after modification permits comparison with the contents of the persistent memory. If a discrepancy exists between what was intended to be written to persistent memory and what actually resides therein, then a fault has occurred.

According to the second aspect of the present invention, when a fault occurs corrective procedures are invoked that either complete the data transfer to persistent storage, or roll the transfer process back to a most recent durably stored state. Because the behavior of the primitives is relatively simple to define, the durability, consistency and reliability of the updated data structure is increased as a whole.

Preferably each primitive is treated as a "transaction", and each primitive can create subtransaction actions. Each transaction preferably is accomplished by a single "agent", where an agent typically is a component (e.g., a function) within a larger software system, such as the application program being executed, or the operating system. Thus, in the first aspect of the invention, a software system may be considered to be the aggregation of many agents.

During a transaction, an agent implements each primitive atomically in a single all-or-nothing action. The present invention organizes agents to accomplish transactions consistently and durably using a durable atomic storage update manager (or "DASUM"). The DASUM mechanism permits transactions and related arbitrary agents to make durable updates to persistent storage as part of a fault tolerant update set ("FTX").

In the event of a fault, according to the second aspect of the invention, the FTX uses recovery information provided by the logger to establish a sequence for repeating the primitives, whereby the modified data will be written to persistent storage. In the presently preferred embodiment, two recovery sequence passes are made.

To avoid serialization with resultant I/O blockage, the FTX is preferably implemented as a single-thread sequence. When a high level parent transaction generates a lower level child transaction, the single-thread FTX becomes a multi-level, tree-like structure. The DASUM implements this structure by providing data that tracks the organization of the transactions and related agents involved. These data can be denoted ftxTree and ftxAgent respectively. Because an individual FTX structure is executed by a single thread, no serialization is required when a child transaction is started. This single thread implementation provides a simple design that ensures concurrence.

The fault tolerant update set, or FTX, typically is a multi-node, multi-level tree-like structure, whose entire structure is created atomically and dynamically. Within a given FTX, the transactions and related agents preferably are created in preorder during normal runtime execution, and completed in postorder during a fault recovery operation. When required by a fault condition, DASUM will rollback (or undo) subparts of an incomplete FTX. However if the FTX was completed, the aggregate system of agents will reconstruct (or redo) the structure in the event of a failure, by calling the ftx_recovery service. Thus the DASUM can backout of a partially completed storage, and in essence rollback side effects that would otherwise remain from a partially stored record.

Without having to know how these structures will be manipulated, each agent supplies three agent-specific procedures (ftx_redo, ftx_undo, and ftx_rootdone) that are present in the application program being executed. Further, the DASUM preferably provides seven standardized services that can be called by the agents. One such service ("ftx_start") establishes a sequential relationship between transactions within the FTX structure. Another service (ftx_done) writes information into the logger that may be necessary to enable recovery, if needed, and provides parameters necessary for the ftx_redo, ftx_undo and ftx_rootdone procedures that may be invoked during data recovery. A seventh service (ftx_recovery) is called by the aggreate system for use during recovery from a system fault condition to reverse or rollback any transaction not durably stored. For example, ftx_recovery may be called after a fault condition upon system reinitialization, such as a system boot. This ftx_recovery service can in turn call an ftx_fail service, which ftx_fail service can also be called directly by an agent for an agent fault condition.

The present invention is fully distributed in the sense that it can be implemented on a computer system that has components in separate locations, or even in separate continents. It should be appreciated that a design structure methodology according to the present invention provides an essentially generic procedure that, during real-time, establishes a durable record of information that may be needed in the event of a fault to reconstruct or roll-back data to be persistently stored. By contrast, in the prior art, the application under execution is required to have the ability to know how to coordinate update information, to know what is written into to the log, and to know how to use the logged information to recover from a fault.

In the present invention, when an error prevents data modifications from being correctly written to persistent storage, the DASUM will call one or more of the three agent-specific procedures (ftx_redo, ftx_undo, ftx_rootdone) to recover the resultant fault transactions. Which of these procedures are used will depend upon the type of failure. The recovery procedures use the recovery information stored during normal run time execution in the logger, as well as the stored parameters available from the ftx_done service. These procedures are invoked and run essentially transparently to the computer system user and to the application program itself.

The resultant file management system processes multi-level transactions without imposing specific concurrence control mechanisms. By providing the above standardized services, the present invention permits the agents to be separated from the logger. This separation is advantageous because the resultant logger is easily designed since it need not be dedicated to various agents. In essence, the DASUM can process multi-level transactions without imposing specific concurrency control mechanisms on the agents involved. Instead, the agents are allowed to implement the necessary concurrence control themselves. Further, according to the present invention each agent is independent from other agents.

The seven DASUM services will now be briefly described. To open a transaction, an agent calls the ftx_start service to create a new node in the tree-like fault tolerant update set ("FTX"). Before making modification, the agent calls an rbf_pinpg service to "pin" the bitfile page, thus preventing the page from being written back to disk storage, and to specify the bitfile pages to be written into the log. The pinned condition remains until the transaction is either "done" or "failed" (for whatever reason). Preferably the agent also calls a rbf_pin_record service to pin the record in the bitfile page before any change can be recorded to the bitfile page. The rbf_pinpg service and the rbf_pin_record service are important aspects of the present invention and specify how the durably stored updates to the storage pages are to be made. Although the present invention could function absent the rbf_pin_record service, this service permits logging less than all information within the rbf_pinpg service, thus reducing the size of the logger that is needed.

An agent might not know whether a page in persistent storage should be modified until after the page has been examined. Thus the multi-level tree-like structure used in the present invention permits the rbf_deref_page service to release resources acquired during a transaction without waiting for the entire transaction to commit (i.e., to properly write to persistent storage). For example, if no modification is to be made to a page, rbf_deref_page can release the pinned page in a child transaction and terminate the otherwise open FTX transaction, even though a higher level parent transaction is not yet complete. It is significant to note that in the present invention, after a bitfile page is released, it will not affect the logger.

The fifth service ftx_done is called after the transaction and its children (if any) is complete, to release pinned pages and terminate the FTX transaction. This service also provides information to the log, and all necessary parameters for the three available procedures, ftx_redo, ftx_undo and ftx_rootdone. Preferably information logged by ftx_done for child transactions is not stably logged to persistent storage until the root parent transaction is complete, thereby eliminating a potential source of I/O blocking.

A sixth service ftx_fail is called by an agent during a transaction that cannot proceed for whatever reason, e.g., perhaps an access check denies permission to proceed. This service releases pinned pages, reverses the effect of completed child transactions, and terminates an FTX transaction.

The seventh service, ftx_recovery, has already been described. This service is called by the aggregate system for use during recovery to reconstruct any complete transaction (FTX), and to reverse or roll-back any incomplete transaction not durably stored. Preferably during recovery from a fault, two passes are made through the logged recovery data structure, although fewer or more passes could instead be used.

To recapitulate, the disclosed design structure methodology assures durable data reconstructions by decomposing a complex storage management system into simple operations that are atomically completed or not completed at all, according to the first aspect of the invention. By providing a single-thread multi-level fault tolerant update structure, the present invention simplifies concurrency control by allowing the agents to govern themselves. This in turn eliminates the input/output blocking that is characteristic of many prior art fault tolerant update systems. The present invention operates without requiring the application program under execution to coordinate or oversee or even know how the various procedures described herein are implemented or used.

By preferably isolating the logging function from the application-specific agents, which agents are independent from each other, the present invention permits a straightforward logger implementation, without having to dedicate a custom designed logging function for each agent. Information contained within the logger may never be used, but according to the second aspect of the invention, the effects of a fault are either cured or rolled-back using such logged information. The present invention advantageously is fully distributed in the sense that it can function with a computing system having components that are widely separated from one another.

Other features and advantages of the invention will appear from the following description in which the preferred embodiments have been set forth in detail in conjunction with the accompanying figures.

BRIEF DESCRIPTION OF THE DRAWINGS

FIG. 11A depicts redo log generation resulting from ftx_rootdone execution, according to the present invention;

FIG. 11B depicts redo log generation resulting from ftx_fail and ftx_undo execution, according to the present invention;

DETAILED DESCRIPTION OF THE PREFERRED EMBODIMENT

General Overview

Figure 1:
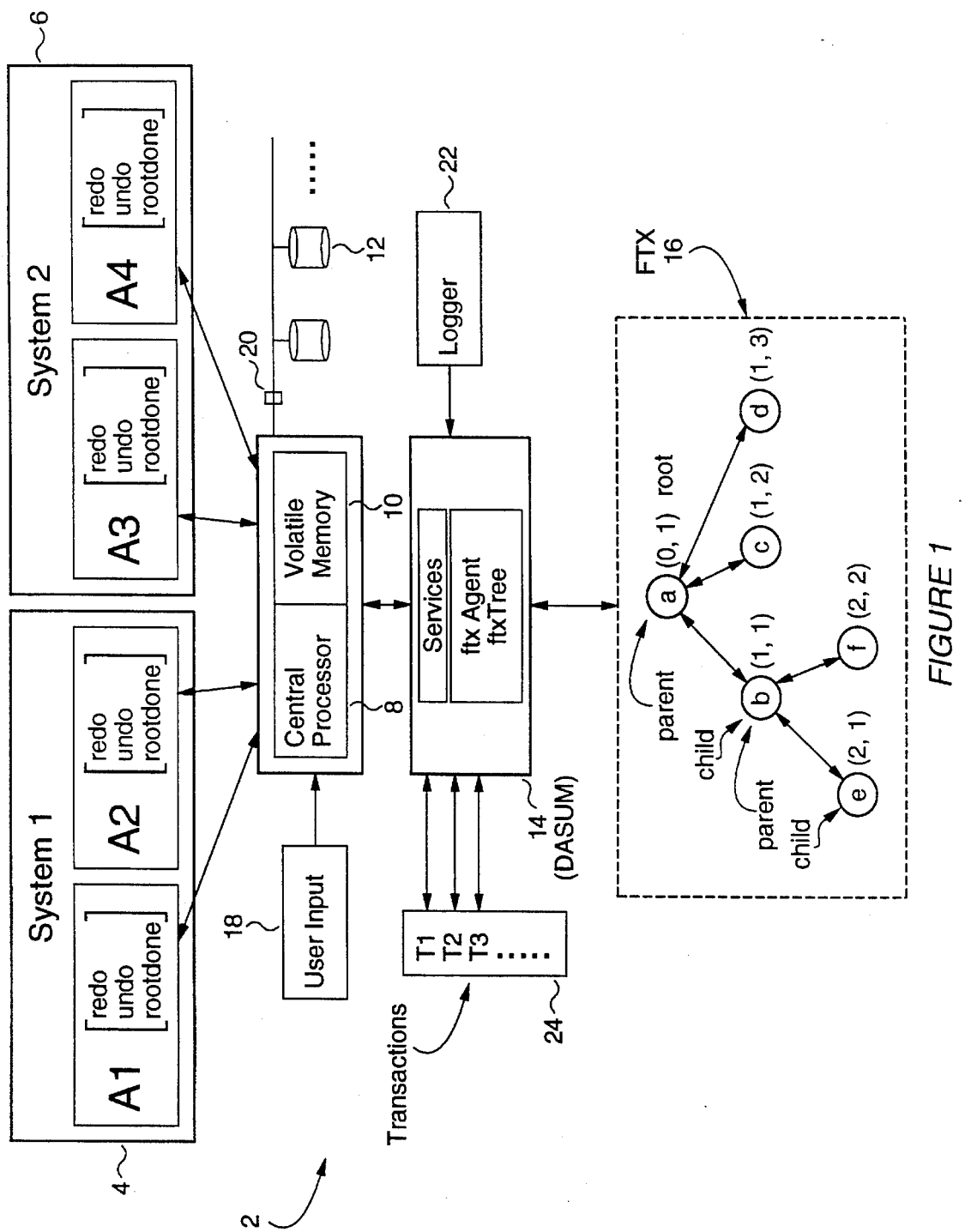
FIG. 1 depicts a generalized computing system that includes a DASUM according to the present invention.

FIG. 1 depicts a generalized computing system 2 as including one or more software sub-systems 4, 6, a central processor 8, volatile central processor memory 10, and one or more persistent storage devices 12. Software sub-systems 4, 6 may for example include the operating system for the computing system 2. The present invention, a durable atomic structure update manager or DASUM 14 is depicted as being in data communication with the volatile memory 10 and the persistent storage devices 12.

As shown generally by reference element 18, a user (or indeed an executing application program) might modify data in the central processor volatile memory 10, which modified data, shown as element 20, is then written into persistent storage 12. As soon as the data 20 is modified and/or read from the volatile memory 10, the relevant software sub-system 4 or 6 considers the data as having been logically written to persistent storage 12. But a system failure (e.g., power supply failure) or hardware or software failure might in fact prevent data 20 from being written to persistent storage 12.

In the first aspect of the present invention, during normal run time execution, it is the function of the DASUM 14 to ensure durability of update information. This aspect is preferably implemented by organizing data modifying activities into a multi-level tree-like structure, referred to herein as a fault tolerant update set ("FTX") 16. Information provided by FTX 16 is required to consistently and persistently store data 20 in persistent storage 12, according to the present invention. It must be emphasized that FTX 16 may in fact have considerably more nodes and levels than was is generically depicted in FIG. 1. The DASUM 14 provides an extensible framework allowing data modification 20 (even complex modifications) to be readily decomposed into simple, independent primitives that are associated with each read or write modification to data in persistent storage 12. The tree-like FTX structure 16 represents this extensible framework.

A logger 22 communicates with the DASUM 14, providing information necessary to recover a data modification 20 that was not written to persistent storage 12 due to a system, hardware or software fault. Preferably logger 22 is a persistent storage device, and may in fact be included within a device 12. Such recover procedures comprise the second aspect of the present invention. As depicted in FIG. 1, the logger 22 is separated from the agents $A_i$, and communicates solely with the DASUM 14. This feature greatly simplifies the design implementation of the logger 22, allowing a unified logger design to work with many different types of agents.

Preferably each read or write to or from central processor volatile memory 10 is treated as a "transaction" indicated as $T_i$, (e.g., $T_1$, $T_2$, etc. Each transaction is accomplished by a single "agent" indicated as $A_i$ (e.g., $A_1$ through $A_4$ in FIG. 1). Typically an agent $A_i$ is a component within a larger software system, such as the operating system or application program being executed. FIG. 1 depicts two software systems 4, 6, each having two agents, respectively agents $A_1$, $A_2$ and $A_3$, $A_4$, although either system could have more or fewer than two agents, and fewer or more than two systems could be present. FIG. 1 also depicts conceptually, a series of read/writes as represented by a series of transactions 24 (e.g., $T_1$, $T_2$, $T_3$, . . . ).

During a transaction T, an agent $A_i$ implements a primitive all-or-nothing atomic action, with multiple transactions calling for many agents. However since each agent is a variable, multiple transactions could in fact use the same agent. The DASUM 14 organizes the various agents to accomplish transactions consistently and durably. The DASUM further permits arbitrary agents to make durable updates to persistent storage as part of a fault tolerant update set ("FTX"), preferably a multi-level, single-thread tree-like structure, such as that shown by element 16 in FIG. 1.

According to the present invention, a single agent A is responsible for each FTX root or child transaction (to be explained). A multi-level tree-like FTX structure avoids serialization and the blocking of input/output ("I/O") functions that is prevalent in the prior art. Because the FTX tree-like structure 16 is executed by a single thread, no serialization is required when a child transaction is started. This single thread implementation provides a simple design that ensures concurrence. Within a given tree, the FTXs preferably are created in preorder and recovered in postorder, with each node bearing a unique node identification number. Other procedures could, however, be used instead.

Before describing the DASUM 14 in detail, the nomenclature associated with a typical FTX structure 16 as shown in FIG. 1 will be defined. Typically an FTX structure 16 is composed of a plurality of nodes, six nodes (a, b, c, d, e, and f) being present in the structure of FIG. 1. The connection line between any two nodes defines the relationship therebetween. The node at higher level is referred to as a "parent", and the node at lower level is referred to as a "child". For example, in FTX 16, node b is the parent of node e, but node b is also a child of node a. Nodes at a common level are referred to as "siblings", and the order of the siblings can be defined in terms of their position from left to right. For example, nodes b, c, and d at the first level are siblings, and are respectively first, second and third order siblings. The node at highest level of an FTX tree is referred to as a "root" (e.g., node a), and a childless node is referred to as a "leaf" (e.g., nodes c, d, e, and f). By definition the root has no parent.

Within an FTX structure, the root node is assigned a globally unique identifier when it is created, and a node at a given level is assigned a member number upon its creation. Thus, the globally unique identifier and the level and member number provide a unique identity for each node in the FTX structure. Node a for example is identified as (0, 1) and represents the first node at the uppermost (0th) level. Node b (1,1) is the first node at the first level, node c (1,2) is the second node at the first level, and so on. Each node within the FTX structure represents a transaction, with lower level transactions (or subtransactions) being generated by higher level transactions. A leaf node (e.g., a childless node) thus generates no further transactions.

In the present invention, a single agent A implements a transaction, and thus each root, node or child in an FTX structure associates with an individual agent. Because child transactions are invoked by their parent transactions, and because transactions can further invoke transactions, a multi-level single-thread FTX structure such as structure 16 is developed during implementation of the transactions. The nature of the transaction of a parent node will determine which agent $A_i$ will associate with a specific child node within the FTX structure. In reality, the FTX structure represents a sequence that defines the implementation of the occurring transactions, and further represents a specification of the order for the participating agents. In a preferred embodiment, the transactions and associated agents within an FTX tree are created in preorder (e.g., higher numbered nodes within a level are to the left) and recovered in postorder (e.g., higher numbered nodes within a level are to the right).

The generalized FTX structure 16 may be considered in several contexts. For example, an agent $A_i$ associated with a transaction $T_1$ might create node a in FIG. 1. If no child or subtransaction was involved, the FTX 16 would consist only of node a. Assume however that node a is associated with an agent $A_1$ as a result of transaction $T_1$, and that transaction $T_1$ causes subtransactions to be created. In this instance, node b might be associated with an agent $A_2$ and subtransaction $T_2$, node c could be associated with an agent $A_3$ and subtransaction $T_3$, and node d could be associated with an agent $A_4$ and subtransaction $T_4$. (There is, of course, no requirement that the agent associated with a transaction $T_x$ be denoted agent $A_x$; this one-to-one nomenclature is adopted simply for ease of understanding.)

On the other hand, node a might in fact be a null mode, meaning that it is not associated with any transaction. In this case, transactions b ($T_1$), c ($T_2$) and d ($T_3$) could be implemented by agents $A_1$, $A_2$ and $A_3$ respectively, resulting in nodes b, c, d. Transactions $T_1$, $T_2$ and $T_3$ would be first level children siblings. With further reference to FIG. 1, the transaction $T_1$ might be considered to create two further transactions represented as children sibling nodes e and f. In this scenario, transactions $T_2$ and $T_3$ are shown as creating no further transactions.

An important aspect of the present invention is the decomposition of data modification activities into simple primitives. The DASUM 14 achieves this decomposition by defining a series of transactions $T_i$ and associated agents $A_i$ into a fault tolerant update set, as shown by FTX 16. Preferably the FTX 16 is a multi-level, single-thread model, which implementation avoids serialization and the necessity to implement blocking mechanisms. In the FTX 16, preferably each agent need only have the ability to complete its own process. In contrast to the prior art, agents in the present invention need not have the ability to deal with side effects resulting from other functions (e.g., from other agents' activities). This simplifies the design of systems 1 and systems 2 in FIG. 1.

The DASUM 14 functions as a transaction manager to organize the transactions (e.g., the primitive storage updates) to durably update persistent storage. Such updating reliably occurs despite any significant complexity in the update data, and the DASUM also ensures durability, e.g., the ability to completely recover from system and media failures. The transactions $T_i$ are implemented by agents $A_i$ through standardized calling services provided by the DASUM mechanism.

The services provided by DASUM, and the system procedures used by DASUM to decompose and durably reconstruct data to be persistently stored will be described fully. The present invention uses seven DASUM standardized services (ftx_start, rbf_pinpg, rbf_pin_record, rbf_deref_page, ftx_done, ftx_fail and ftx_recovery), and three agent-specific procedures (ftx_rootdone, ftx_redo, and ftx_undo) to ensure durability of update information to consistently and persistently store data.

Overview of Preferred Data Structures

In the preferred embodiment of the invention, two primary data structures are established by the DASUM to track transaction processing and to reserve necessary parameters. An on-disk log record (ftxLog) structure and an in-memory fault tolerant update FTX (ftxTree) structure.

Briefly, an ftxLog record is persistently written by the logger for each subtransaction. The ftxLog record contains appropriate information to either reconstruct or roll-back the effects of that subtransaction, in conjunction with the apprpriate agent's ftx_redo, ftx_undo and ftx_rootdone procedures, as necessary, in the event of a failure. The ftxLog and ftxTree structures will be described later in greater detail in conjunction with FIG. 5 and FIG. 6, respectively.

Each FTX agent is described by the ftxAgent structure, which contains a unique identifier (ID) for the agent, and parameters for the agent (e.g., the agent's operation routine address associated with the procedures ftx_redo, ftx_undo, and ftx_rootdone) needed when the agent calls the three procedures used by DASUM. These parameters are preferably be organized into a simple global array, ftxAgent, indexed by the agent ID.

Although the preferred embodiment requires no pre-registration, the ftxAgent structure can be setup to require initialization with agent pre-registration with DASUM. In such alternative embodiment, an agent involved in modification to bitfile pages must first register with the DASUM mechanism before using the DASUM services. But if no modification to the bitfile pages in involved, an agent can call DASUM services without preregistration. (In some circumstances an FTX might be started simply to establish a parent FTX transaction, with the agent calling upon the DASUM services to create a child subtransaction under the parent.)

An FTX tree is described by the ftxTree structure which contains the parameters for a root transaction and all of the child transactions. The ftxTree structure preferably contains parameters including the globally unique transaction identifier for the transaction, links indicating the position within the FTX tree for the root and child transactions, the current member number for a given child transaction level, a table of currently pinned pages for each child transaction level, and a table of pinned record extents for each pinned page.

It will be appreciated that the construction of the ftxTree, ftxLog and ftxAgent structures are a dynamic process that occurs in normal run time execution, during implementation of the root and any subtransactions. Each time an agent invokes the ftx_start service, the service adds the agent and its associated transaction to the FTX structure. Information memorializing the sequence of transactions comprising the FTX structure may be held in both main memory and persistent data storage in ftxLog records. The entire FTX structure is completed atomically or not at all. Either all transactions in the FTX structure are completed, or no transaction in the FTX tree is completed. If an error or fault occurs within a transaction in the FTX structure, according to the second aspect of the present invention the DASUM can reverse the effects of the transactions comprising the FTX structure.

An Overview of the DASUM Operation

By way of general overview to the DASUM operation, FIGS. 2A–2C and FIG. 3 will now be described with reference to the generic FTC structure 16 depicted in FIG. 1.

Figure 2A:
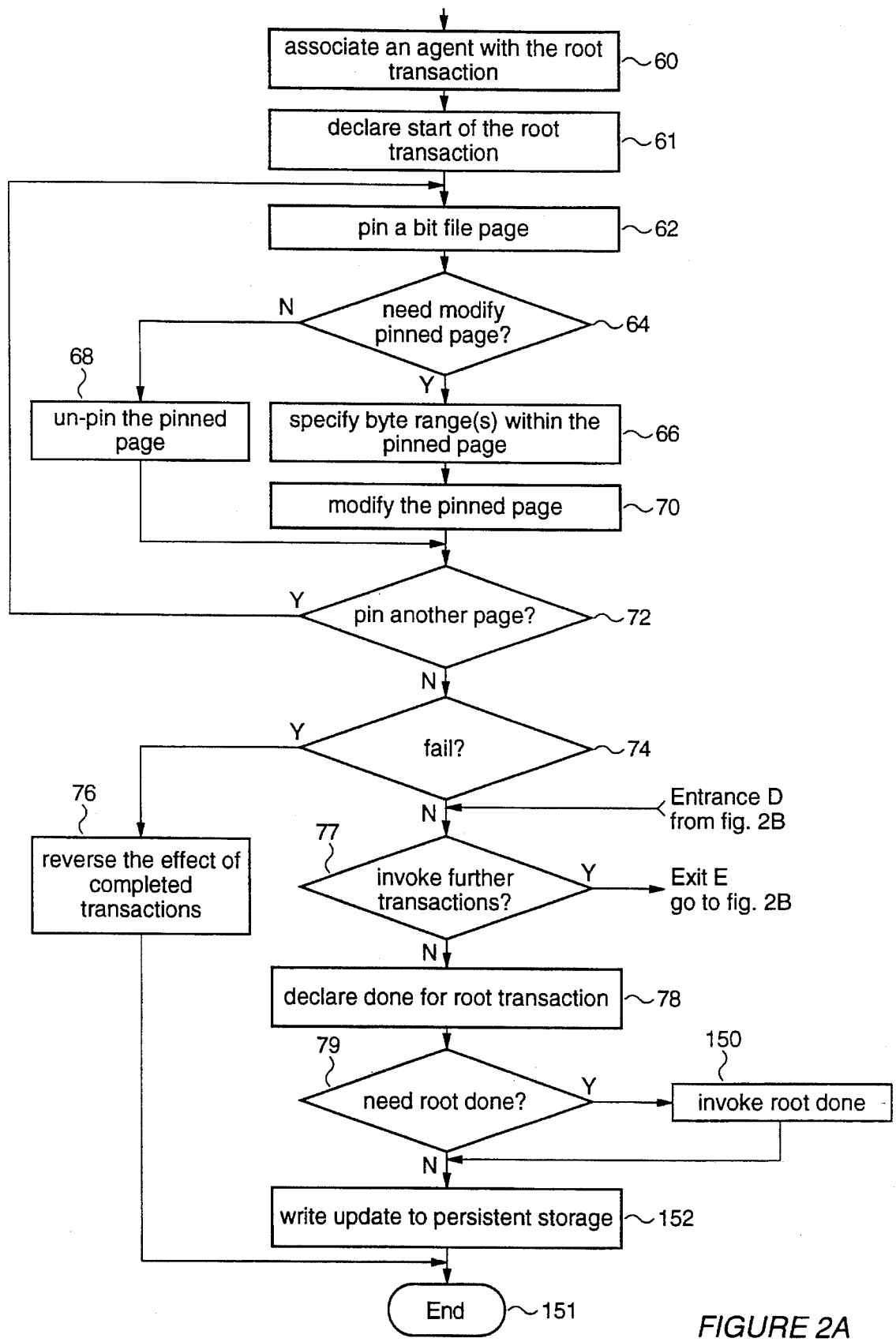
FIGS. 2A, 2B and 2C are a flow chart representation of the functional relationship between transactions, agents, DASUM functions and system procedures used by DASUM, according to the present invention.

As shown in FIG. 2A, step 60, the DASUM 14 associates an agent (e.g., $A_i$) with the root transaction (e.g., $T_1$) represented by the node a (0,1) in the generic FTX 16 depicted in FIG. 1. (This (0,1) node level is depicted at the left side of FIG. 3.) Proceeding downward in FIG. 2A, the associated agent calls the ftx_start service to declare the start of the root transaction, step 61.

In step 62, the agent calls rbf_pinpg service to pin the relevant bitfile page for the root transaction. Step 64 tests whether data modification is needed for the pinned bitfile page. If data modification is needed, the agent calls the rbf_pin_record service to specify the relevant byte range(s) within the page that is pinned in step 62. Next, at step 70, the data modifications are made to the pinned page.

At this stage in the present invention, it should be noted that it is the combination of the rbf_pinpg service and the rbf_pin_record service that specifies the value of the pinned bitfile page to be written into the logger. As noted, while the present invention would function with the rbf_pinpg service alone, the additional present of the pin_record service reduces the storage requirements for the logger 22. It is the ftx_done service that writes the specified bitfile pages into the logger for the related transaction (e.g., the transaction whose associated agent invoked ftx_done service). If no data modification is required, the agent calls rbf_deref_page service to release the pinned bitfile page. A pinned page that is released by the rbf_deref_page service preferably is not written into the logger, and thus has no effect on the logger. Step 72 tests whether to the root transaction needs to pin another bitfile page. If so, the DASUM returns to step 62 and the process from step 62 to step 72 is repeated. In this fashion, the root transaction is able to pin as many bitfile pages as required.

After completing all necessary modifications to the pinned bitfile page(s) for the root transaction, it is necessary to test whether the modifications have indeed been properly completed, which determination is made by step 74. Step 74 tests whether the desired modification is permissible, and if not, the effect of the modification should be reversed. For example, if a user attempted to alter system memory, such modification would be deemed improper, and the effect of the modification would be reversed. Reversal, in effect, would restore the system to the status quo before the improper modification was attempted. If proper completion of the modification is not present, the root transaction is "failed". If the determination at step 74 is to fail the root transaction, the agent calls the ftx_fail service to reverse all effects from the root transaction (see step 76). The operation is then terminated.

If the determination at step 74 is not to fail the root transaction, step 77 next tests whether the root transaction invokes a child transaction. If none, the agent calls the ftx_done service, which declares at step 78 that the root transaction is "done". (Note, however, that the FTX 16 depicted in FIG. 1 shows three child transactions (1,1), (1,2) and (1,3).) In the process of declaring the root transaction done, the ftx_done service writes the bitfile page(s) specified by the rbf_pinpg service and by the rbf_pin_record service into the logger, e.g., logger 22 on FIG. 1, and releases the pinned bitfile page(s). The present invention does not require a specialized logger design, and because conventional logger design is known to those skilled in the art, logger 22 will not be described in detail.

The ftx_done service provides three kinds of recovery records: (1) value logger information, supplied to the logger, for use by the undo procedures within the ftx_fail service; (2) operation logger information, supplied to the logger, for use by the redo procedure within the ftx_recovery service; and (3) link record information, supplied to the logger, for use by the rootdone procedure. As noted, the pinned pages released by the rbf_deref_page service are preferably not written to the logger. The ftx_done service also commits the modification(s) of the transaction, and releases all pinned pages for the root transaction. After commitment, the effects of a transaction are recoverable for certain types of failures, for example, system failures due to power failure.

At step 150, the DASUM invokes the ftx_rootdone procedure as needed. At step 152, update data (e.g., the ftxLog records) are written to the persistent data storage and the operation is terminated. At this stage, the transaction represented by the root node is durably and persistently stored upon device 12 (see FIG. 1).

Figure 2B:
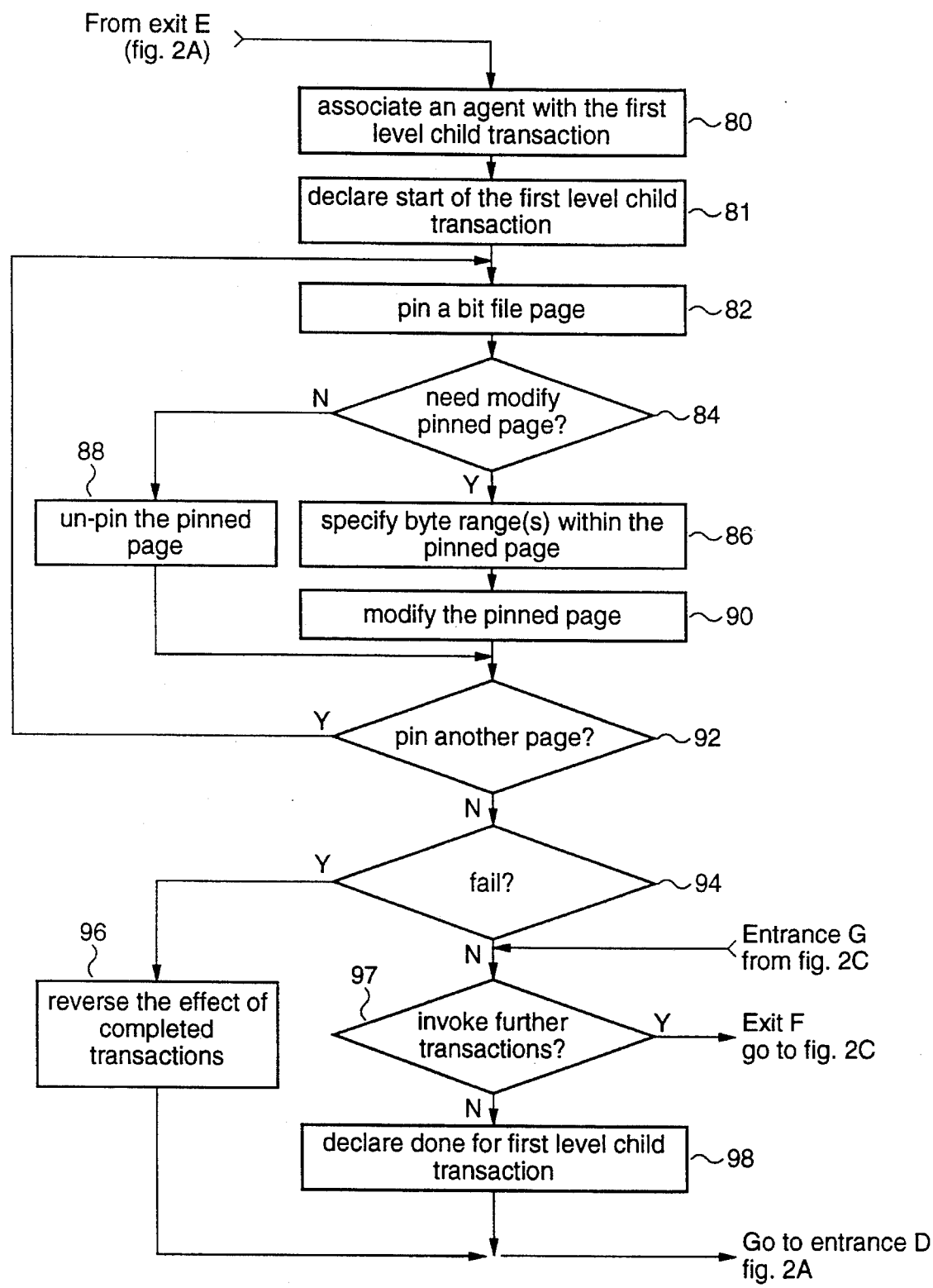

If step 77 determines that the root transaction invokes one or more further transactions, the present invention preferably branches the operation to FIG. 2B ("Exit E"), for processing of a first level child transaction. However, the operation will return to step 77 in FIG. 2A ("Entrance D") as each first level child transaction is completed. Thus, ultimately the operation returns to step 78 and will terminate at "END" 151, depicted at the lower portion of FIG. 2A. In the FTX 16 depicted in FIG. 1, there are indeed further transactions to be invoked at step 77. A first such further transaction is represented by node b (1,1) and is depicted at FTX level 1 on FIG. 3. Accordingly in this example, the DASUM operation proceeds from step 77 via "EXIT E" to FIG. 2B.

In FIG. 2B, the DASUM at step 80 associates an agent (e.g. A_2) with the first level child transaction represented by node b (1, 1). In step 81, this associated agent calls the ftx_start service to declare the start of the first level child transaction. In step 82 the agent calls the rbf_pinpg service to pin the relevant bitfile page for the first level child transaction. Step 84 tests whether data modification is needed for the relevant pinned bitfile page. If data modification is needed, the agent calls the rbf_pin_record service to specify the relevant byte range(s) within the pinned page in step 86. Next, step 90 makes data modifications for the first level child transaction.

If no data modification is needed, the agent calls the rbf_deref_page service to release the pinned bitfile page at step 88. Step 92 tests whether the first level child transaction needs to pin another bitfile page. If so, the DASUM procedure returns to step 82, and the process from step 82 to step 92 is repeated. Thus, a first level child transaction may involve pinning more than one bitfile page.

After making all necessary modifications on the bitfile page(s) for the first level child transaction represented by node b (1, 1), step 94 tests whether to fail the first level transaction. If the determination at step 94 is to fail the first level child transaction, the agent at step 96 calls ftx_fail service. The ftx_fail service then reverses all effects by the first level child transaction and returns the DASUM operation to Entrance D in FIG. 2A.

If the determination at step 94 is not to fail the first level child transaction, step 97 next tests whether the first level child transaction invokes any further child transaction. If step 77 determined there were no further transactions (again, unlike what is depicted in the generic FTX 16 of FIG. 1), the agent calls the ftx_done service to declare the root transaction "done".

In the process of declaring the root transaction done, the ftx_done service writes the modified portions of the bitfile page(s) specified by the rbf_pinpg service and the rbf_pin_record services into the logger (contained within an ftxLog record) for the first level child transaction, and also releases the bitfile page(s) pinned by the first level child transaction. The DASUM operation then returns to Entrance D in FIG. 2A.

Figure 2C:
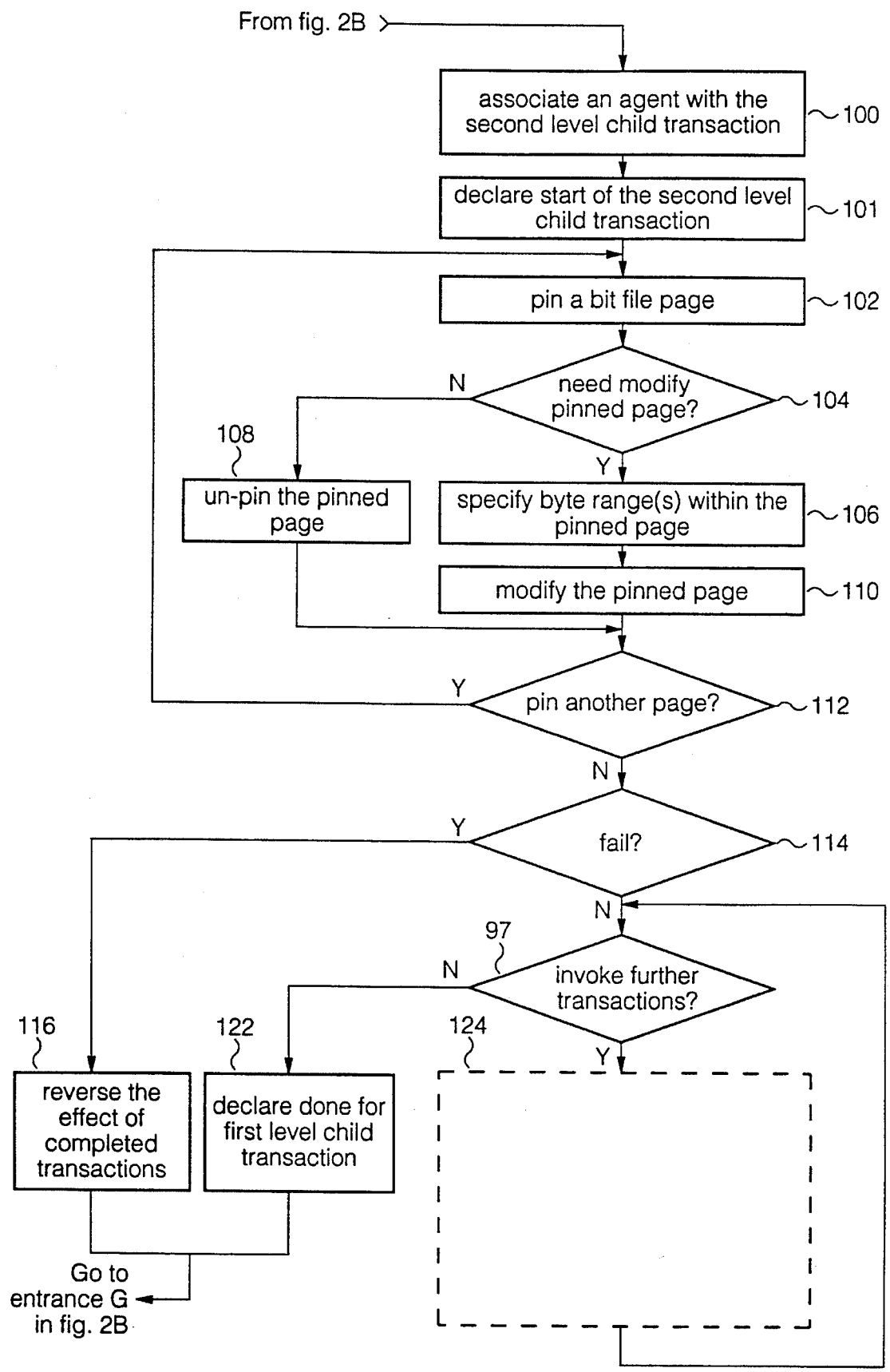

If the determination at step 97 is that a further transaction is invoked by the first level child transaction represented by node b (1, 1), the DASUM operation branches at "Exit F" to FIG. 2C to process a second level, e.g., deeper level, child transaction. However, the operation will return to step 97 (FIG. 2B) via "Entrance G" upon completion of each second level child transaction. As shown by FTX 16 (FIG. 1), there are indeed further transactions to be invoked at step 97. A first such transaction is represented by node e (2,1) and is depicted at FTX level 2 on FIG. 3. Thus, the operation goes to FIG. 2C via "EXIT F".

At step 100 in FIG. 2C, the DASUM associates an agent with the second level child transaction, represented by node e (2,1). In step 101, this agent calls the ftx_start service to declare the start of the second level child transaction. In step 101, the agent calls the rbf_pinpg service to pin the relevant bitfile page for the second level child transaction. Step 104 tests whether data modification is needed for the pinned bitfile page, and if needed, the agent calls the rbf_pin_record service to specify at step 106 the relevant byte range(s) within the pinned page.

Next, step 110 makes data modifications for the second level child transaction. If data modification is not needed, the agent calls the rbf_deref_page service to release at step 108 the pinned bitfile page. Step 112 tests the necessity to pin another bitfile page for the first level child transaction. If the second level child transaction needs to pin another bitfile page, the operation returns to step 102 to repeat the process from step 102 to step 112. Thus, the second level child transaction may involve pinning more than one bitfile page.

After making all necessary modification on the bitfile page(s) for the second level child transaction represented by node e (2,1), step 114 tests whether to fail the second level transaction. If the determination at step 114 is to fail the second level child transaction, the agent calls the ftx_fail service at step 116 to reverse all effects by the second level child transaction. This returns the operation to Entrance G in FIG. 2B. But if the determination at step 114 is not to fail the second level child transaction, step 117 will test whether the second level child transaction, node e (2, 1), invokes a further child transaction (e.g., a third level child transaction in this example). If step 117 determines there are further transactions (such not being the case for the FTX 16 of FIG. 1), the operation proceeds to deeper levels as indicated by step 124. Each deeper level has a process similar to FIG. 2C. After each third level child transaction is completed, the operation will return back to step 117 in FIG. 2C.

In the case of the generic FTX 16 of FIG. 1, step 117 determines no further child transaction is invoked, and the agent calls ftx_done service to declare the second level child transaction "done" at step 122. In the declaring "done" process, the ftx_done service writes the modified portions of the bitfile page(s) specified by the rbf_pinpg service and the rbf_pin_record service into the logger, contained within an ftxLog record, and releases the pinned bitfile page(s) in connection with the second level child transaction. Step 122 then returns the operation to Entrance D in FIG. 2B.

As shown in FIG. 2B, step 97 determines whether the first level child transaction, represented here by node b (1,1), invokes further child transactions. For the generic FTX 16 of FIG. 1, there are indeed further transactions to be invoked at step 97. A second such transaction is represented by node f (2,2) and is depicted at FTX level 2 on FIG. 3. Thus, step 97 again branches the operation to FIG. 2C.

In FIG. 2C, step 100 associates an agent with the second level child transaction represented by node f (2,2). Similar to what has been described earlier with regard to node e (2,1), the operation then repeats steps 100–112. If the determination at step 114 is to fail the second level child transaction, at step 116 the agent calls the ftx_fail service to reverse the effects of the transaction. The operation then returns to FIG. 2B through Entrance G. If the determination at step 114 is not to fail the second level child transaction, step 117 will further determine whether the second level child invokes a further transaction. In the present example, the second level child transaction represented in FTX 16 by node f (2,2) invokes no further transaction. Thus at step 122, the agent calls the ftx_done service to write the modified portions of the bitfile pages specified by the rbf_pinpg service and the rbf_pin_record service to the logger, described by an ftxLog record, and releases the bitfile pages pinned by the transaction. The operation then returns via "Entrance G" to step 97 in FIG. 2B.

In FIG. 2B, step 97 next determines whether the first level child transaction, represented by node b (1,1), invokes a further transaction. For the exemplary FTX 16 of FIG. 1, node b does not invoke any further transaction. Thus, the agent associated with node b (1,1) calls the ftx_done service to declare the transaction "done" and to release the pages pinned by the transaction. The operation is then lead to step 77 via "Entrance D" in FIG. 2A.

Figure 3:
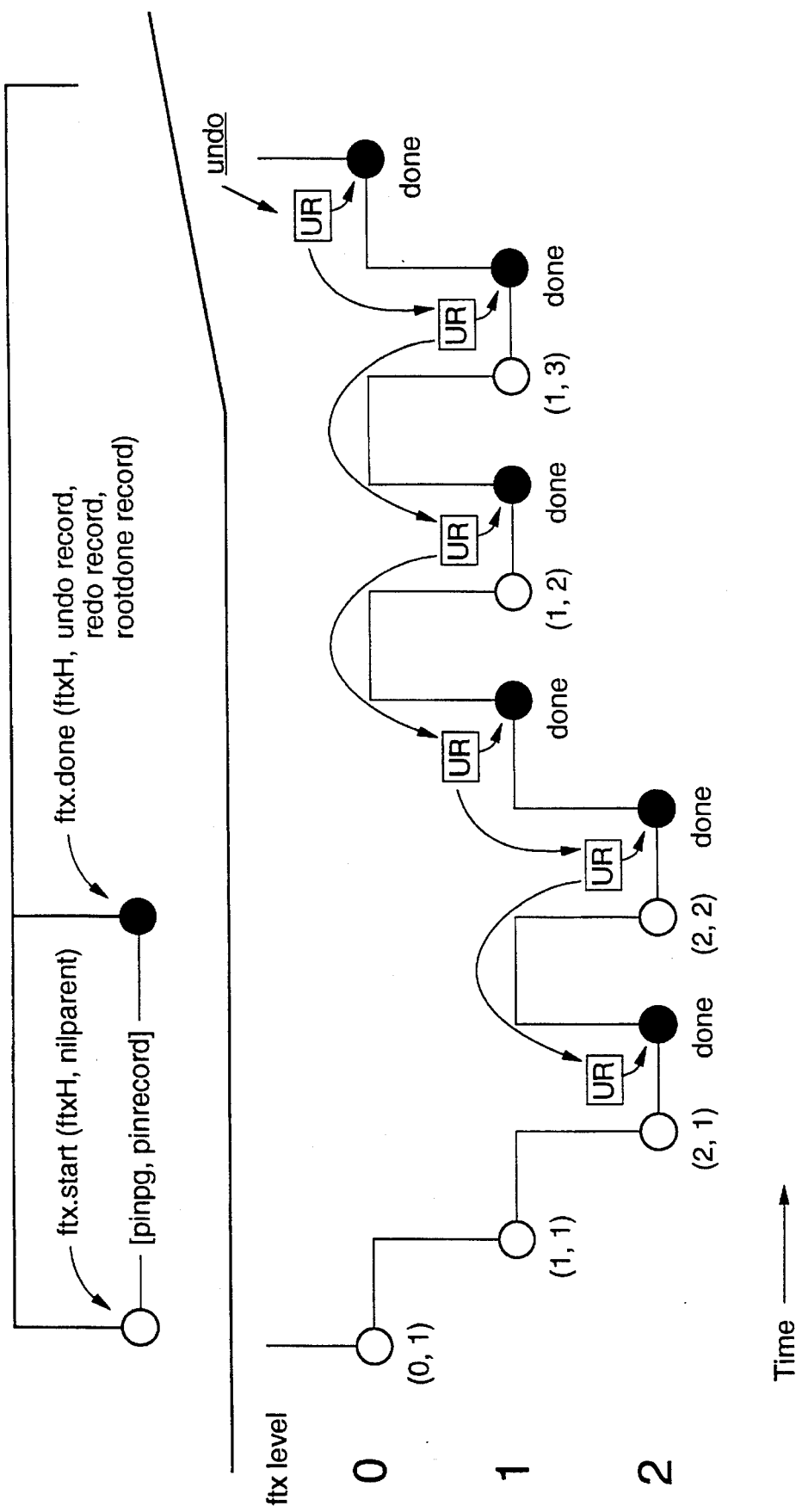
FIG. 3 depicts the procedural steps to complete the transactions in the FTX structure 16 depicted in FIG. 1, and the specific sequence required to recover or reverse those transactions.

Step 77 in FIG. 2A then determines whether the root transaction represented by node a (0,1) invokes any further transaction. A still further such transaction is depicted in the generic FTX 16 of FIG. 1 as node c (1,2), and is depicted in FIG. 3 at FTX level 1. Thus, step 77 in FIG. 2A branches via "EXIT E" to step 80 in FIG. 2B.

Step 80 in FIG. 2B then associates an agent with the first level child transaction represented by node c (1,2). Similar to what has already been described with regard to the first level child transaction b (1,1), the process then repeats steps 80–82. Similar to what has already been described, if the determination at step 94 is to fail the second level child transaction, the associated agent at step 96 calls the ftx_fail service to reverse the effects of the transaction. The operation then returns via "Entrance D" to FIG. 2A.

If the determination at step 94 is not to fail the first level child transaction, step 97 then determines whether the first level child invokes a further transaction. For FTX 16, the first level child transaction represented by node c (1,2) does not invoke any further transaction, and at step 98 the agent calls the ftx_done service. The ftx_done service writes the modified portions of the bitfile pages specified by the rbf_pinpg service and the rbf_pin_record service to the logger (described by an ftxLog record), and releases the bitfile pages pinned by the transaction. The operation then returns via "Entrance D" to step 77 in FIG. 2A.

Step 77 then determines whether the node a (0,1) root transaction invokes a further transaction, a third such further transaction being depicted by node d (1,3) in FTX 16, and at FTX level 1 in FIG. 3. Step 77 then branches via "EXIT E" to step 80 in FIG. 2B.

Step 80 then associates an agent with the first level child transaction, node d (1,3) and the process repeats steps 80–82 in the same fashion as has been described with regard to the first level child transaction, node b (1,1). If the determination at step 94 is to fail the second level child transaction, step 96 calls the ftx_fail service to reverse the effects of the transaction. The operation then returns via "Entrance D" to step 77 in FIG. 2A. If step 94 does not fail the first level child transaction, step 97 then determines whether the first level child invokes a further transaction. Since the first level child transaction represented by node d (1,3) in FTX 16 does not invoke a further transaction, the agent at step 98 calls the ftx_done service. The ftx_done service then writes the modified portions of the bitfile pages specified by the rbf_pinpg service and the rbf_pin_record service to the logger with an ftxLog record, and releases the bitfile pages pinned by the transaction. The operation then finally returns via "Entrance D" to step 77 in FIG. 2A.

In FIG. 2A, step 77 then tests whether the root transaction invokes any further child transactions. For the generic FTX 16 in this example, no further transactions are invoked and the agent associated with the root transaction at step 78 calls the ftx_done service to declare the root transaction "done".

At 150, the DASUM invokes the rootdone procedure, if needed, whereupon at step 152 log records are written to persistent data storage and the operation is terminated at step 151. At this point, the transaction represented by the root node is durably and persistently stored in device 12 (see FIG. 1).

More detailed descriptions of the seven DASUM services and the three system procedures used by DASUM will now be given. An overview description is first presented, followed by a detailed description in conjunction with accompanying Figures.

Overview of Seven DASUM Services

Overview of the DASUM ftx__start Service

The ftx__start service establishes a fault tolerant update set ("FTX") for each new root or child transaction. (This service is described later in greater detail in conjunction with FIG. 7A and FIG. 7B.) Ftx__start also determines a handle (ftxH) to specify this transaction to other services operating within the transaction. The handle ftxH is a one-based index in an array, FtxTbl. When an agent calls the ftx__start service, the state of the ftxTree structure changes in persistent memory, and initialization of the FTX structure itself occurs, reflecting the start of a new transaction. The major ftx__start parameters are:

(a) a parent FTX handle, with a special handle, FtxNilFtxH, being used to specify a null parent when a root transaction is being created; transaction;

(b) a bitfile domain handle, as the transactions are defined to operate only within a single bitfile domain.

If a root transaction is being created, the free list of FTX structures is updated by removing an FTX structure from a global FreeSlotList or by allocating a new FTX structure from memory. Also a global FtxId is updated and stored in the FTX structure.

If a child transaction is begun, the FTX structure is modified to reflect this active subtransaction and the FTX transaction level and member fields are appropriately incremented. A backwards chain of log record addresses is maintained allowing completed subtransactions to be undone if the parent transaction fails. If a new child level is deeper than the last level declared done, the new transaction undo backlink must be linked to the last done transaction. Otherwise back linkage is to the previously completed transaction at the same level. Because any individual FTX tree is executed by only a single thread, serialization is not required when a child transaction is started. This aspect of the invention eliminates the I/O blocking required in the prior art.

Overview of the DASUM rbf__pinpg Service

The rbf__pinpg service "pins" a bitfile page before any modification can be written to the page's record in persistent storage, thereby preventing the page from being written back to disk storage until the transaction is either "done" or "failed". A more detailed description of this service is given later in conjunction with FIG. 8.

Pinning occurs under FTX control and involves the bitfile access handle, bitfile page number and ftx handle parameters. An element within a pinned page array is allocated and identified for the current level within the ftxTree structure. Rbf__pinpg returns a pinned page access handle (bitfilePageH) and the address of the page data. The main steps associated with rbf__pinpg are:

(a) locating a free element in the pinned page array for the current level in the FTX structure;

(b) calling bs__pinpg with the appropriate parameters;

(c) storing in the pinned page element located in step (a) the bsPageRefht handle, the page address, page number, tag and page size;

(d) setting-up the bitfilePageH to return to the calling agent, which setting-up involves the baPageRefHt handle, FTX level, and pinned page slot index located in step (a).

Overview of the DASUM rbf__pin__record Service

The rbf__pin__record service pins a record in the bitfile page before any change can be recorded to the bitfile page, and specifies how durably stored updates to the storage pages are to be made. Rbf__pin__record stores an extent descriptor for the specified byte range within a pinned page. The arguments for rbf__pin__record are the FTX controlled pinned page handle, ftdsPinPgHT, the start of record address within the page, and record byte size. A more detailed description of this service is provided later in conjunction with FIG. 9.

Rbf__pin__record takes the following steps:

(a) the number of pinned record extents counter is incremented to assign the next record extent descriptor to the specified pinned page; and (b) the offset into the page from the specified address is calculated and stored, along with the specified byte count;

(c) a pinned record extent element within the record extent array for the specified pinned page is allocated and filled in.

Overview of the DASUM rbf__deref__page Service

The rbf__deref__page service releases resources acquired during a transaction (including a higher level parent transaction) without waiting for the entire transaction to commit, and can terminate an otherwise open FTX transaction.

Overview of the DASUM ftx__done Service

The ftx__done service, called after a transaction (including children) is done, releases pinned pages and terminates the FTX transaction. A more detailed description of this service is provided later in conjunction with FIGS. 10A–10E. Ftx__done commits bitfile page updates made during the current FTX, after stably logging to persistent memory the associated undo, redo and rootdone records provided by the calling agent, as appropriate. Calling ftx__done causes the ftxTree structure state to change in persistent memory. When a root transaction is done, the ftxTree structure is linked to a free list which is pointed to by a FreeSlotList global cell. No state in the ftxTree structure is meaningful thereafter because the ftxTree structure is reinitialized upon removal from the free list. The ftxTree structure does retain state information relevant to the creation and completion of future transactions within its tree.

Ftx__done also provides parameter information to a log for use by the three procedures. This information is stably logged to persistent storage after the root parent transaction completes and is used to recover data after a fault has occurred. The parameters associated with ftx__done are ftx handle, agent identifier, and undo operation record. Two additional optional parameters are redo operation record and rootdone operation record.

The ftx__done service first tests whether the root or child transaction is complete, and uses the test results to determine which of two similar but separate code paths will be executed.

(1) When a root transaction is completed, the following sequence of events takes place:

(a) if a rootdone operation record is present (e.g., its size parameter is non-zero), ftx__done buffers it (e.g., stores it) within the FTX structure, and as part of the ftxLog record. Confirmation is made to ensure that a rootdone opx is registered for the calling agent;

(b) Two actions are then taken:

(1) the operational redo record is buffered as part of the ftxLog record;

(2) the pinned page table for this FTX structure is scanned, and any pinned record extents are buffered as record image redo within the ftxLog record;

(c) the ftxLog record is logged by calling a log_write procedure;

(d) pages pinned by this FTX structure are unpinned. For a given page, if no pinned record extents exist, the page is unpinned "clean" otherwise it is unpinned "dirty";

(e) the rootdone opx routines are synchronously called in the same sequence as their associated subtransaction was executed. For each rootdone procedure, three actions are taken:
   (1) the rootdone_opx routine is called;
   (2) the record image redo is collected and the logger record is written as per steps b(2) and C, above; and
   (3) the pinned pages are unpinned;

(f) the FtxMutex is locked, the FTX structure is returned to the head of the FreeSlotList, whereupon FtxMutex is unlocked.

(2) When a child transaction is completed, the following sequence of events takes place:

(a) if supplied, the op_undo record is buffered in the ftxLog record header;

(b) two actions are taken:
   (1) the op redo record is buffered as part of the ftxLog record, after testing to ensure the calling agent has a redo opx routine;
   (2) the FTX pinned page table is scanned and any pinned record extents are buffered as record_image_redo within the ftxLog record;

(c) the ftxLog record is logged by calling the log_write procedure in an asynchronous ("ASYNC") mode;

(d) if present, the rootdone record is buffered within the FTX structure;

(e) the pages pinned by the FTX are unpinned "clean" if there are no pinned record extents for a given page, and are unpinned pinned "dirty" otherwise;

(f) the current level in the FTX structure is decremented by one.

Overview of the DASUM ftx_fail Service

The ftx_fail service releases pinned pages and terminates an FTX transaction, reversing the effect of a completed child transaction, in the event a transaction cannot proceed further for any reason. (A more detailed description of this service is provided later in conjunction with FIGS. 11B–11E). When ftx_fail is called, the ftxTree structure state changes in persistent memory and, if a root FTX has failed, no FTX states are retained after ftx_fail has executed. By contrast, when a child FTX fails, the FTX structure does retain state information relevant to the creation and completion of future transactions in its tree. Failure of a child FTX causes the last log record address to be set to the last childdone record, the pinned record extend and pinned page lists are all reset to zero, the FTX level is decremented by one, and a lastLvlDone is set.

Because the present invention does not support partial roll-back of the current FTX, it is the calling agent's responsibility to ensure that no pages were modified before calling ftx_fail. This restriction upon the calling agent makes it unnecessary to capture a before-image copy of records when the pin_record service is called.

The main sequence of events associated with ftx_fail are:

(a) unpinning any page pinned by the FTX, after confirming the pages are "clean" since there is no support for a transparent roll-back of record images;

(b) a log_read_stream is opened by calling log_read_open;

(c) a loop is entered to follow undo backlinks within the ftxLog records, starting at the last ftxLog record written at the current level. Only ftxLog records for children of the current transaction are considered, and for each such record, the following steps are followed:
   (1) the ftxLog record is scanned for the op_undo_record. If the op_undo_record cannot be found, the following sub-steps (2), (3), (4) are skipped;
   (2) an agent_undo_opx routine is called with the op_undo_record, which routing executes within the transaction being undone;
   (3) the FTX pinned page table is scanned and any pinned record extents are buffered as record_image_redo within the ftxLog record;
   (4) the ftxLog record is logged by calling the log_write procedure in an asynchronous ("ASYNC") mode;
   (5) pages that were pinned by the undo_opx routine are now unpinned, "clean" or dirty" as appropriate;
   (6) the last log record address for this level is then reset;

(d) the log_read_stream is closed by calling log_read_close;

(e) the current transaction level in the FTX structure is reduced, or (if it was a root FTX), the FTX is returned to the free list.

Overview of the DASUM Agent-Specific Procedures:

Overview of the agent-specific ftx_rootdone Procedure

The ftx_rootdone procedure allows the effect of a completed subtransaction (e.g., a child in the FTX tree) to be isolated from other subtransactions until the root transaction is complete. (A more detailed description of this procedure is provided later in conjunction with FIG. 11A.) The DASUM calls ftx_rootdone for each agent when the root transaction is committed. Commitment is precisely the time that the subtransaction is made visible, since there is no further need to isolate the agent after the root transaction is committed. By contrast, the prior art typically does not provide such an agent-specific ftx_rootdone procedure, using instead a locking mechanism to provide isolation. A locking mechanism is a poor alternative because other threads are prevented from proceeding until the lock is released.

Overview of the agent-specific ftx_redo Procedure

The ftx_redo procedure, called when a transaction cannot be successfully completed, repeats all transactions on the FTX tree in postorder. (A more detailed description of this procedure is provided later in conjunction with FIG. 11A.) In practice, an FTX single-thread, multi-level structure is dynamically maintained as data is read to or from persistent storage. If a system failure occurs before all modifications have been written to persistent storage, ftx_recovery will cause the changes represented by completed FTXs to be redone, using the agent-specific ftx_redo service. The ftx_recovery service will call each agent that used the ftx_redo service, and will supply each agent with the information logged when these agents last used the ftx_done service. Otherwise there is no need to involve the agents to redo earlier operations.

Overview of the agent-specific ftx_undo Procedure

As described earlier, the ftx_undo procedure is called during the ftx_fail process and allows the effects of completed children FTXs to be undone. A more detailed description of this procedure is provided later in conjunction with FIG. 11B.

Description of the DASUM Failure Recovery Process

In the event of a fault caused by hardware failure, system failure, or system failure, the second aspect of the present invention uses information stored in the logger during the first aspect to reverse or roll-back any transaction not durably stored. In should be noted that in real life, a fault condition can arise at any stage of the transaction execution process. FIG. 3 further depicts the reverse, left-to-right postorder, sequence that preferably is followed in undoing an transaction not durably stored.

Figure 4:
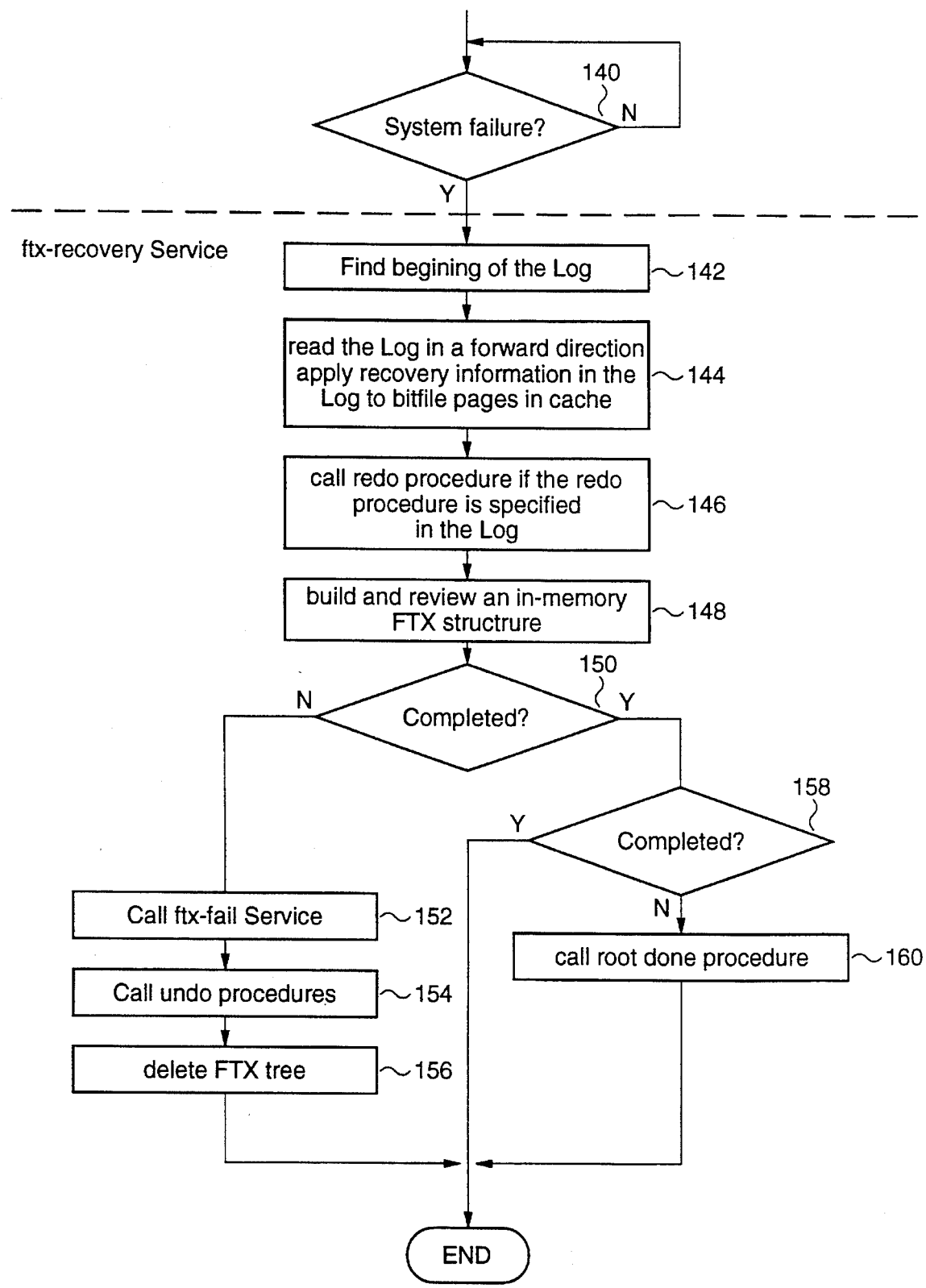
FIG. 4 depicts procedural steps to recover a transaction, according to the present invention.

FIG. 4 depicts the DASUM-provided seventh service ftx_recovery that is used during the second (or recovery) aspect of the present invention. (Further detailed information regarding this service is presented later in conjunction with FIGS. 12A–12E.) A system failure determination is made at step 140 in FIG. 4. If a failure is determined, then according to the second aspect of the present invention, the aggregate system invokes the ftx_recovery. The ftx_recovery service causes both a reconstruction (or re-do) of completed transactions, and a roll-back of the effects of incomplete transactions not durably stored. If, under most normal circumstance, no failure has occurred, then step 140 does not cause the ftx_recovery service to be invoked.

As has been described with respect to the first aspect of the invention, during normal runtime execution, a dynamic FTX structure 14 is dynamically created by the ftx_start service and is maintained. During such normal transaction execution, certain information necessary for fault recovery is dynamically stored in the logger by the ftx_done service. If step 140 determines that a fault condition exists, the ftx_recovery service at step 142 will first locate the beginning of such logged recovery information. Step 144 then reads the log in a forward direction, and applies such logged recovery information to bitfile pages in the buffer cache. If specified by the logged recovery information, step 146 will invoke an associated redo procedure that was specified during normal transaction execution by the ftx_start service. An on-going process, step 148 constructs and maintains an in-memory FTX structure that mimics the original state changes of the FTX structure 16. Collectively steps 144,146 and 148 operate such that when the log end is reached, the contents will describe incomplete FTX structures.

Step 150 determines whether the constructed FTX structures have been completely committed to persistent storage. If uncommitted, step 152 invokes the ftx_fail service to undo the transactions. To remove the effects of uncommitted FTX structures, step 154 invokes the undo procedure. Some FTX structures may be committed but incomplete. Step 160 invokes the rootdone procedure to complete the effects of any such committed but incomplete FTX structures.

While the present invention has been described with reference to a specific embodiment, the description is illustrative of the invention and is not to be construed as limiting the invention. Various modifications may occur to those skilled in the art without departing from the true spirit and scope of the invention as defined by the appended claims.

Applicant has generally described the structures used in the present invention elsewhere in the Overview of Data Structures portion of this Specification. In the sections that follow, applicant will describe the detailed operation of the present invention, with emphasis on the on-disk log record (ftxLog), the in-memory fault tolerant update structure (ftx), the services, and recovery from fault.

Detailed Description of DASUM Operation

On-Disk Log Record (ftxLog)

Figure 5:
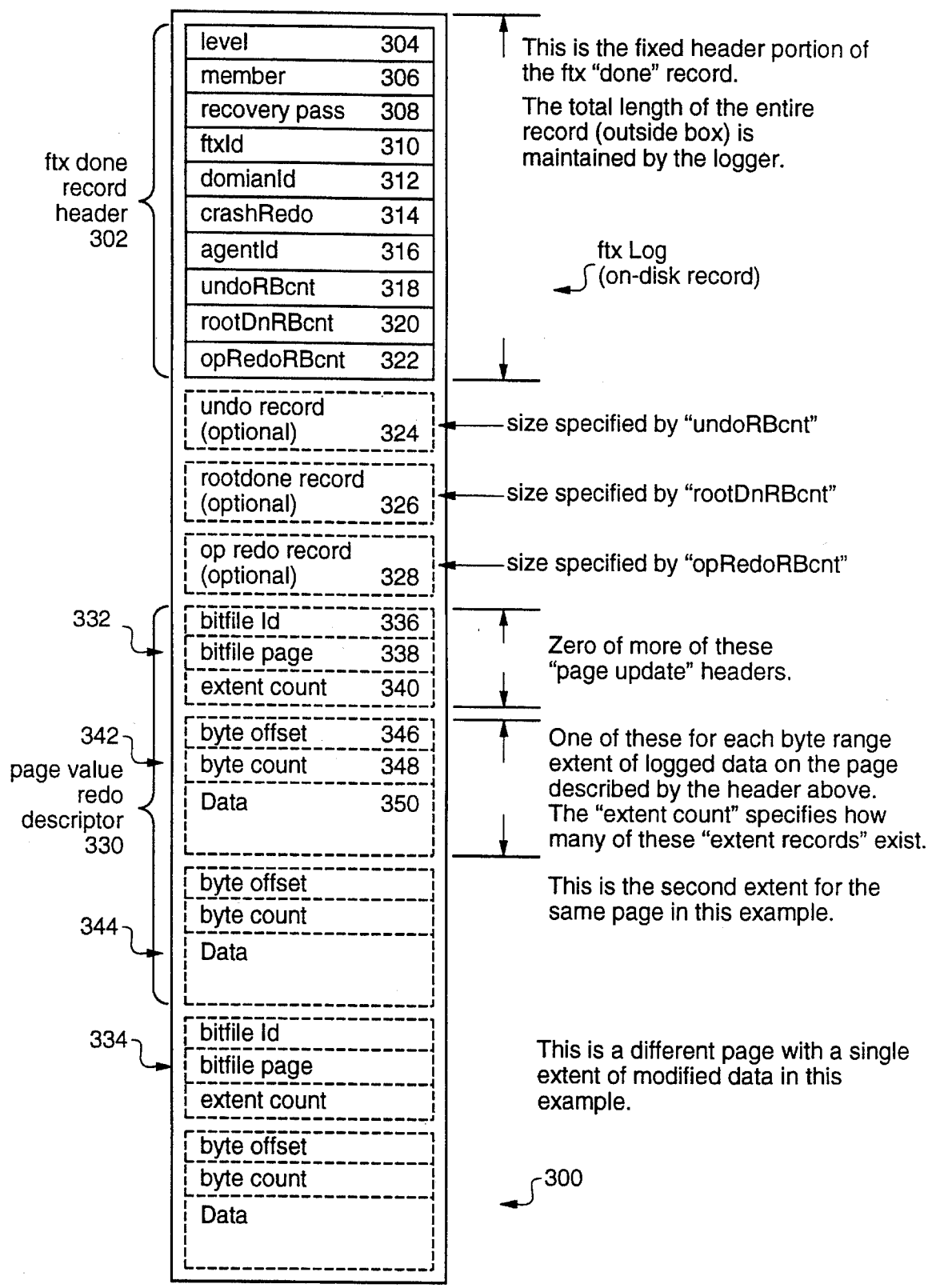
FIG. 5 depicts an on-disk log record, according to the present invention.
Figure 6:
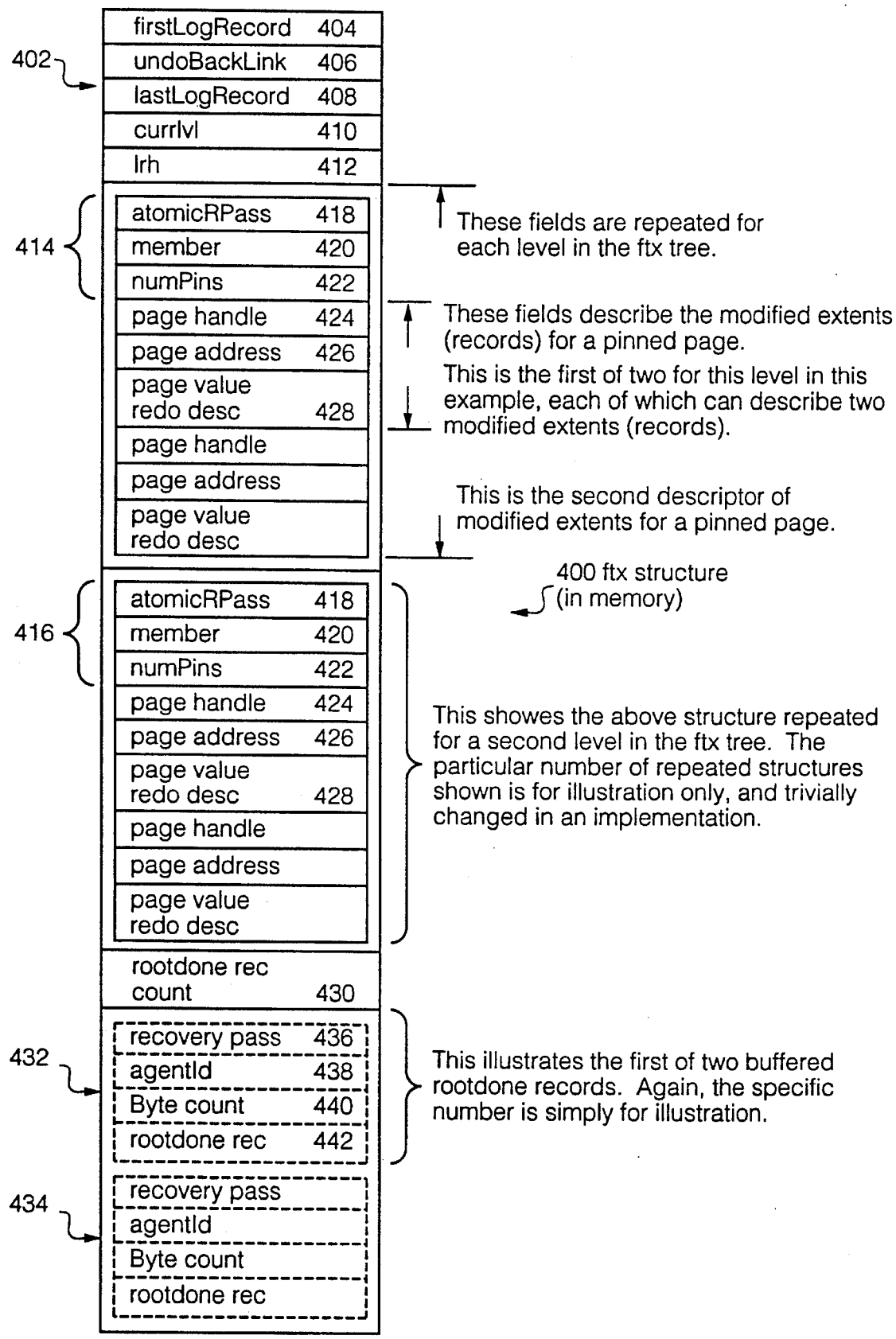
FIG. 6 depicts an in-memory ftx structure, according to the present invention.

As earlier mentioned, the preferred implementation of the invention includes two major data structures, an on-disk log record (shown in FIG. 5) and an in-memory fault tolerant update FTX structure (shown in FIG. 6). In the detailed description that now follows, the interplay between the seven DASUM services and the ftxTree and ftxLog DASUM structures during normal run time execution and during recovery time are set forth.

Each of these two data structures is described by a header file, and the various flow charts that are described herein relate to how these header fields are filled in, and when in time they become updated. In the following descriptive text, reference will be made to implementing source code that appears as APPENDIX 1, attached hereto. The notation APPENDIX 1, x:y-z will be used to mean the section of code appearing in APPENDIX 1, page x, beginning at about line y and (if stated) spanning to approximately line z.

In general, the names of fields depicted in the Figures generally match the source code nomenclature of APPENDIX 1. Discrepancies between the source code and the Figures generally are attributable to one of the Figures or the code listing being revised without revising the other. However any such discrepancies notwithstanding, those skilled in the relevant art will understand the present invention from APPENDIX 1 and/or the Figures. In contrast with many prior art logging schemes that log the entire affirmation of a modified page, the on-disk log structure of FIG. 5 preferably logs only the data actually modified by a given subtransaction. This selective logging aspect of the present invention advantageously reduces the storage requirements for the logger.

With reference to FIG. 5, a preferably fixed length ftx done record header 302 is established to define and describe how the "ftx done" record itself is constructed. Additional information is appended to the header in memory, which is not readily described in a fixed length structure. The underlying source code for this header appears in APPENDIX 1:2:60, 2:61-72. As will be described later, this ftx done record header appears as the fifth field down in the in-memory FTX structure 400 depicted in FIG. 6.

In FIG. 5, the ftx done record header 302 contains several fields. The "level" field 304 is the level of the transaction within an FTX structure. For example, in FIG. 1, FTX 16 is shown with three levels of transactions: 0 (or root), 1 and 2. The member field 306 is a number denoting a member in a given part of a subtransaction for a particular level, i.e., member 1, member 2, etc.

As described later herein, the recovery pass field 308 contains information identifying during which, of potentially several, recovery pass recovery of the particular structure level shall occur. During runtime execution of nodes in the ftx structure, data may be created or modified. This data may exhibit a hierarchical dependency. However such data dependency need not be reflected by the sequence of the nodes in the ftx structure. However by properly assigning a recovery pass priority to the various nodes, recovery can occur in a sequence recognizing the hierarchical dependency of the associated data.

The ftxId field 310 is a unique time and space identification for this particular transaction tree relative to all other transaction trees. The domainId field 312 is a unique time and space identification for the particular domain with which this particular log record is associated. Although the ftxId field 308 need only be unique within the domainId field 312, each of these fields is a time stamp that is unique in time and space.

The crashRedo field 314 is log record address contained in every log header, and is a back pointer to the first log record whereat log recovery must be started. Potentially the crashRedo field could differ for every log record. The purpose of this mechanism is to limit the amount of log processing during a recovery process, thereby minimizing the time required for a recovery. As will be described later, the crashRedo field interacts with the buffer cache set during "done processing" updating.

With further reference to FIG. 5, the agentId field 316 in header 302 is a unique identification for the agent that will handle a specific subtransaction. As such, an agent is a piece of code that will handle either the ftx_undo, the ftx_redo or the ftx_rootdone procedures. The undoRBcnt 318, rootDnRBcnt 320 and opRedoRBcnt 322 fields are byte count files for an ftx_undo record, an operational ftx_redo record, or an ftx_rootdone record.

In the presently preferred embodiment, if all three of fields 310, 314 and 316 are zero, it follows that the remainder of the subject record does not exist. If nonzero, then optionally following these count fields one may see buffered (or stored) within the same single record as it is written to persistent storage disk, an undo record 324, a rootdone record 326 that (if present) follows the undo record, and an operational redo record 328 (if present). The size of the undo record 324 is described by the undoRBcnt byte count 318 that immediately follows this fixed area if the record exists.

Information describing the value or after-image updates to particular data pages in the system next appears following optional fields 324, 326, 328. Within the context of a transaction, such information results directly from the rbf_pinpg and rbf_pin_record operations. By way of example, FIG. 5 depicts a page value redo descriptor 330 as including two page update headers 332, 334. It is understood that there could be more than two page update headers or no headers at all. Preferably these page update headers 332, 334 follow a similar format, each pertaining to an update to a particular page identified by a unique bitfile identifier 336, a page 338 within that bitfile, and an extent (or record) count field 340 noting the number of ranges of bytes within that page described by the particular record. In this example, two separate data updates extents 342, 344 (or records) within a single page in the record are depicted. APPENDIX 1, 3:74-79 defines an ftxRecRedo type structure that contains the bitfile Id (denoted in the source code as bitfile set tag and tags).

Each extent, such as extent 342, is described by a byte offset 346 indicating offset within the page described, a byte count 348 indicating how many bytes of data will follow, followed by the actual data 350 that is modified. Similarly extent 344 is likewise characterized. Extents 342,344 pertain to data within a common bitfile page. By way of example, the remaining page update header 334 pertains to modification of an entirely different bitfile page, having but a single extent of modified data. The source code corresponding to the byte offset 346 and byte count 348 appears as APPENDIX 1, 3:81-84 (referred to as extent type descriptor ftx RecXT).

It is important to appreciate that, according to the preferred embodiment, only data modified by a given transaction or subtransaction is actually logged to the on-disk log record 300. Doing so saves both log disk memory space and processing time needed to recover in the event of a system crash or other failure.

In-Memory fault tolerant Update Structure (FTX)

FIG. 6 depicts an in-memory FTX structure 400, which is a run time representation of the active part of the FTX tree-like structure (such as 16 in FIG. 1) used by the present invention. As such, in-memory FTX structure 400 represents what is tracked in the running system of the current state of the transaction FTX tree.

According to the present invention, this in-memory FTX structure 400 6 differs significantly from the on-disk memory structure of FIG. 5 in that, during construction, the in-memory FTX structure does not actually contain data. Instead structure 400 contains descriptors, with the actual data being copied at the time the transaction is completed. Substantial system memory is thus saved by not saving data in the in-memory FTX structure at run time.

In the preferred embodiment, the in-memory FTX structure 400 includes a fixed set of fields that apply to the entire tree-like structure, followed by a repeating set of structures, to be described. The structure includes a header 402, the code for which appears at APPENDIX 1, 4:158-169.

Header 402 preferably includes a firstLogRecord field 404, an undoBackLink field 406 and a lastLogRecord 408 that represent record addresses within the log record. These fields are passed to and from the logger 22 (see FIG. 1) for a number of purposes. Preferably a sequence number that is saved with this structure is returned from the logger and is incremented for every log record written. A fourth field 410, currlvl, represents the current level in the FTX transaction tree that is currently active. Preferably the current level starts at 0, increments when a transaction is started, and decrements when a transaction is completed. The fifth field lrh 412 contains the ftx_done record header 302 described with reference to the in-memory structure 400 depicted in FIG. 5.

According to the present invention, only one level is active at a time within the entire transaction tree. Advantageously this results in a single thread of control that sequentially declares a root transaction, declares a subtransaction, starts a subtransaction, finishes a subtransaction, and so forth. The thread extends through the eventual transaction tree that gets described during normal runtime execution. Thus although an infinitely large number of subtransactions can exist, at any given time there is but one open or active subtransaction per level. Upon completion of a subtransaction, the present invention moves upward to the previous level within the tree-like structure. As a result, one in-memory FTX structure (e.g., structures described by headers 414, 416 in FIG. 6) exists per level. A given level can include many members and the presently preferred embodiment can encompass a maximum of five levels at one time, although this number can of course be changed. (See APPENDIX 1, 4:151.)

For purposes of illustration, FIG. 6 shows two fields 414,416 that are repeated for each level in the ftx structure. If, for example, the ftx structure included three levels (0, 1, 2), then FIG. 6 would depict a third field similar to field 414 or field 416. The above-described current level field 410 essentially represents an index into whichever level (0, 1, 2, etc.) is presently active at any given point.

Each of these level-reflecting fields, for example field 414, includes an atomic recovery pass field 418 (to be described more fully with respect to the ftx_start, ftx_done and ftx_recovery services. Each level-reflecting field also includes a member field reflecting a member number for a given level within the tree (which number enables the present invention to know what the next member is going to be). The source code supporting the current member number can be found in APPENDIX 1, 4:139-145.

Within the current level structure is yet another repeating structure denoted number pins (numPins) 422. Each page intended to be modified with the rbf_pinpg call is described in this part of the in-memory FTX data structure, which part advises how many pages are to be actively look at.

As reflected by FIG. 6, the in-memory FTX structure 400 includes three fields describing the modified extents (or records) for each pinned page, namely a page handle field 424, a page address field 426, and a page value redo descriptor 428 that is effectively the same data structure. Supporting source code for these fields can be found in APPENDIX 1, 4:139-145, where, for example the type for the array of line 144 is defined at lines 123-131. The page value redo descriptor references information similar to what has been described with regard to the log record descriptor. For example code line 129 is the ftx ref redo type page descriptor, where code line 130 is an array of record extents.

Thus for each level in an FTX tree there is an in-memory FTX structure storing appropriate descriptors, where only one transaction or subtransaction is open or active at any one time per any one level. Following the above-described array of current level per level data structures, the in-memory FTX structure 400 further includes a rootdone record count 430 that is followed by zero or more optional buffered (or stored) root done records 432, 434.

As shown in FIG. 5, root done records were specified are stored as part of the on-disk log record (see 326) during ftx_done time. As a convenience, the root done records are preferably also buffered in memory (e.g., as 432, 434) so they can be efficiently located and redone. As depicted at the bottom of FIG. 6, each done record optionally includes a single rootdone record.

In the presently preferred embodiment, all rootdone records for a given FTX transaction tree are currently buffered in memory at run time to promote efficiency. An alternative embodiment could of course eliminate such buffering, and instead trace back through records already in the logger, and re-read these records. This alternative embodiment imposes substantial overhead, especially where only relatively small numbers of records are involved.

With further reference to FIG. 6, for each rootdone record (i.e., 432, 434) there is preferably stored recovery pass information 436 that is used in conjunction with atomic recovery pass information (i.e., 418), an agent identifier 438, a byte count of the amount of data 440, and the data in the rootdone record itself 442 (the data being provided when this structure is actually built in memory in code). This data structure is defined in APPENDIX 1, 3:110-114.

Detailed Description of the ftx_start Service

Figure 7A:
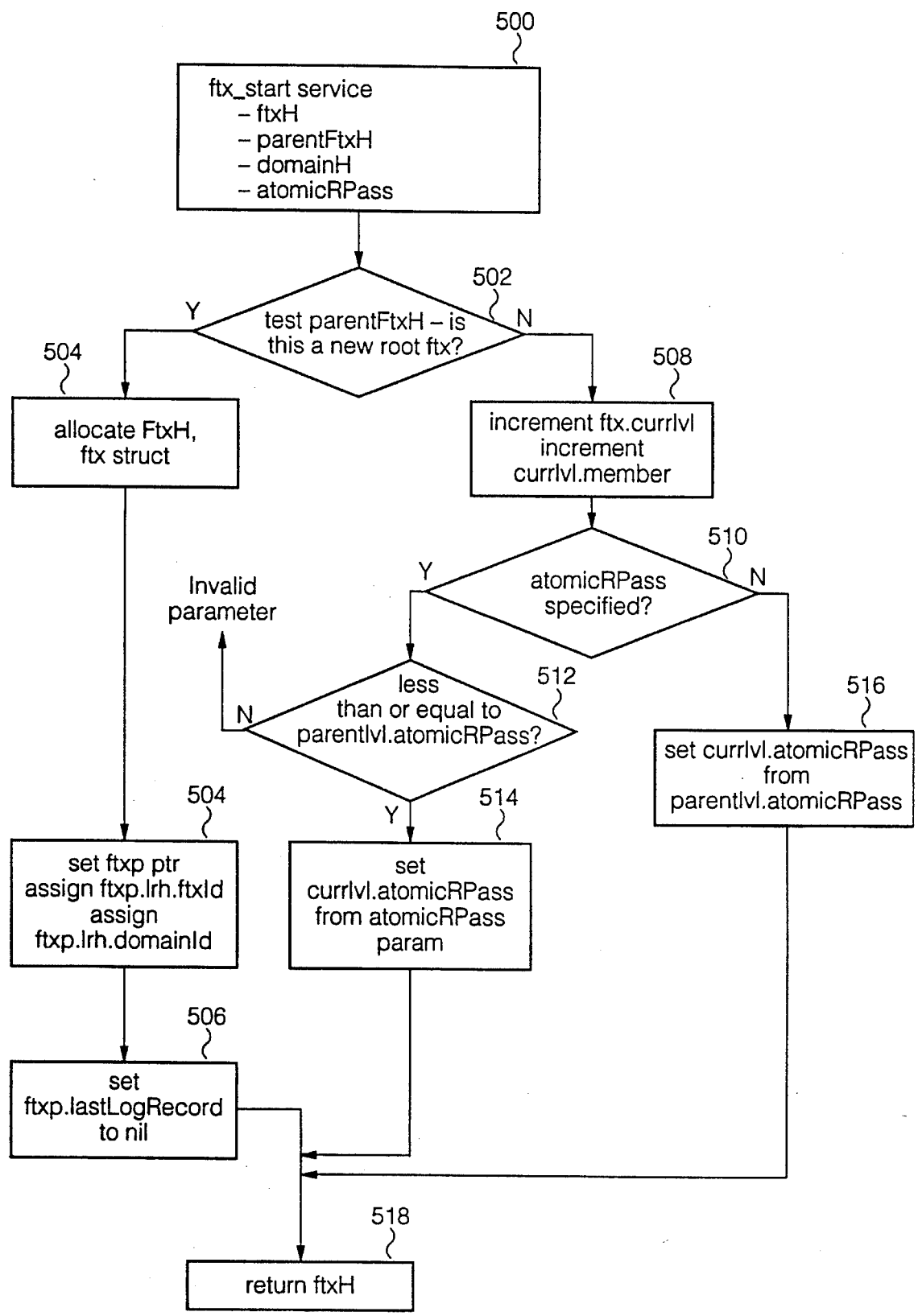
FIG. 7A and FIG. 7B depict operation of the ftx_start service, according to the present invention.

FIG. 7A depicts the ftx_start service, which is used by the present invention during normal runtime to establish a fault tolerant update set (or "FTX") for each new root or child transaction. Briefly, this service begins a transaction and obtains a transaction handle for identification purposes. Using that handle, this service then calls the rbf_pinpg service to gain access to a page within a file within a storage domain, where all or part of the page is to be modified. Before any modification is permitted to any specific set of bytes within that page, the rbf_pin_record service is called and the range of bytes to be modified is described. The page is then modified. Zero or more extents within a page may be modified, and within a transaction, one or more pages may be modified, since the present invention provides a nested transaction structure.

The source code implementing the ftx_start service shown in FIG. 7A essentially commences with APPENDIX 1, 27:226, wherein the letter "i" at line 227 denotes "internal". In FIG. 7A, step 500 represents the ftx_start service call and contains the relevant parameters, which include an output parameter denoted transaction handle (ftxH), an input parameter denoted parent ftx handle (parent FtxH), a domain handle (domainH) that describes the storage domain upon which this transaction operates. The domainH parameter is provided because the present invention advantageously may be used in a system having many concurrently running domains. In the presently preferred embodiment, domain isolation is provided by recovering each domain independently of other domains. The last parameter denotes the atomic recovery pass (atomicRPass).

The atomicRPass parameter is used to ensure consistency because there are data structures on-disk (i.e., in persistent storage) that have dependencies upon other data structures on disk. These data structures must be made consistent before certain portions of the ftx_recovery service can be executed. This is especially true where data structures are organized to access a given page and bitfile to ensure proper access to the dependent data structures. For a given subtransaction, and all child transactions thereunder, atomicRPass specifies upon which pass (e.g., pass 1) recovery must occur. (In the presently preferred embodiment, two recovery passes are made through the log for a given subtransaction, although fewer or more passes could also be implemented.)

APPENDIX 1, 27:255 corresponds to step 502 in FIG. 7A and tests whether this is a new root transaction ftx handle. Code line 259 recognizes a "0" handle portion as representing a new root transaction. Preferably a dedicated constant is defined for this parameter for use by the ftx_start code when creating a root transaction, and is this constant that step 502 tests for. If the handle portion of this constant is zero, a new root transaction is present (see code comment at line 259).

If step 502 determines that a new root transaction is present, the routine proceeds to step 504, and APPENDIX 1, 28:277-293 contains code that, upon execution, allocates a new in-memory structure 400 (see FIG. 6, for example) to which an ftx handle is assigned. It is understood that what is meant by "allocating an ftx" is obtaining a data structure to which there is a pointer.

Step 504 in FIG. 7A sets this pointer and APPENDIX 1, 28:302-321 assigns a unique transaction identifier (ftxId) for this newly allocated ftx structure. Next, within the log record header part of the ftx structure, both the transaction identification and the domain identification are initialized. At APPENDIX 1, 28:325, the lastFtxId is assigned to the corresponding field in the ftx structure. Similarly the log record header field (lrh.ftxId, FIG. 6) is initialized within that newly allocated ftx structure, and the domainId (FIG. 5, field 312) is assigned, using information from the ftx handle. In the preferred embodiment, the source code fetches and de-references the handle, and obtains a pointer to an in-memory data structure from which the domain identification is loaded. See generally APPENDIX 1, 20:342. In essence, if the transaction in question is a root transaction, nothing more is handled and what is returned to the transaction caller by step 506 is simply the ftx handle. At the start of a transaction, step 506 initializes the current value of the last log record (ftxp.lastLogRecord, FIG. 6, field 408) was set to nil, since properly no backlink exists for use by the ftx_done service (to be described).

Returning now to step 502 in FIG. 7A, if the transaction in question is a subtransaction rather than a root transaction, we are led to step 508. A series of "ELSE IF" tests are now made by the implementing code (APPENDIX 1, 29:368) as alternatives to the simple test bit at code line 255. Because a subtransaction is involved, at step 508 the current level field (ftx.currlvl, FIG. 6, field 410) within the ftx structure is incremented by one to indicate a level different than the parent level (APPENDIX 1, 30:395). Similarly the member number (currlvl.member) within that level is also incremented by one. The new level number is used as an index into the set of per level in-memory ftx structures previously described (APPENDIX 1, 30:400), and within the appropriate level, that field is incremented.

Step 510 next determines whether the atomic recovery pass number is specified. It is necessary to briefly digress to FIG. 7B to better understand the ordered atomic recovery pass concept facet of the present invention. The presently preferred embodiment makes a maximum of two recovery passes, although a different number of passes could of course be implemented. Simply stated, the recovery pass number (i.e., 1 or 2) for a transaction must be less than or equal to the recovery pass number of the parent transaction. A recovery pass procedure recognizes that there can be a hierarchical dependency among data, which dependency is not per se reflected by the runtime transaction (e.g., node) processing. While FIG. 1 depicts an ftx structure 16, the nodes per se do not indicate a dependency among the associated data. However by properly assigning a recovery pass number (e.g., N=1 or N=2 in the presently preferred embodiment), a recovery sequence can be effected that recognizes both the data dependency and the transaction sequence.

Figure 7B:
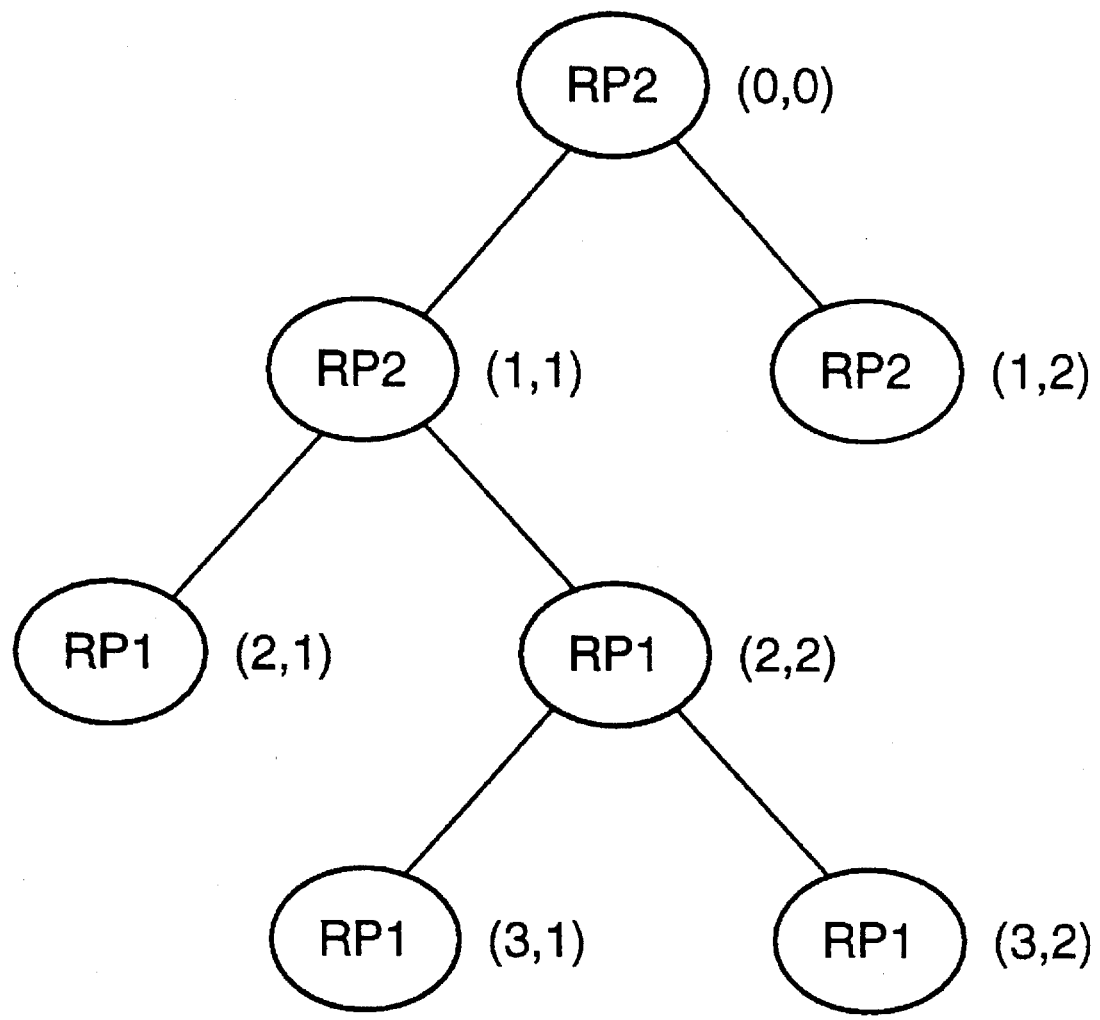

FIG. 7B shows a root transaction (0,0), i.e., (level 0, member 0) with an associated RP2 notation denoting that recovery shall occur on recovery pass 2. At level 1 there are two subtransactions (1,1) and (1,2) with associated recovery pass notations RP2. Node or transaction (1,1) has subtransactions with associated recovery pass information noted. In the relevant code APPENDIX 1, 29:333, if the node's atomic recovery pass number (as passed into step 510) is non-zero, then that non-zero number is assigned to the node's field in the current level structure, otherwise the field is set to the highest recovery level, e.g., 2. Thus, the root node (0,0) in FIG. 7B is shown as getting recovered on the highest number recovery pass, e.g., pass 2.

If a crash or failure occurs, on the first recovery pass, nodes (3,1) and (3,2) are recovered, their parent node (2,2) is recovered and node (2,1) is recovered. Nodes (3,1) and (3,2) must be recovered on the first pass because their parent (2,2) is recovered on the first pass, and their recovery pass number cannot exceed 1. On the second recovery pass, nodes (1,1), (1,2) and the root node (0,0) are recovered. A crash can of course occur at any time, even during recovery. It is important to appreciate that if a crash occurs, say, after completion of nodes (2,2) and its subtransactions (3,1) and (3,2) but before completion of node (1,1), a partial tree exists, stored within the FTX 16 structure of FIG. 1. In this case, at the end of pass 1, the present invention will undo anything done by nodes (3,1), (3,2) and (2,2) because at the end of a given recovery pass (here pass 1), the tree must be consistent for all levels affected by that pass. In this example, at the end of recovery pass 1, at level 2 node (2,2) and its children transactions are completed but node (2,1) was not completed, an impermissible inconsistency. To reassert consistency, the present invention will backout all transactions up to a first node that is at a higher level. Thus in the present example, transactions below node (1,1) will be undo.

Returning now to FIG. 7A, step 510, if the atomic recovery pass number is specified, step 512 determines whether that number is less than or equal to the atomic recovery pass number for the parent transaction (or node). (See APPENDIX 1, 30:404-416.) If this test cannot be satisfied, then an invalid parameter exists and the call is aborted. If this parent relationship condition can be satisfied, step 514 then sets the current level to that recovery pass number, APPENDIX 1, 30:410. If however step 510 determines that no atomic recovery pass number is specified, step 516 sets the current atomic recovery pass number from the parent, and if no parent was specified, a maximum recovery pass number for the system is assigned, 2 in the presently preferred embodiment. At step 518, an ftx handle is returned for the current newly initialized or modified ftx structure.

Detailed Description of the rbf_pinpg Service

Figure 8:
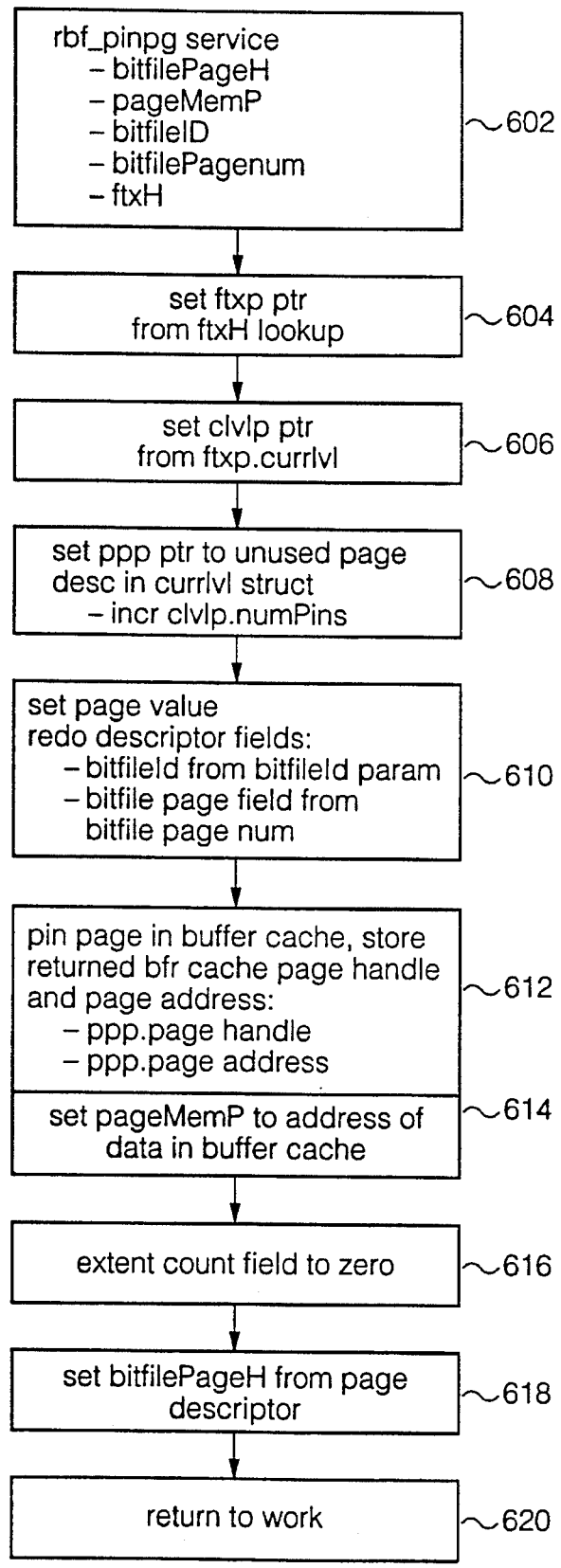
FIG. 8 is a flowchart depicting the rbf_pinpg service, according to the present invention.

FIG. 8 depicts the rbf_pinpg service used to "pin" a bitfile page before any modification can be written to the page's record in persistent storage. This service prevents the page from being written to disk storage until either the transaction id "done" or has "failed".

At shown by step 602, the rbf_pinpg service obtains returned output parameters including a bitfile page handle and a page memory pointer, the relevant code for which is found at APPENDIX 1, 23:1251. Step 602 also returns input parameters including a bitfile identifier (preferably implemented in code as a handle to a structure that contains the bitfile identifier), a page number within that bitfile, and a handle to the ftx structure (ftxH). Step 604 preferably causes the routine to set an ftx pointer from an ftx handle lookup. This procedure is implemented from the ftx handle that is passed to provide a memory address for use as a reference.

Having thus obtained a reference to the ftx structure, as shown in step 606, the routine then provides another pointer internally to the current level within that structure. Preferably this is accomplished by setting a current level pointer (using level number information embedded within the ftx transaction handle) to locate that internal data structure. See APPENDIX 1, 46:1304. Essentially the rbf_pinpg service is establishing a page that will be referenced later in the process.

As shown by step 608, a pin page pointer (ppp.ptr) is set to an unused page descriptor for a page within a current level structure within the ftx structure of FIG. 6. Preferably there is an array of pre-allocated embedded descriptors to facilitate step 608 in accomplishing these essentially bookkeeping procedures. As shown in APPENDIX 1, 46:1306, within the current level, the number of pages that are pinned is incremented because the rbf_pinpg service will pin another page.

Steps 610 and 612 accomplish various initializations and preferably are sequentially interchangeable. As shown by step 610, the page value redo descriptive fields within the pin page descriptor selected by step 608 are set. As shown by APPENDIX 1, 46:1335, preferably the bitfile identification is set from the bit file identification parameter, while the relevant page number is set from the page parameter (code line 1337). In the presently preferred embodiment, an internal pin page function is called by code line 1322, which function acquires from disk (if necessary) the contents of the page for the page specified and for the bit file identified by the bit file identification using the access handle. Further, if necessary, this internal function reserves memory space for that page in the buffer cache, and returns a buffer cache address. The page adder referred to at code line 1323 preferably is an output parameter stored in the page descriptor, step 612.

The per page descriptor (APPENDIX 1, 46:1338-1339) retains both the page handle (returned from the internal pin page function) and the page address. As indicated by step 614, the rbg_pinpg service provides a page memory pointer output parameter (pageMemP) that is returned at code line 1342, and represents the same field that was stored internally.

By definition, no extents have been stored to this point, and step 616 is initialized by code line 1320 to reset the extent count field to zero before any extents can be allocated. As shown by step 618, the routine next sets the bitfile page handle (bitfilePageH), which is returned to the caller as the caller's reference at step 620 for use with the rbf_pin_record service (to be described). The bitfile page handle enables the present invention to return to the data structure whose fields have just been filled in.

Detailed Description of the rbf_pin_record Service

In brief, when a record is to be modified, the present invention calls the ftx_start service, which starts the transactions and returns a transaction handle. Using that transaction handle, the rbf_pin_page service is called to gain access to a desired page (requiring modification) within a file within some storage domain. Before any modification can be made to a specific set of bytes within the page, the rbf_pin_record service is called to describe the range of bytes to be modified. After this is done, modification can be made to zero or more extents (or records) within a page. Further, because of its nested tree-like structure, the present invention permits more than one page may be modified within a transaction.

Figure 9:
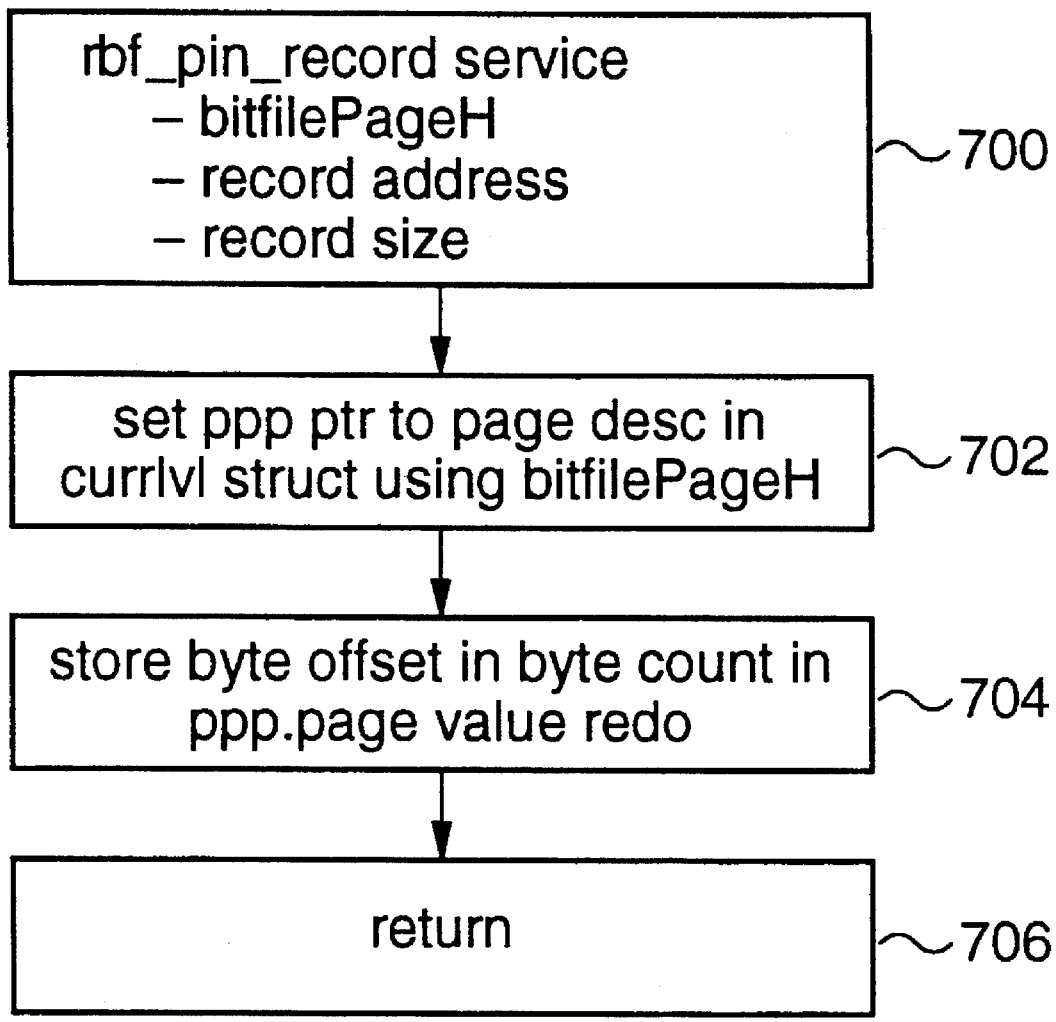
FIG. 9 is a flowchart depicting the rbf_pin record service, according to the present invention.

More specifically, FIG. 9 depicts the rbf_pin_record service, which describes a specific range of bytes within the page that has been pinned by the rbf_pin_page service, as being modified. It will be appreciated that it is important for the present invention to know what data should be stored in the logger for recovery.

As shown in step 700, the routine obtains various input parameters, including the bitfile page handle (e.g., a reference to the page just pinned by the rbf_pin_page service), a start address in memory for the record (or extent) being modified, and a record size parameter (e.g., the number of bytes offset from the start address that have been, or are to be, modified). The relevant code is found in APPENDIX 1, 48:1470-1474, which code preferably is called before any modifications are made, thus providing an option to rollback partial transactions.

Step 702 represents various bookkeeping tasks such as locating the structure initialized by the rbf_pin_page service. Preferably the specific page within the current level within the ftx structure is described, as at code line 1514.

As shown by step 704 in FIG. 9, the relative byte offset within a page (recboff) and the byte count (which was passed into step 704 directly as record size) are calculated using various parameters. The parameters include the stored page address (which was returned as a page memory pointer output parameter and internally stored in the pin page descriptor) and the reference address (passed into step 704 by code line 1521). At APPENDIX 1, 50: 1531-1561, a check is made to determine that the currently specified byte range is contained either in a previously specified byte range, or is adjacent to such a range. If such is the case, preferably the byte range may advantageously be described with a single extent rather than with two extents, thus avoiding describing the same information twice.

The byte count or relative byte offset is represented in FIG. 9, step 704, as the page value redo descriptor (ppp.page.value redo). This parameter is preferably stored as an extent descriptor in the on-disk log record structure, such as indicated by 342 in FIG. 5. As further indicated in FIG. 5, many such descriptors can exist, up to a number preferably described by the number extents field (numXtnts) that is incremented as shown at APPENDIX 1, 50:1577). When the routine has completed the tasks shown at step 704, the rbf_pin_record service returns to the caller, as represented by step 706.

Detailed Description of the ftx_done Service

Turning now to FIGS. 10A–10E, the ftx_done service will be described. The ftx_done service is an important runtime procedure that, under normal circumstances, permits transactions to be successfully committed, and allows processing to proceed. Essentially the ftx_done service generates a log record for each completed transaction or subtransaction by calling the logger, which then writes the log record. The log record format is depicted by FIG. 5.

Figure 10A:
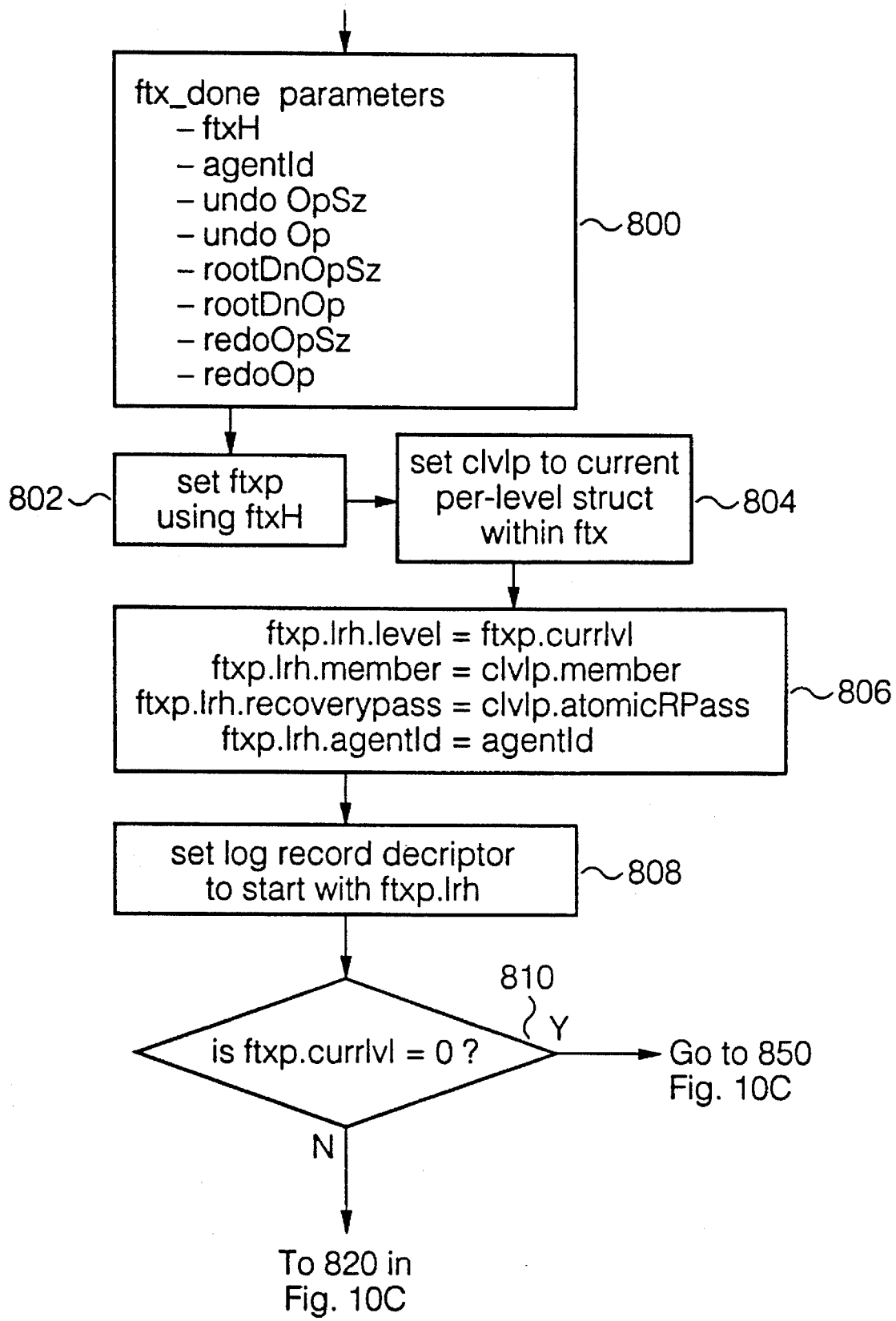
FIGS. 10A–10E are a flowchart depicting the ftx_done service, according to the present invention.

The ftx_done service commences with step 800, FIG. 10A. As shown by step 800, the routine commences by obtaining or calling several internal "handshaking" routines corresponding to APPENDIX 1, 33:554-563. These routines are used with certain parameters for the undo, rootdone and redo routines. In the presently preferred embodiment, all parameters are examined, with a return of 0 denoting the absence of a parameter.

As indicated by step 800 and APPENDIX 1, 33:555, the relevant parameters include a transaction handle (ftxH), an agent identification that uniquely identifies a particular set of undo, rootdone and redo routines (not all of which need be present), and an undo operation size (undoOpSz). The undoOpSz parameters provides the byte count size of an undo record that is pointed to by a following undoOp parameter. A rootdone operation size (rootdoneOpSz) parameter is similar to rootdone, and represents the size of a record or particular set of bytes, the start of which is pointed to by rootDnOp. A redo operation size parameter (redoOpSz) represents the size of the record being pointed to, the address for which is provided by a following redo operation parameter (redoOp).

As shown by step 802, the routine performs certain tasks of a bookkeeping nature. Using the ftx handle (ftxH), a temporary pointer (ftxp) is internally set to point to the in-memory ftx structure for this particular transaction tree, depicted as 400 in FIG. 6, see APPENDIX 1, 34:592.

It is important to appreciate that in a transaction ftx tree there are many possible levels, the structure for but one such level being depicted in FIG. 10A. In another bookkeeping type step, depicted by step 804, a current level pointer (clvlp, FIG. 6) is set to the current active nested structure within the ftx structure holding a parameter set for the current level. (Appendix 1 does not include the corresponding code, the implementation for which step 804 is obvious to one skilled in the relevant art.) It will be recalled from the description of the in-memory data structure depicted in FIG. 6, that fields 402 are repeated for each level in the ftx tree.

As depicted in FIG. 5, the on-disk log record (ftxLog) includes a fixed header portion 302 of the log record to be logged for each successful transaction. When a transaction is started, as shown by step 806, the routine first initializes various fields to setup the fixed part of the log header.

With respect to the ftx structure of FIG. 6, the log record header (lrh) field 412 is a complex structure representing the first set of fields 302 in the ftx_done record header of FIG. 5. With respect to the complex structures represented by step 806, notation of the type ftxp.lrh.level denotes a field level within the log record header structure within the ftx structure. The field set initialized at step 806 includes the level, where level 0 denotes a root transaction). The member is initialized from the member field in the in the current level structure within the ftx. The recovery pass is similarly initialized from the atomic recovery pass field within the current level. (These parameters were initialized at start of transaction.)

As shown by step 806 of FIG. 10A, the routine logs the agent identification field in the log record header 412 in the in-memory structure of FIG. 6, where the agent identification parameter causes initialization. See APPENDIX 1, 34:618-621.

Step 808 in FIG. 10A concerns with the interface to the logger. Preferably the logger interface is a vector of up-pieces that preferably eliminates the necessity to copy an entire record into one location for contiguous record persistent storage. Preferably a record is typically described piecewise, where the first piece is always the log record header (lrh) that is built in the ftx structure itself. Step 808 represents a vector of part that is denoted the log record descriptor and ultimately defines the on-disk log record depicted in FIG. 5.

As shown in step 808, the routine sets the log record descriptor so its first part within the ftx structure is indeed the log record header (lrh), see APPENDIX 1, 34:627-630. For each piece of the log there is a count field (advising how many pieces comprise the record to be collected) and a pointer, see code lines 629-630. Initialization is to zero if the count field and pointer are the first elements.

In FIG. 10A, according to step 810 the routine tests whether the current level is zero to determine whether a root transaction or a subtransaction is being completed. If zero, the operation branches to step 820 in FIG. 10C for root transaction completion. If non-zero, a subtransaction is being completed, and the operation branches to step 820 in FIG. 10B.

Assume first that step 810 determines a subtransaction is being completed. The relevant code appears in APPENDIX 1, 37:773 and a size parameter test at step 820 in FIG. 10B determines whether an undo record is present. If so, an undo record is being passed to this routine and step 822 adds a description of that undo record to the log descriptor. The relevant subroutine is denoted addone_undo and is found at APPENDIX 1, 53:1718. Code line 1773 sets the undo record byte count field in the log record header to the value of that count (where 0 denotes not present, and a non-0 value means data will follow as depicted in FIG. 5).

Regardless of the determination of step 820, the operation eventually passes to step 824, and a determination is made as to whether a root done record is being specified by this particular subtransaction completion. If yes (i.e., size≠0) the root done operational record is added to the log descriptor by step 826 (APPENDIX 1, 54:1774, addone_rtdn).

Figure 10B:
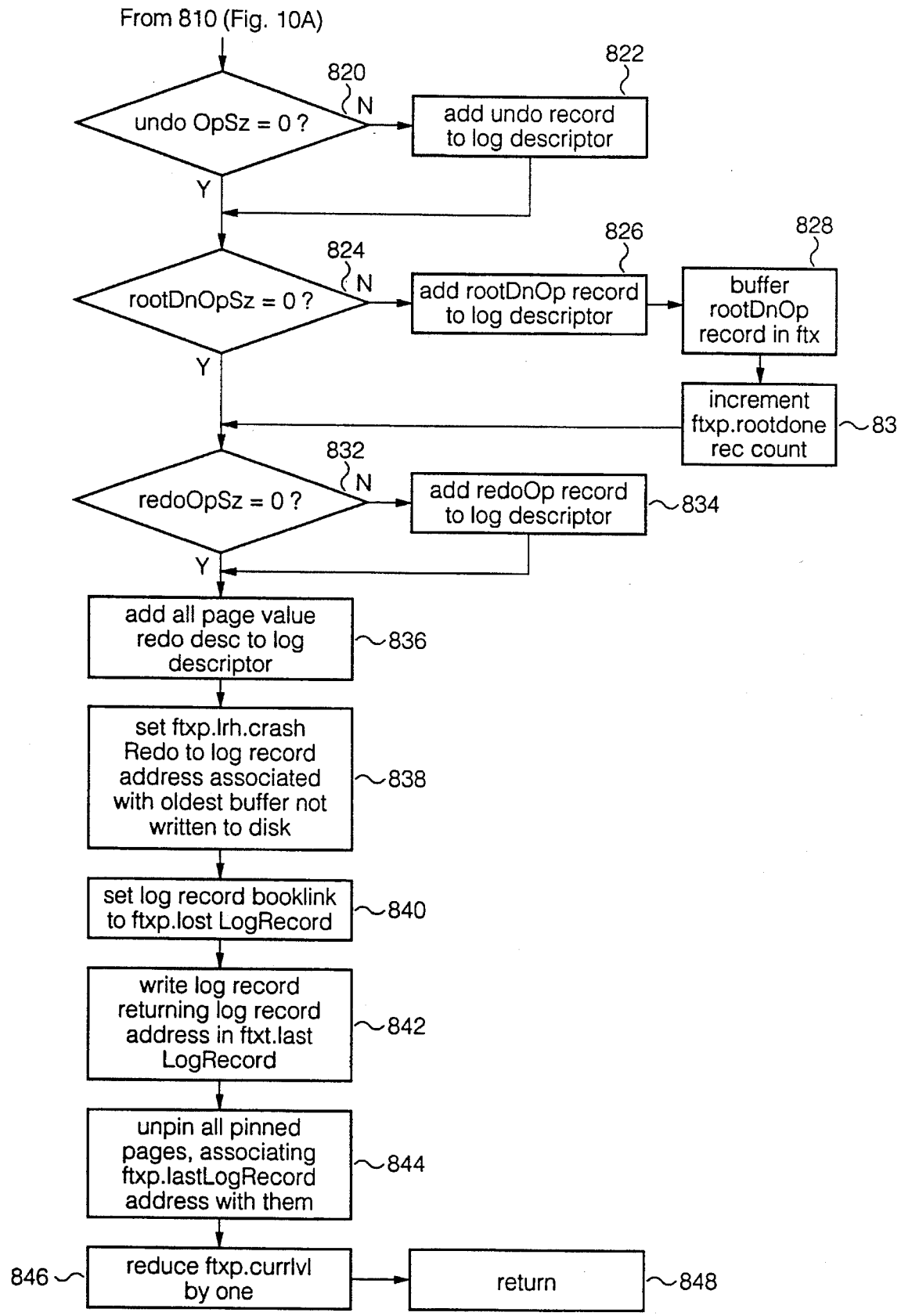

In FIG. 10B, as shown by steps 828 and 830, a buffer subroutine makes a copy of the record in memory in the ftx structure, resulting in the optional rootdone records 432 and 434 depicted at the lower portion of the in-memory ftx structure of FIG. 6. Steps 828, 830 also buffer a copy of the root done operation record in the ftx structure, and increment the root done record count field 430 in the in-memory ftx structure depicted in FIG. 6.

Regardless of step 824's determination, the procedure eventually progresses to step 832, which tests whether a redo operational record is present, APPENDIX 1, 37:785. If present, a redo operation record descriptor is added and is caused to be written as part of the log record. Note that for undo, rootdone and redo records that are present, steps 820-834 cause the records to be added to the log record; if not present, the log record is initialized to reflect their absence.

The routine at step 836 performs an important task, essentially describing the redo information by adding all page value redo descriptors to the log descriptor, thus logging the redo information. In APPENDIX 1, 37:791 an add done record redo subroutine is called, the subroutine appearing at APPENDIX 1, 55:1821-1864. At step 836, the routine causes the page value redo descriptor information, which was built-up with the sequence of pin_page and pin_record calls, to be described as part of the log record. These pin records are the redo information that, in conjunction with pin page information, describes what has been modified by this transaction.

Note that the in-memory version of the redo information in the in-memory ftx structure of FIG. 6 (page 2) is the log header information. In practice, most of this routine points to structures in memory that will get copied to the log. However, preferably an additional element is added to the log descriptor to cause the actual data in the pinned page to be logged. The data to be thus logged is the modified data in the page described by the pinned record extents, for example data 344 in the on-disk log record of FIG. 5.

This routine also builds into the log record the page update headers (e.g., header 332 in FIG. 5). Thus with respect to header 332 in FIG. 5, the bitfile identification 336 and bitfile page 338 information is provided by the relevant pin page descriptor, while the extent count 340 field is provided by the in-memory ftx structure of FIG. 6. Additional extents may follow as shown in FIG. 5 (e.g., 344), and for each such extent there is byte offset and byte count, which information was stored due to the pin_record service. For each pinned page described by such additional extents, there will now appear in the log the actual data corresponding to such pinned pages, which data is not found in the in-memory structure of FIG. 6. Thus, in step 836 in FIG. 10B, what is now being updated appears similar to the in-memory structure of FIG. 6 updated by the pin_record service. The difference, however, is that now the logger is advised how to find and copy into the log the associated data per se.

In FIG. 10B, at step 838 the routine sets the log record header's crash redo field to the log record address associated with the oldest buffer not written to disk, see APPENDIX 1, 56:1899. A relevant log done record and unpin page subroutine is called at APPENDIX 1, 37:802, and appears at APPENDIX 1, 56:1882.

In the following description, it should be emphasized that while modified pages eventually get written to persistent storage by a buffer manager, they are not necessarily immediately written to disk. At step 840, the procedure sets the log record backlink to the last log record field in the ftx structure, essentially by passing a parameter into the logger write call. The call that actually writes the log record from the descriptor thus constructed may be found in APPENDIX 1, 56:1910-1915.

Preferably the last log record parameter is the address of an earlier log record to which it will link backwards. This backlinkage defines the backward order in which the log records can be read, and is especially important with respect to the code that fails the transaction. In overview, the undo backlink field advises to what previous link the present record should be backlinked. Before calling the undo backlink subroutine (APPENDIX 1, 37:793), the undo backlink field is set to the current value existing before the logger routine was called. Note that at step 506 during the ftx_start service (FIG. 7A), the current value of the last log record (ftxp.lastLogRecord) was preferably set to nil at the start of the transaction. This ensures that no backlink exists at the transaction start. Thus, the very first time a log record is actually written, the value of the ftxp.lastLogRecord field is properly nil.

As described earlier, modified data may have hierarchial dependency relationships. However, while backlinkage of logged records properly reflects a sequence for postorder linkage of logged records associated with modified data, backlinkage alone does not ensure a proper sequence to preserve modified data dependency. Preserving such data dependency is a function of the recovery pass number aspect of the present invention.

As shown by step 842, the log record is actually written as part of the call appearing in APPENDIX 1, 56:1910. The log record address (or unique identifier) for the log record just written in this last log record field in (ftxp.lastLogRecord is also returned. When the log record eventually gets written, the ftxp.lastLogRecord field will have the value of the current, just-written, field. When the next done record subtransaction for this transaction is written, it will set the backlink field to this record. In this fashion, each successive record that gets written to the log will point (or backlink) to the previously written record.

After the ftx transaction is completely done, the routine at step 844 in FIG. 10B unpins all pages pinned at the start of the transaction by the rbf_pinpg service depicted in FIG. 8, see APPENDIX 1, 57:1982. Unpinning allows these pages to be written back to persistent storage, a procedure not possible during pinning. Preferably the unpinned pages need not be immediately written to persistent storage.

The routine at step 844 associates the last log record address with each unpinned page, i.e., the log record address of the log record just written. This is important because the DASUM-provided buffer manager that will eventually write these modified pages to persistent storage will track this log record address individually with each buffer. In essence, the same address may be associated with a set of pages, and at some future time a different address may be given to the same pages.

Preferably the buffer manager tracks the first time the oldest log address was associated with any given modified page, as well as when modified pages are actually written to persistent storage. As such, the buffer manager always knows the oldest log record address that has not been written for any modified buffer. The buffer manager returns this information in step 838 in FIG. 10B, namely the log record address associated with the oldest buffer that has not yet been written to disk. At step 840, the oldest buffer not yet written to disk is returned, and is referred to in step 844 as the oldest buffer being released. At step 844, this buffer is given a log record address that was returned in step 838. The relevant source code begins at APPENDIX 1, 57:1954 and shows a loop traversing this structure. The modified pages are released at code line 1982, with the subroutine at code line 1983 being passed the last log record address. At step 846, the routine reduces the current level number for this transaction by one, and at step 848 the routine exits (see APPENDIX 1, 37:806).

The ftx_done service description thus far assumed the routine at step 810 in FIG. 10A determined that the current level was not zero, i.e., what was being completed was a subtransaction. Assume now that a root transaction is being completed. Thus at step 810, the routine determines the current level is zero, and leads the procedure to step 850 on FIG. 10C, the relevant code for which appears at APPENDIX 1, 35:647. Because this is a root transaction that commits upon completion, there is no undo procedure. Thus at step 850, the routine zeroes out the undo record byte count field in the log record header. As will be described later, according to the present invention, only subtransactions create nodes requiring the undo procedure.

Step 852 essentially duplicates the subtransaction procedures of steps 824-836 inclusive (from FIG. 10B) since a root transaction completion is similar. The relevant code may be found at APPENDIX 1, 35:651-653.

At step 854, the rootdone and the redo operational records are added to the log record descriptor, which descriptors may in fact not be present as they are optional. For the case of a rootdone record, this information preferably is also buffered in the structure (as will be described).

At the start of a transaction (a root transaction in the present case), the root done record count field is initialized to zero. If any rootdone records have been buffered, this field will no longer be zero, which is how the routine at step 854 determines whether any rootdone records have been buffered.

In the present case, if the rootdone record count is zero, at step 856 the routine sets the member field for the current level (e.g., 0 for a root transaction). But if the rootdone record count is not zero, then at step 858, the member field is set to one. Thus there is a slight change from the subtransaction case as to how a member number is determined. At steps 856 and 858, the member field in the log record header in the ftx structure is read (see APPENDIX 1, 35:672-673).

At step 860, the procedure shown for a subtransaction case in steps 838-844 inclusive is repeated, which basically makes a call to the log done record and unpin routine. Up to this point, the appropriate records are buffered and have actually written the log record.

While thus far there has been some similarity between the subtransaction and the transaction ftx_done procedures, a substantial difference now occurs. At step 862 in FIG. 10C, the routine tests whether any rootdone records were in fact buffered. This test is made by examining the rootdone record count, APPENDIX 1, 35:689. In the presently preferred embodiment, what is counted is an offset into the buffered area, which gives a total size of all buffered records, rather than the number of records per se. If the rootdone record count size is non-zero, then there are records to deal with.

If this field is zero, buffering has not occurred, and the procedure at step 864 de-allocates the ftx structure and its handle. At step 866, the routine returns to the caller, having completed the ftx_done procedure.

Detailed Description of the ftx_rootdone Agent Procedure(s)

However if rootdone buffering has occurred, the routine proceeds to step 868, to generate additional log records. At this juncture it is helpful to examine FIG. 11A, which pertains to the generation of the redo log by the ftx_rootdone agent procedure(s).

FIG. 11A depicts a tree comprising a root transaction (0,0) and three subtransactions (1,1), (1,2) and (1,3), with further child transactions (2,1) and (2,2). Also shown are square steps that specify associated rootdone records, denoted A, B, C, D. As depicted, subtransaction (2,2) specifies rootdone A, (1,1) specifies rootdone B, (1,3) specifies rootdone C, and (0,0) specifies rootdone D. The nomenclature used here for a totally complete root transaction is (0,0) rather than (0,1).

What will be logged here is first a series of level 0 records, with the "extra" records reflecting logged rootdone records A, B, C, D. The first record is (0,1), which if written will commit the entire tree, causing execution of rootdone procedure A, the first buffered rootdone procedure. But if this first (0,1) record does not get written, a rollback ensues.

In a normal completion case, once the (0,1) record is written (thus signifying commitment), the agent rootdone procedure is executed for A, the first buffered record. For each subtransaction, the rootdone being buffered and logged is a record such as A. In time sequence, the logging sequence for these records is preferably postorder as follows: (level number, member number) (2,1), (2,2), (1,1), (1,2), (1,3), (0,1), (0,2) which will contain record redo from execution of rootdone record A, (0,3) which will contain record redo from execution of rootdone record B, (0,4) which will contains record redo from execution of rootdone record C, and (0,0) which will contain record redo from execution of rootdone record D. Of course, a preorder sequence could also be used.

For each subtransaction, the rootdone record is what was buffered and logged as part of that subtransaction record. Rootdone record A is buffered and written as (2,2) was written, rootdone record B as (1,1) was written, rootdone record C was buffered and written with the log record that logged (1,3), and D was logged with the (0,1) record. Note the nomenclature difference after node (1,3): when the root transaction is totally complete it is denoted (0,0) rather than (0,1) as previously described.

Next seen is a sequence noted as (0,2), the record redo resulting from the execution of A, (0,3) record redo resulting from the execution of B, (0,4) the record redo resulting from the execution of C, and (0,0) the record redo resulting from the execution of D. The (0,0) record redo is the record tested in FIG. 10C at step 854 to learn the final member number. In FIG. 11A, the final redo record for the final rootdone record to be written is D (0,0), which (0,0) signifies that the entire transaction is complete for the final rootdone. It is appreciated that all transactions are separate and independent until final rootdone procedure.

Figure 10C:
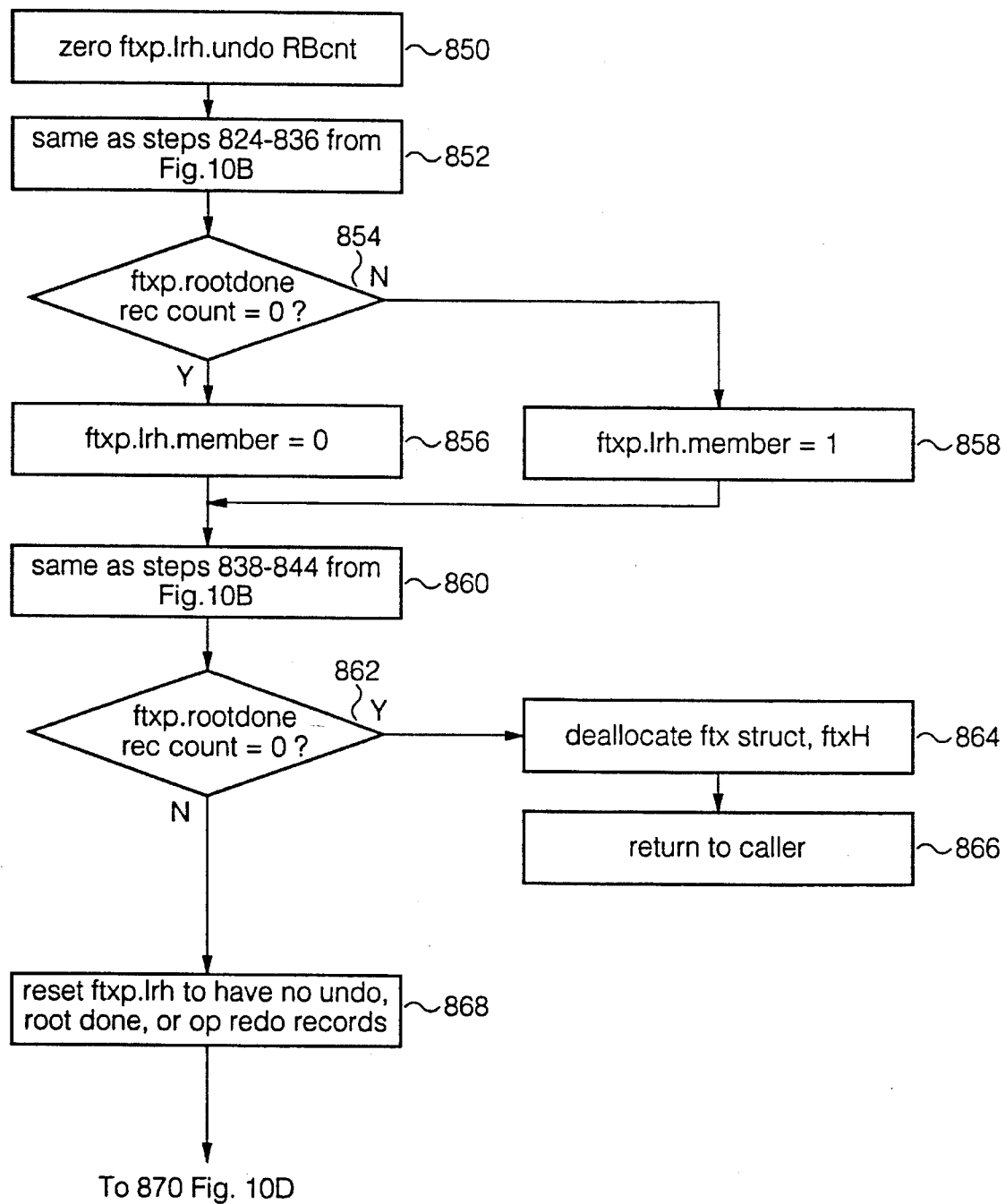

The relevant code executes these agent rootdone procedures and logs the above-described additional rootdone records, resulting in ftx_done as depicted in FIG. 10C at step 868. Additional root records are logged with the same ftx structure log record header. The ftxp.lrh field is reset to note that there are no undo, rootdone or op redo records for these rootdone execution records.

With further reference to FIG. 10C, during the replication shown at step 860, the completion record is written, namely (0,0) signifying no rootdone to do, or (0,1) signifying that rootdone will follow.

If the procedure leads to step 868, then there is rootdone to follow. In the present example, what was logged in step 860 is a done record noted as (0,1). Step 868 further resets various fields that appear in APPENDIX 1, 36:701-703.

Referring now to FIG. 10C, at step 870 the procedure initializes a variable to +1 because in the presently preferred embodiment, the rootdone done count variable does not exist in the code (APPENDIX 1). Instead, a check is made to determine whether the process should be in this buffered area.

Figure 10D:
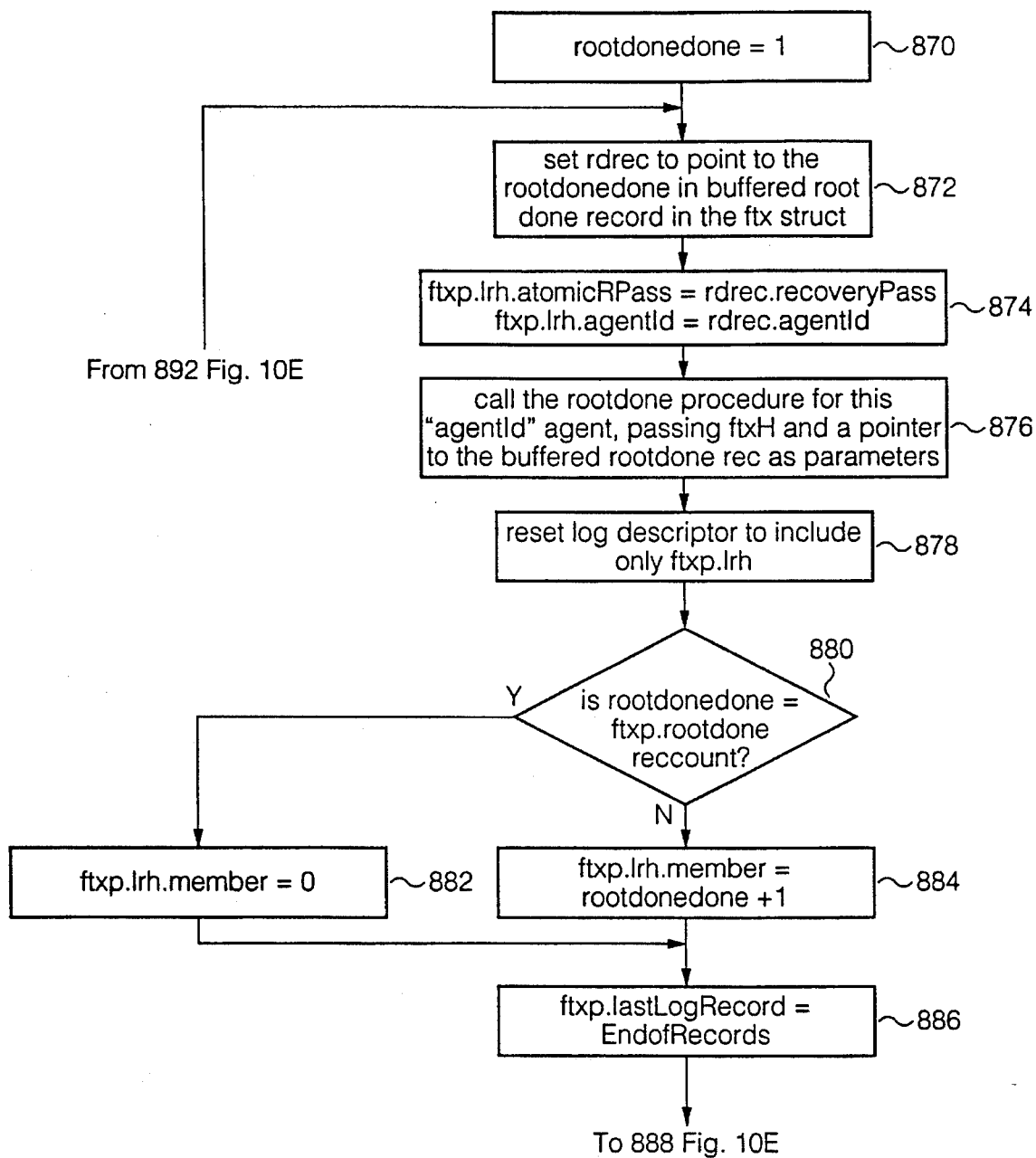
Figure 10E:
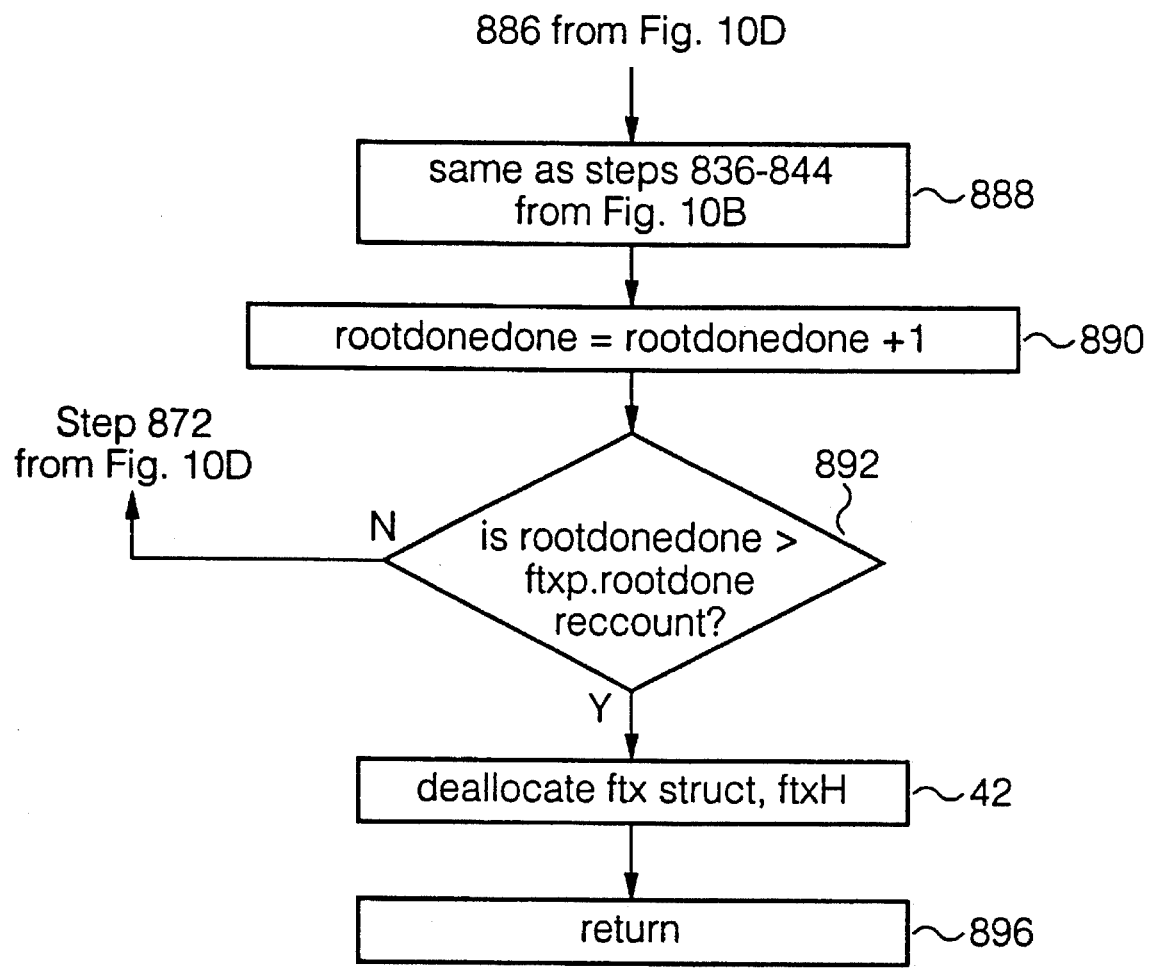

In FIG. 10D, at step 872, this temporary rootdone record variable (rdrec) is assigned to be a pointer to the rootdone done$_{th}$ buffered rootdone record in the ftx structure. As such, the rdrec field points to the first buffered rootdone record in the ftx structure due to the variable allocation and initialization executed at APPENDIX 1, 36:706. With reference to FIG. 6, the rdrec field points to the first of N rootdone records at 422.

In FIG. 10C, at step 874 the routine initializes fields in the log record header: the atomic r pass field from the recovery pass field in the buffered rootdone record, and the agent id field in the buffered rootdone record. This initialization occurs in step 828 (FIG. 10B) when the rootdone record is first buffered. See APPENDIX 1, 36:714-715.

At step 876 in FIG. 10D, the particular rootdone procedure for the specific agent is called. As earlier noted, there are 0 or 1 rootdone records associated with each subtransaction or node in a transaction tree, where each node is associated with a single agent. Thanks to earlier performed bookkeeping, at step 876 in the procedure, it is known what agent specified a particular rootdone record. A pointer to the particular rootdone procedure is called in code lines 710–719, the call being made with the same record that was passed as part of the ftx_done call for the specifying subtransaction. The called rootdone procedure for the particular agent passed the transaction handle and a pointer to the buffered rootdone record that originally was passed in by the agent. It is not necessary to actually interpret the contents of the record being passed on this call. The corresponding code may be found at APPENDIX 1,36:719.

Referring to FIG. 10D, at step 876 the rootdone procedure can make calls to the rbf_pin_page and rbf_pin_record services, and make additional modifications to data, just as in a transaction. At indicated by code line 719, after return from the present call, potentially more data will be present for logging.

In FIG. 10D at step 878, the log record is here written (see also FIGS. 11A, 11B). The same log descriptors previously used are reset to ensure proper bookkeeping.

At step 880, the routine tests whether the just executed rootdone record is the last record buffered. If so (step 882), the appropriate member field in the log record header is set to zero because the last record written should be removed (e.g., (0,0)). But if step 884 determines the just executed rootdone record not to be the last record buffered, then the appropriate member field in the log record header is set to rootdone record count +1. Thus, if there are two records and the rootdone record in question is the first buffered (as opposed to the last buffered) the field level and member number designation will be (0,2).

In FIG. 10D, at step 886 the procedure sets the last log record to null for all log records written because of rootdone records. The procedure then executes the same sequences of steps (836–844, FIG. 10B) as were followed for a subtransaction, and makes the last log record the backlink. Otherwise, having no backlink, such records would not become backlinked elsewhere.

At step 890 the routine temporarily increments rootdone done and at step 892 tests to see if it exceeds the total number of buffered records. The corresponding code is not shown in APPENDIX 1, but will be apparent to anyone skilled in the relevant art. If the answer to step 892's test is "NO", then additional processing must be done and the routine is returned to step 872 (FIG. 10D). On the other hand, if the routine at step 892 determines no further processing is required, at step 42 the ftx structure (and its handle) is deallocated. Next, at step 896, the ftx_done routine returns to the caller, its task complete.

Detailed Description of the ftx_fail Service

FIGS. 11B–11E depict the ftx_fail service, the relevant code for which may be found starting at APPENDIX 1, 38:850. At step 900, the routine obtains a transaction handle ftxH parameter and a recovery pass atomicRpass parameter. At step 902 routing bookkeeping uses the ftxH handle to fix a ftxp pointer to the current ftx structure, while clvlp represents another pointer to the current level structure. It is understood that the current level structure is the structure indexed by the ftx current level parameter. See APPENDIX 1, 886-895.

At step 904, the undo backlink variable is set to the field within the ftx structure, and initially is set to the ftx's last log reference field (see APPENDIX 1, 39:939). At step 906 the routine tests whether the undo backlink is the end of record. In the preferred code implementation (APPENDIX 1, 39:941), the end of record parameter is a constant which, when reached, signifies no more backlinks exist, whereupon this particular loop terminates.

If the end of record was not reached, at step 908 the routines reads the log record from the logger at the log address undo backlink. It will be recalled that the undo backlink is an address of a record in the log, which address is interpreted by the logger. In slight deviation to the code in APPENDIX 1, 40:945-950, the log record at that address is returned in the doneRec variable, and the next back link address is returned in undoBackLink. Thus, not only is a specific address in the logger read, but there is returned in the same variable an address representing the next log record to be read in the backwards direction. It will be noted that when the done record (doneRec) was written, a backlink address was established within the logger, namely the address of a previous record. It is that previous record that is now returned as undoBackLink. In essence, the logger is told what record to backlink to, and when records are read from the logger, the logger provides the backlink record in a record called doneRec. Other methods could also be used to implement this feature. Applicable code can be found at APPENDIX 1.

It is helpful at this point to divert briefly to FIG. 11B to appreciate an overview of the ftx_fail service in terms of what gets written to the log. FIG. 11B depicts a transaction tree that is somewhat similar to what is shown in FIG. 11A with respect to logging a root done execution. In FIG. 11B, boxes U1, U2, U3, U4 are depicted adjacent nodes representing sub-transactions that did in fact specify undo information. It will be recalled from FIGS. 10A–10E that the ftx_done procedure does not necessarily specify undo on every sub-transaction, undo specification being optional on a per sub-transaction basis.

With reference to FIG. 11B, for normal processing, the log will contain first the done record for (2,1), then (2,2), (1,1), (1,2), (2,3) and finally (1,3). Assume that just before issuing an ftx_done call for the root transaction (0,0) and completing the entire tree there is instead executed the ftx_fail service.

According to the present invention, ftx_fail will traverse the tree-like structure in the reverse order of creation. Further, for any node with an undo record logged to it, ftx_fail will execute that undo information (undo op) and log the execution effects undo op as record redo. What gets written to the log record are more ftxLog records, namely one record for each subtransaction that had undo information executed.

Preferably the records are written with the same member number, but with a level number that is the negative or inverse of the original sub-transaction level number. Thus, in the example of FIG. 11B, it is now assumed that in the course of traversing the tree and before a write or before node (0,0) could be declared done, that the ftx_fail service was called.

At this juncture, the tree is traversed in reverse order. In FIG. 11B, the first node encountered having undo record information written to the log is (1,3). Accordingly U4 is executed, and typically record redo information will be generated as a result. Another log record will be written noted as (−1,+3) with a backlink to (2,3). Following this backlink, the ftx_fail routine traversing backwards through U3's undo, which upon execution generates a log record (−2,+3) that is backlinked to (1,2). Upon reaching (1,2) no undo information is found, and the procedure continues to (1,1), whereupon U2 is executed, generating a record redo and writing a log record (−1,+1) with a backlink to (2,2). Similarly (2,2)'s undo U1 is executed, generating a record redo done record (−2,2) with a backlink to (2,1). When the process is finally done, a (0,0) null record is written, which signifies no further recovery is to be done. Thus, since no further recovery exists, the transaction is completely done.

To recapitulate, when ftx_fail is called, an undo agent procedure for each completed subtransaction is caused to be called and executed. Essentially, the undo information is converted into record redo information for which an ftxLog record is logged. It is important to note that once an undo operation has been executed and the information logged, the undo will no longer be executed as undo. Instead, the undo is converted to redo, to be thereafter recovered as redo.

Returning now to FIG. 11C, at step 910 (APPENDIX 1, 40:1003) the routine tests whether the level record of the just-read done record is less than zero. If yes, no undo is executed for the record and we are returned to step 906 to determine whether the undoBackLink is the end record. If so, the routine branches to step 934 in FIG. 11E, otherwise the routine returns to step 908.

However if step 910 determines that the level record is not negative (e.g., if it indeed is a done record resulting from a prior undo) the record is skipped, and the backlinkage preferably is further followed. In another implementation, skipping this record could be avoided since there is no associated undo to be executed.

Figure 11C:
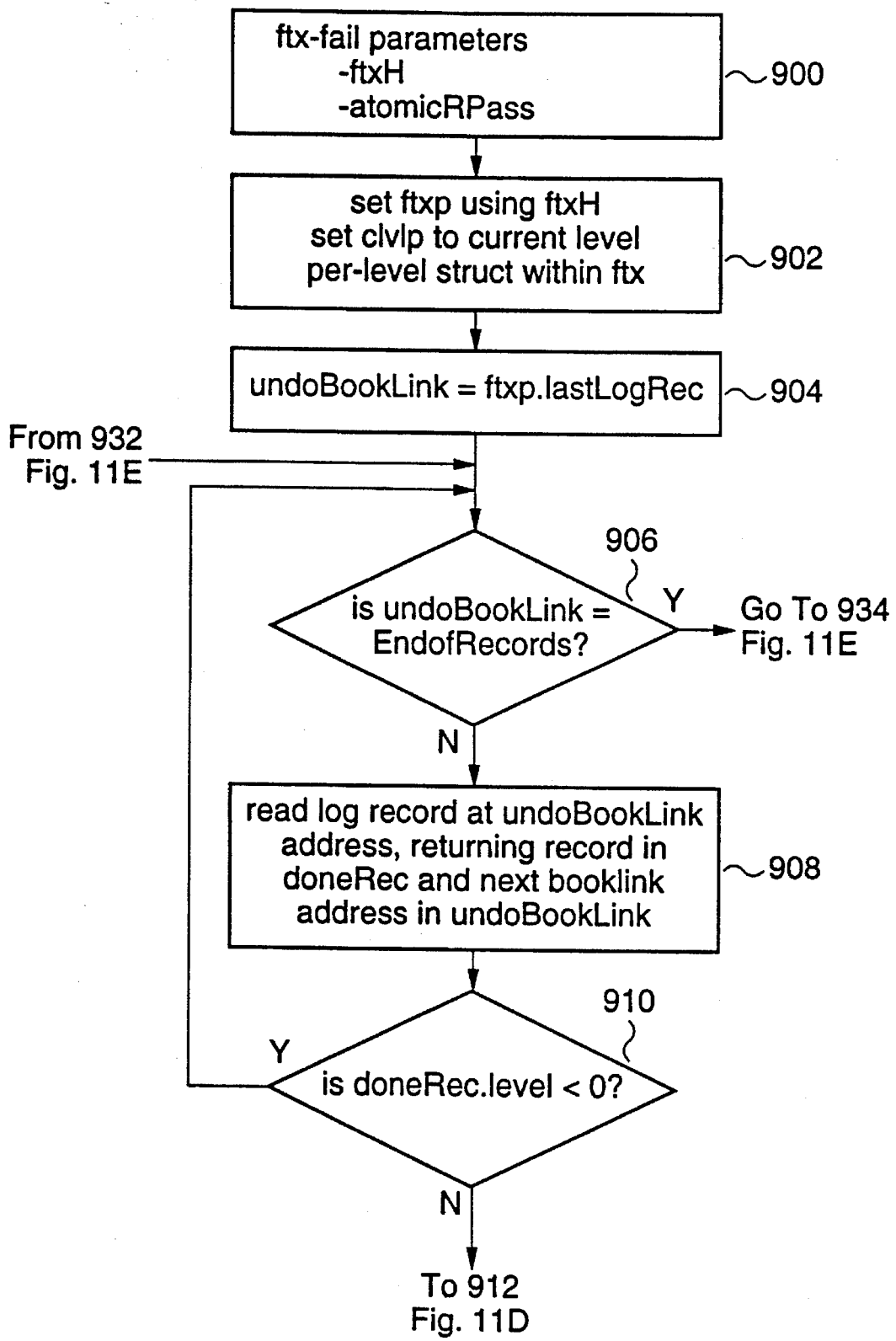
FIGS. 11C–11F are a flowchart depicting the ftx_fail service, according to the present invention.
Figure 11D:
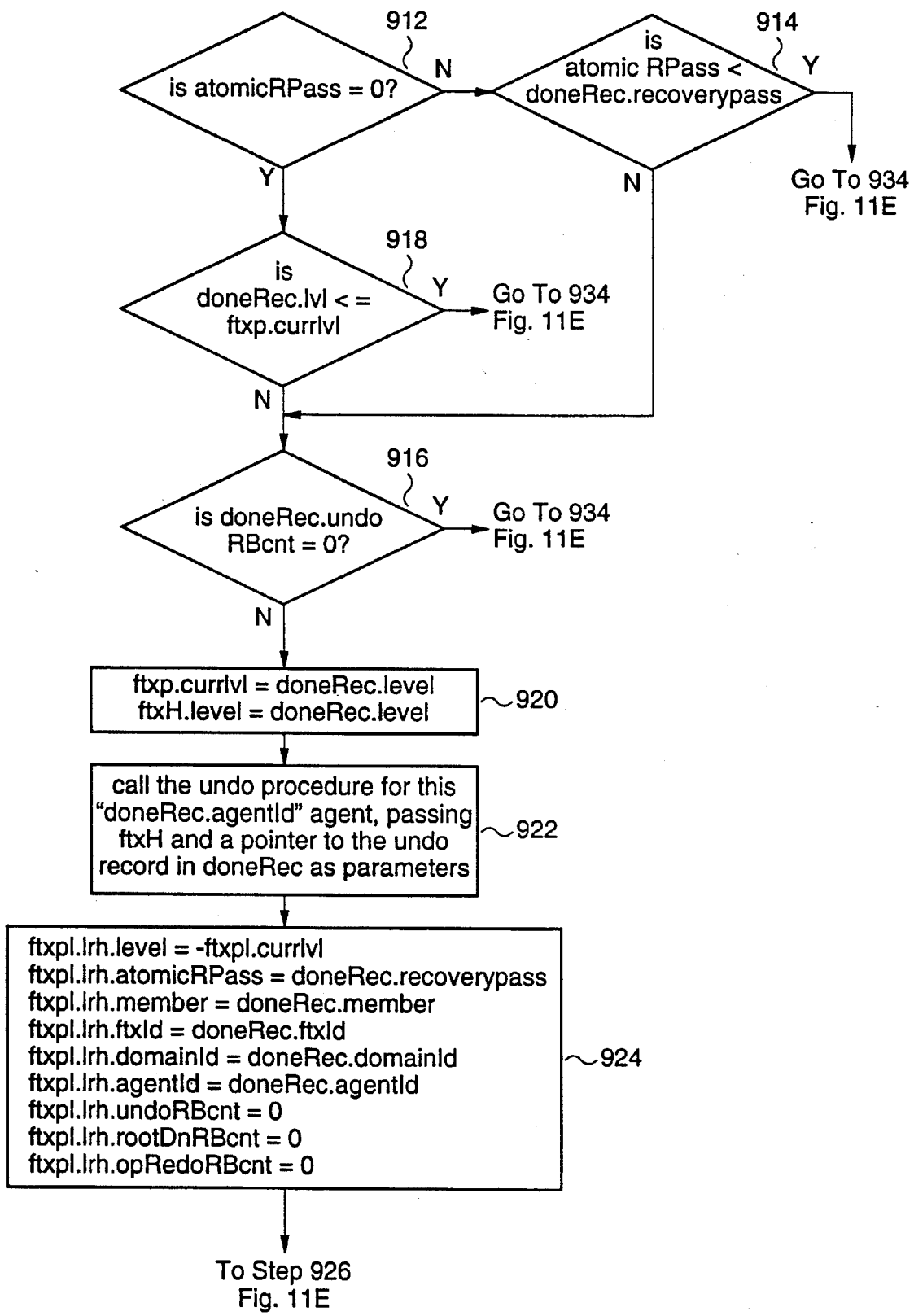

In FIG. 11D, the routine at step 912 tests whether the recovery pass atomic r pass parameter was zero, the relevant code appearing in APPENDIX 1, 41:1022. If not zero, a further test is made at step 914 to determine if the specific atomic recovery pass parameter is less than the recovery pass parameter for the just-read record. If yes, the routine branches to step 934 in FIG. 11E, otherwise the routine continues to step 916. If the atomic recovery pass parameter is zero, the routine leads to step 918 to test whether the just-read record's level is less than the transaction structure's current level. If yes, the routine branches to step 934 in FIG. 11E where the sequence will eventually terminate.

At step 916, by testing for a zero count field the routine knows whether the done record includes an undo record. A zero count signifies no undo record, in which case the routine branches to step 934 in FIG. 11E for eventual termination (see APPENDIX 1, 41:1038). A non-zero field result at step 916 means there is an undo record (APPENDIX 1, 41:1041) in which case the routine branches to step 920 where routine bookkeeping sets the field levels to the current value for the record at hand (APPENDIX 1, 41:1060-1061).

After the bookkeeping chores of step 920 are complete, at step 922 the routine calls the undo procedure for those agents specified in the done record at hand (APPENDIX 1, 41:1066). At step 922, the routine passes in the ftx transaction handle and a pointer to the undo record in the done record. It will be recalled that the undo record that was passed on an original ftx_done call exists as part of the log record. As noted earlier, the ftx_undo, ftx_rootdone and ftx_redo procedure are agent-specific. With respect to FIG. 11D, step 922, the undo routine is now called via a pointer to the data in that record for the relevant agent (APPENDIX 1, 41:1042 denotes the agent).

Step 924 represents bookkeeping tasks that setup a log record header. Having thus executed an undo routine, a log record is now written as a redo record to reflect what occurred in the undo routine. An initial function at step 924 sets the field level to the inverse of the level of the original done record. Preferably the remaining parameters are simply copied from the done record, and the relevant undo, rootdone and op redo byte count portions of the done record are set to zero (since undo, rootdone and op redo are not present). See APPENDIX 1, 42:1081-1089.

Figure 11E:
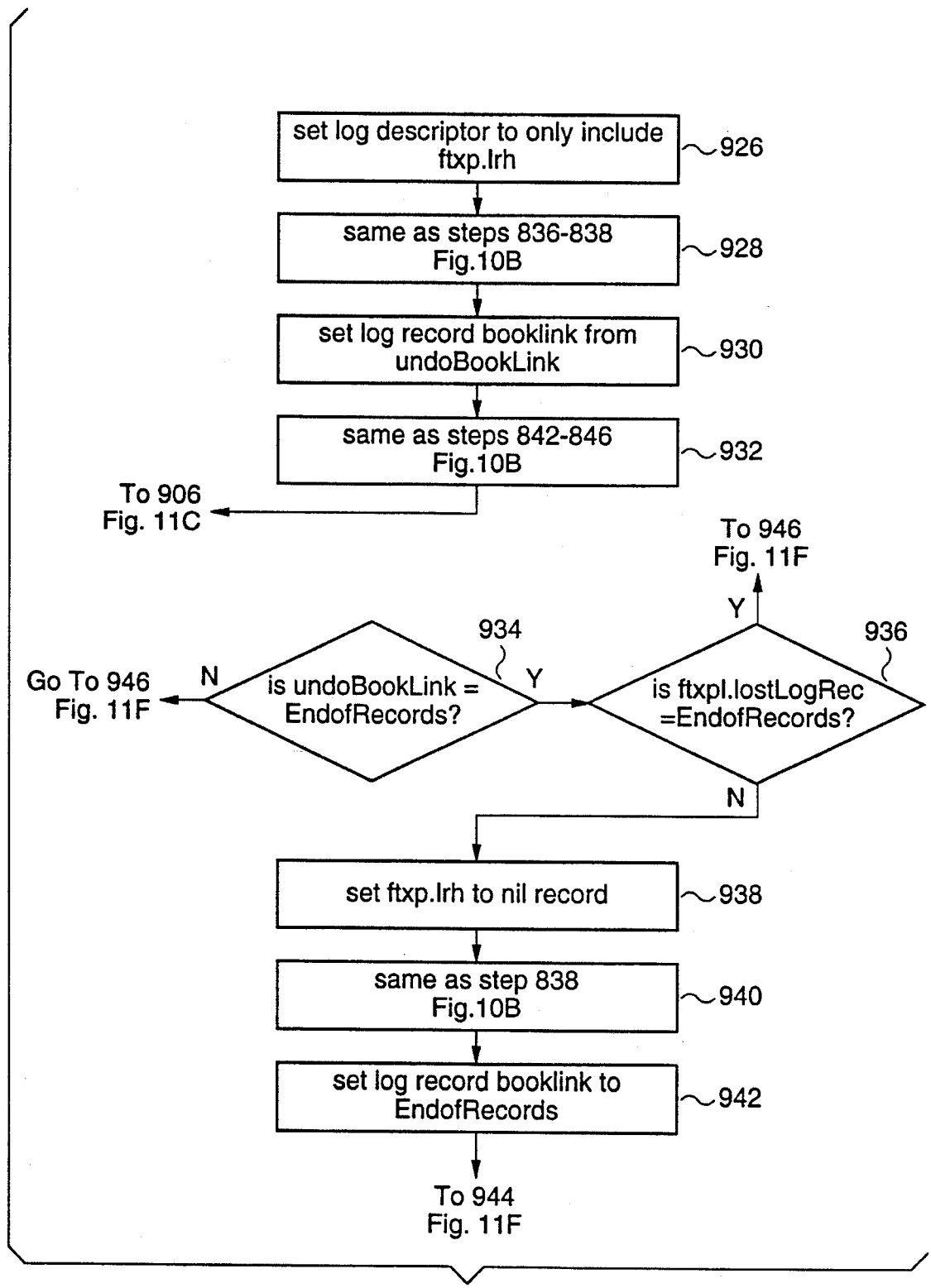

In FIG. 11E, further bookkeeping is done at step 926 causing the log descriptor to point to the log record header in the ftx structure (APPENDIX 1, 42:1096-1099). At step 928, the page value redo descriptor information and the done record redo subroutine are advantageously added by copying steps 836-838 (FIG. 10B). (APPENDIX 1, 42:1103). The crash redo field is thus set to a value associated with the oldest buffer not yet written.

At step 930, the routine uses the undo backlink variable to set the log record backlink and at step 932, steps 842-846 (FIG. 10B) are copied, which action writes the log record and unpins pages previously pinned by the undo routine.

As depicted by FIG. 11C, the routine next goes to step 906 and the loop is reexecuted until a test result branches to step 934. At step 934 (Appendix 1, 43:1129-1130), a test determines whether all done records for the transaction tree have been exhausted (e.g., processing could have terminated for other reasons).

According to the presently preferred embodiment, if the ftx_fail service is called with the atomic recovery pass parameter set to zero, the routine will only fail back to the current level. If the current level is indeed zero, then ftx_fail will have failed the entire transaction tree. Further, even if the system crashes when the transaction tree has been partially undone, ftx_fail ensures that the undo procedure will be fully completed. In FIG. 11B, assume that the ftx_fail service was called at a point where the procedure had nearly traversed the tree, completing node (2,3) but before ftx_done could be called for node (1,3). The result would be that ftx_fail would execute undo only for (2,3) and would not back out the rest of the nodes. However upon being called again, ftx_fail would eventually complete all of the nodes. However any sub-transaction that is not a root will back out only to its current level, for reasons having to do with the invention's ability to partially fail the transaction tree without failing the whole tree, and for reasons having to do with the ftx_recovery service (to be described).

At step 936 a determination is made as to whether the entire tree has been failed, in which case the procedure branches to step 946 (FIG. 11F), eliminating further steps. However, if the entire transaction has not failed, the routine branches to step 938. At step 938, the log record header is again initialized to nil (APPENDIX 1, 43:1136-1144). At step 940 step 838 (FIG. 10B) is copied to establish a crash redo address. At step 942 the log record backlink is set to the end of record.

Figure 11F:
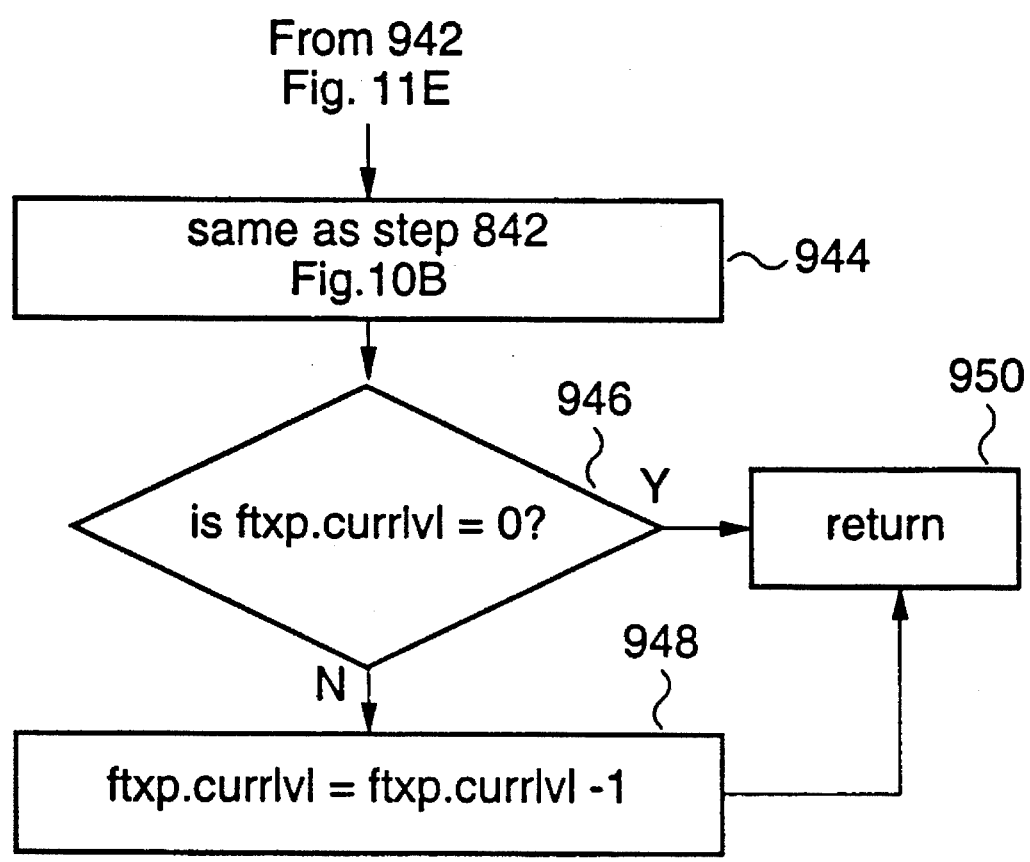

In FIG. 11F, at step 23 the log record is written. At step 24, if the current level is zero, the process is done. If non-zero, the level is decremented by one and the routine returns to the caller.

Detailed Description of the ftx_recovery Service

The ftx_recovery service will now be described with reference to FIGS. 12A-12E, and with respect to APPENDIX 1, commencing with page 69. This service recovers persistently logged information in the event of a system failure or crash, and then essentially reexecutes the information. While FIGS. 12A-12E depict a recovery service that makes n recovery passes, the preferred embodiment (as exemplified by the relevant code in APPENDIX 1) makes n=2 recovery passes (as will be described).

The present invention has a recovery granularity based upon a single log per domain. Thus in FIG. 12A, at step 1000, the routine has but one parameter to recover, namely the identify of the domain being recovered. In the preferred embodiment (APPENDIX 1, 74:246-248, a pointer to an internal structure describing the domain is passed, although in essence all that is needed is the domain identity per se.

The log for the relevant domain is accessed (step 1002) and the last log record is found at step 1004 using a done rec variable containing the log record contents. In APPENDIX 1, 74:266, a pointer to a buffer "dlrp" pointer is used to obtain the last log record or logger end, using coding techniques well known to those skilled in the relevant art.

At step 1006, a start rec variable is set to the crash redo field address field found in the last log record that was read, an address that has been dutifully logged with every record. APPENDIX 1, 74:288 is the code for obtaining the start rec into the logger address. At step 1008, the recovery pass variable (r pass) is set to one for the first recovery pass. (APPENDIX 1, 75:303).

At step 1010, the routine sets a local log rec variable to the start record value, and at step 1012 a "this log record" variable is set equal to the log record before the log record was changed in step 1014.

The main loop of the ftx_recovery service commences with step 1014, with the relevant code commencing at APPENDIX 1, 76:348. As indicated by step 1014, the log record is read at the at the address for the log record whose variable was just set into done record. In addition, the log record variable is reset to the next log record in the log line (APPENDIX 1, 76:384-342. If there are multiple calls, the entire record is buffered, but for ease of illustration, the flow charts of FIGS. 12A-12E assume the entire record is contained within a single logical record, done rec.

According to step 1016, for each record read in, there is built in the in-memory structure (see FIG. 6) precisely the same structure constructed during normal log sequence. This mirror structure is made to track and to replay in memory the steps occurring when run time execution occurred. In step 1016, when operation commences, no ftx structures will exist. Thereafter, for each log record read, step 1016 tests whether there has already been allocated an ftx structure containing the transaction identification that is in the log record in the ftx id field in the log record donerec.ftx id. This test can be found in APPENDIX 1, 77:439-445, wherein the code value −2 denotes a presently in use condition, and wherein BS_UID_EQL is a macro comparing the ftx id field in the log record and the ftx id field in the ftx structure at hand.

If step 1016 does not find an existing appropriate structure for the same transaction id, at step 1018, an allocation is made for an ftx structure. Preferably there is set an ftxp pointer to the ftx structure that will be referenced in the following description of FIGS. 12A–12E. Initializations then set the ftx structure's lrh ftx id field equal to that of the done record just read, the domain id field is set, and the root done record count is initialized to zero. However if step 1016 did locate an appropriate structure, no allocation is required and the routine goes to step 1020 where an ftxp pointer to the just located ftx structure is set. See APPENDIX 1, 77:447-477.

Initialization for the specific log record just read occurs with step 1022, wherein the last log record field is set to the "this log record" address. The current level field in the ftx structure is set to the absolute value of the level in the done record. Taking the absolute value is necessary because some records are negative since undo can be logged as a negative value (APPENDIX 1, 78:481, 482).

At step 1024, the routine provides an appropriate ftx handle for the ftx structure, and sets the temporary current level pointer to the internal per level structure in the ftx that is appropriate to current level line. See APPENDIX 1, 78:483-492. As shown by step 1026, the fields in the current level structure atomic r pass are set to the recovery pass field of the done record under consideration, and the member field in the current level structure is set to the member field in current done record. See APPENDIX 1, 78:484-485.

At step 1028 the routine tests whether this recovery pass is the first pass. If yes, and if the root done record count in the done record is not zero, if there is a record to buffer, buffering occurs in step 1030, wherein the root done record from the done record under consideration in the ftx structure is buffered, and the root done record count field in the ftx structure is incremented by one. See APPENDIX 1, 78:502-526, 79:527-529.

Figure 12A:
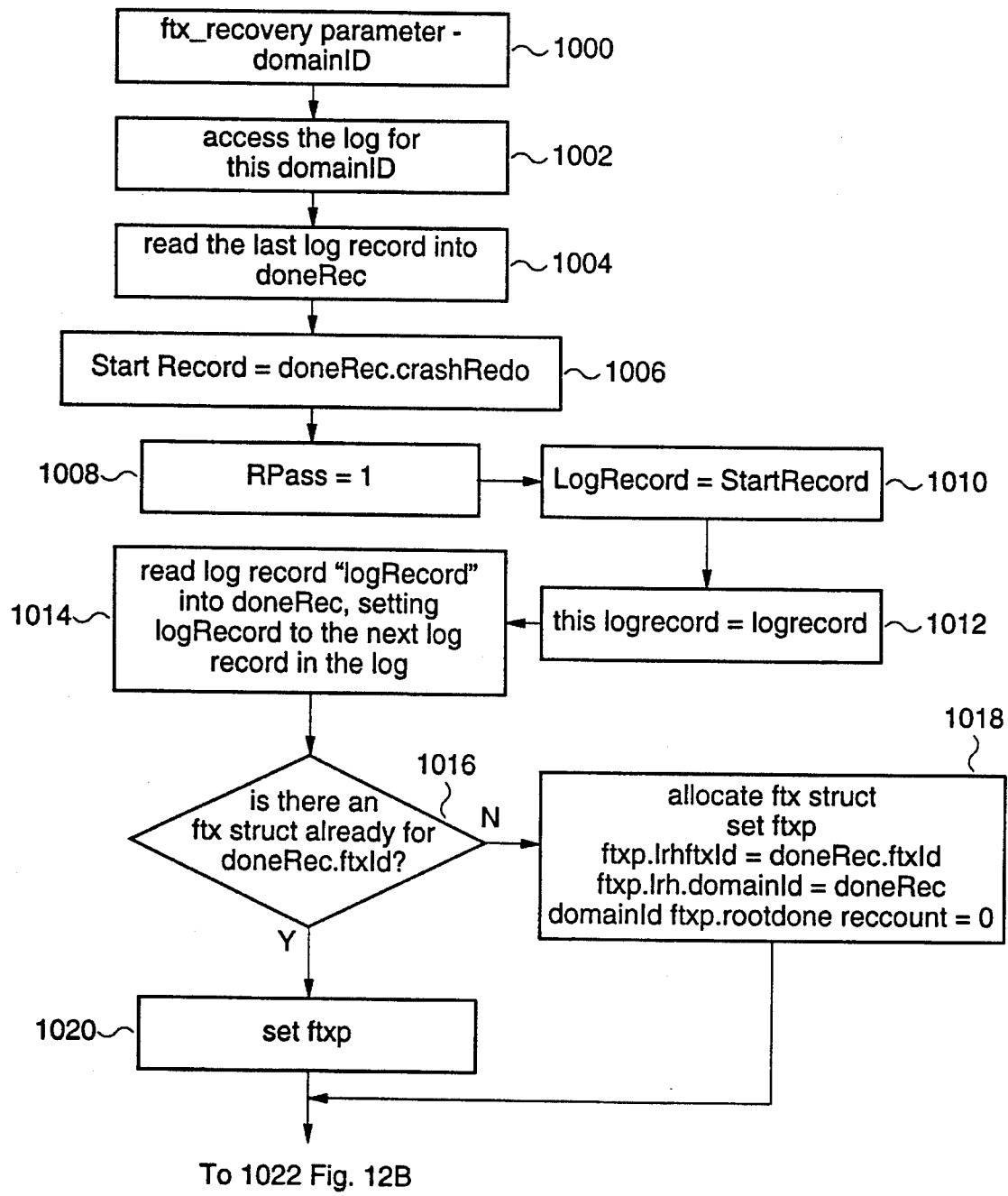
FIGS. 12A–12E depict the ftx_recovery service, according to the present invention.
Figure 12B:
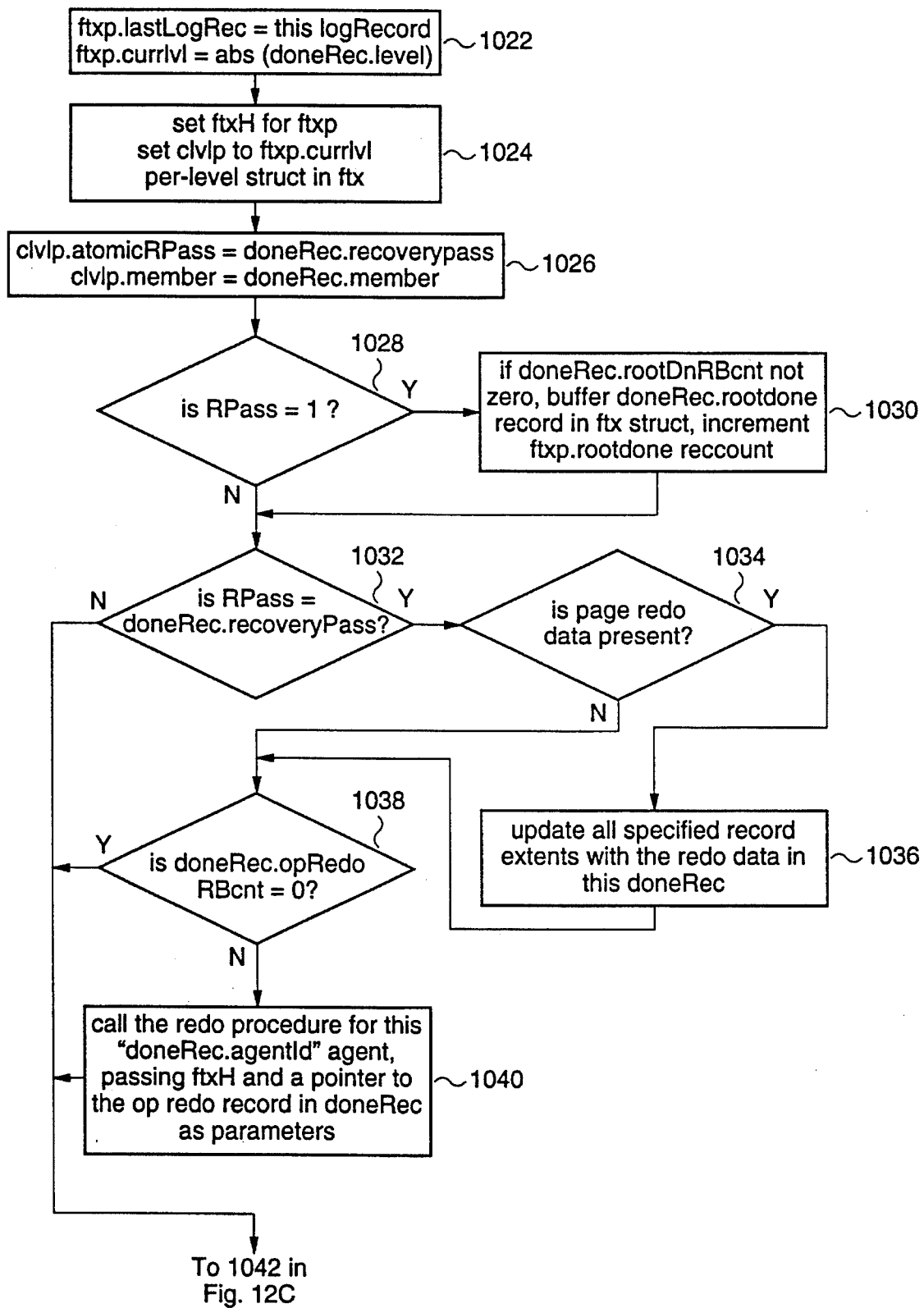
Figure 12C:
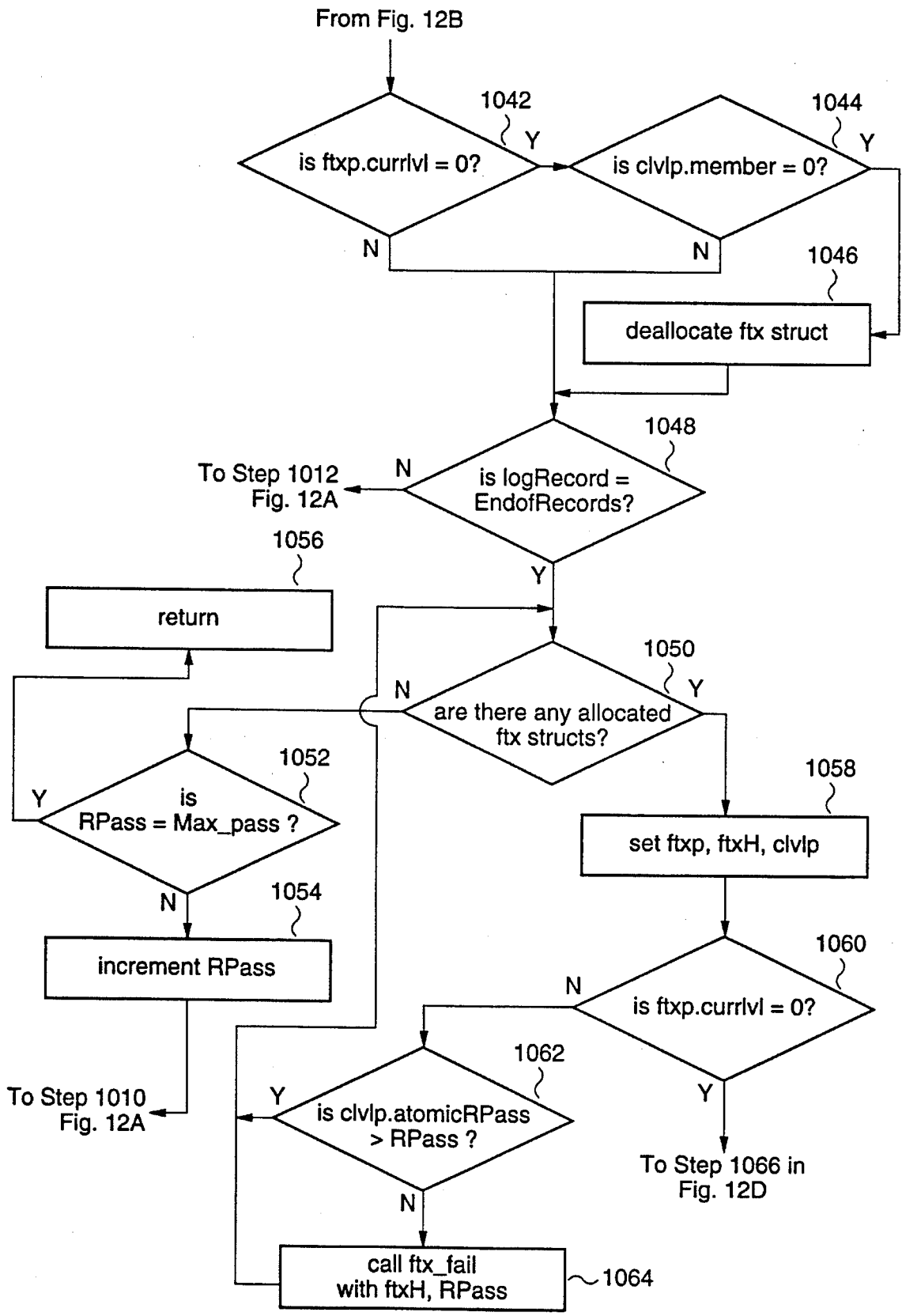
Figure 12D:
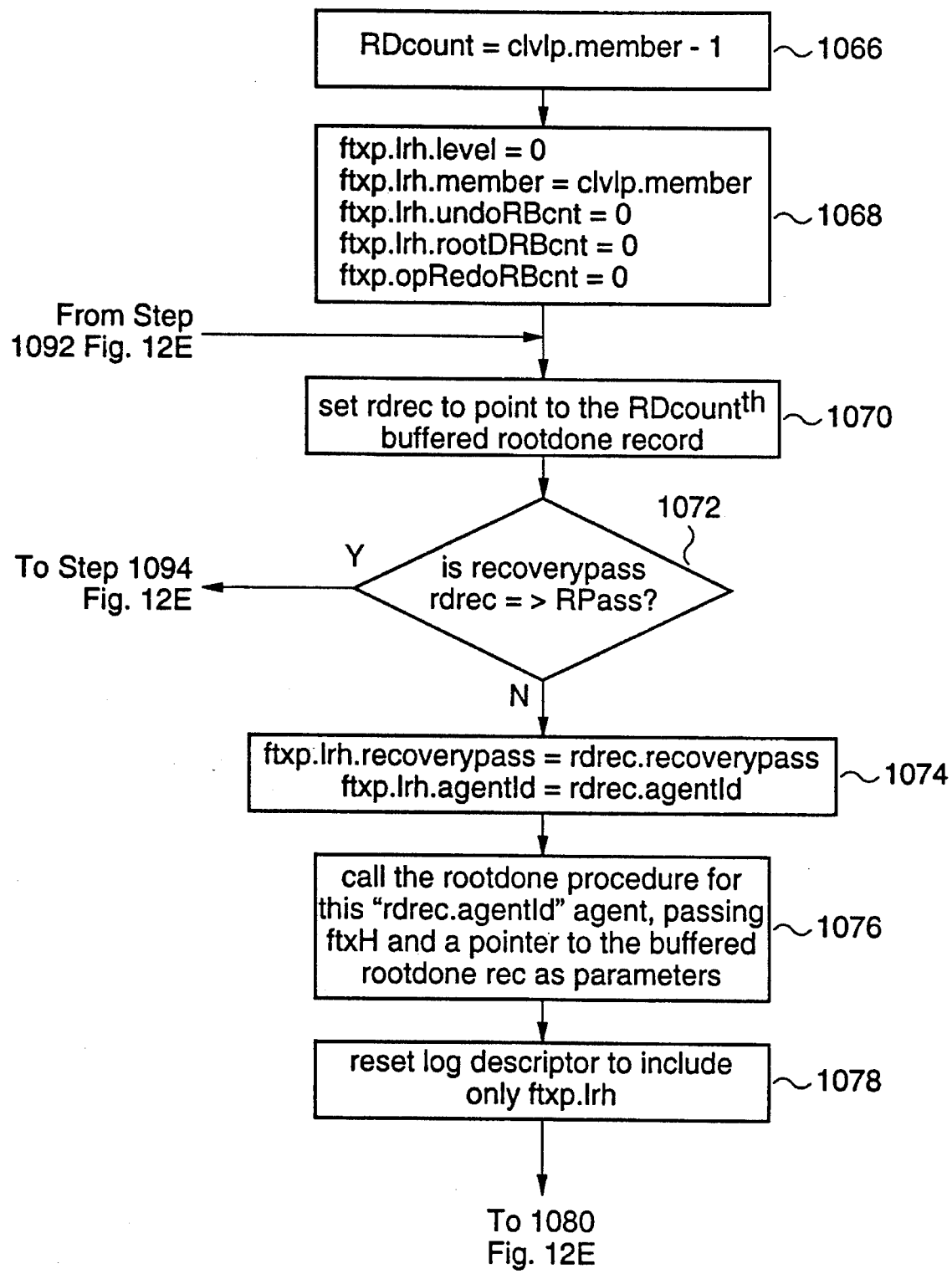

At this juncture, it is understood that the operation is presently on the first recovery pass and thus the current recovery pass is set to one. With respect to step 1032 in FIG. 12B, a test is now made to see whether the current recovery pass value is the same as the recovery pass field in the done record. If there is disagreement, the routine branches to step 1042 (FIG. 12C). However if the values are the same, the routine branches to step 1034 to test whether page redo data exists in this done record.

If page redo data exists, the routine branches to step 1036 for updating of all record extents with the page data as the buffered record extent data in the done record with the relevant redo data. Preferably the data in the record is simply copied into the pages describing where the data belongs. See for example field 428 in FIG. 6. For each bitfile page described by the ftxLog record, the data for each extent is copied into the appropriate page and is written back to persistent storage in essentially a redo recovery action. But data that was modified is overwritten on these pages in persistent storage. Once these data are copied, it is known that all original modifications have been again modified.

In the presently preferred implementation, there are two redo routines for use, depending upon the type of file being called (APPENDIX 1, 79:554). Generally either the ftx_bfmeta_rec_redo (line 554) or the bf_data_rec_redo (line 563) routine will work, but for certain files one may function more rapidly than the other. However, generally upon being called, both redo routines will rewrite the modified record extents to ensure they are correct.

After step 1036, or if branched directly from step 16, step 1038 is reached and a test made to determine whether there are any operational redo records in the done record under consideration (APPENDIX 1, 79:571). If step 1038 determines the relevant field count to be zero, no operation redo records exist and the routine passes to step 1042 (FIG. 12C). But if the field count at step 1038 is not zero, then there are operation redo records and the routine passes to step 1040, which invokes a redo procedure for the particular agent id. As depicted by step 1040, the routine passes the agent id the ftx handle and a pointer to the op redo record data in the relevant done record (see FIG. 5, optional field 338). See APPENDIX 1, 580:576, 580.

With respect to FIG. 12C, step 1042, a test is made to learn whether the current level is zero (APPENDIX 1, 79:587). If zero, the routine branches to step 1044 to test whether the current member is zero. Since the final record in the transaction sequence will be level 0 member 0, (0,0), all actions associated with the transaction tree will have been completely processed to this point. Thus is reading through the log, when a (0,0) record is reached, the routine is done with the entire tree.

A "yes" determination at step 1044 means both tests have been passed, and the ftx structure (having served its purpose) may be deallocated and its space returned to a free list at step 1046 (see APPENDIX 1, 80:591-592. But if both current level and current member do not test as zero, the routine leads to step 1048.

At this juncture, the log record (which is actually the next log record from step 1014, FIG. 12A) is tested to see whether it is the end of record (APPENDIX 1, 595). If at step 1048 the log record is not the end of record, then there must be another record and the routine branches to step 1012 (FIG. 12A) for further processing. But equality is determined at step 1014, then there are no more records to be read in the log, and at step 1050 the routine tests to see whether there are any allocated ftx structures.

It will be recalled from step 1046 that when the log record representing the end of a particular transaction tree was obtained, the routine deallocated that tree's record. Thus, at the end of all log records, for any transaction tree that is incomplete, there will still be an allocated ftx structure. Much of the remainder of the applicable code in APPENDIX 1 deals with such incomplete transaction trees, either rolling such trees forward, or backing them out.

If the routine at step 1050 determines no ftx structures are allocated, then at step 1052 a test is made to determine whether the current recovery pass is the maximum pass number (e.g., n=2 in the presently preferred embodiment). If at step 1052 it is determined the present pass is not the maximum pass number (e.g., assume the present pass is pass n=1), at step 1054 the present pass number is incremented by one (e.g., increased in this example from n=1 to the maximum n=2). Step 1054 then branches back to step 1010 (FIG. 12A) and the routine continues from there.

But if the determination at step 1052 is that the current recovery pass is indeed the final pass, the routine is completes at step 1056 and the sequence is terminated.

With further reference to step 1050, if allocated ftx structures are determined to exist (e.g., step 1050 tests "yes"), these structures must be dealt with. The routine then branches and preferably sets up ftxp, ftxh, and current level pointers at step 1058 to better enable the routine to deal with the remaining ftx structures at the field level. At step 1060 the current level is tested and if not zero, the routine branches to step 1062 (see APPENDIX 1, 80:617).

At step 1062 the routines tests whether the atomic recovery pass field for the current level exceeds the recovery pass variable for the present routine loop. If "yes", the routine branches back to step 1050 and looks for another ftx structure (APPENDIX 1, 80:626).

However if the step 1062 determination is that the current atomic recovery pass does not exceed the recovery pass variable for the present loop, the routine drops to step 1064. At step 1064 the routine invokes the ftx__fail routine described earlier, using the current ftx' handle and recovery pass value information. The routine then branches back to step 1050 to search for another ftx structure with which to deal. One outcome of invoking the ftx__fail routine is that the routine also deallocates the ftx structure at hand.

To review briefly, step 1064 concerned the case where an incomplete transaction tree was found. The recovery pass for the incomplete tree are its nodes, and where the present node was equal to the recovery pass value, the undo procedure was invoked. The ftx__fail procedure was called and the routine backed out of all nodes associated with the particular recovery pass. The relevant code is included within the ftx__fail routine, which is why the recovery pass information was included in ftx__fail in the first place.

In this fashion, partial trees associated with the current recovery pass level are undone. By systematically incrementing the recovery pass variable and making additional passes through the structure, eventually the routine will undo the entire tree. Step 1060 recognizes that the initial recovery passes may only undo part of the entire tree structure, and a finding of current level=0 implies that some level 0 done records have been written. This in turn implies that the present transaction must be completed, which means there may exist root done records requiring re-execution (APPENDIX 1, 80:646).

Of course some root done records may already have been executed. For example, some such records may have been under execution when the system failed, or failure may have occurred in the midst of processing the present recovery loop. The inherent resiliency of the present invention advantageously allows it to achieve recovery even if the system fails while executing the recovery process itself.

The routine at step 1066 sets an RD count variable to the current level member minus one (APPENDIX 1, 81:654). The RD count variable is analogous to the root done variable employed in ftx__done (see FIGS. 10D, 10E). Next, at step 1068 various system parameters are initialized (APPENDIX 1, 81: 666-671) and at step 1070, an rd rec variable is set to point to the RD count buffered root done record. In this manner, the RD count variable is used as an index into the buffered root done record in the ftx structure (APPENDIX 1, 81:676).

Figure 12E:
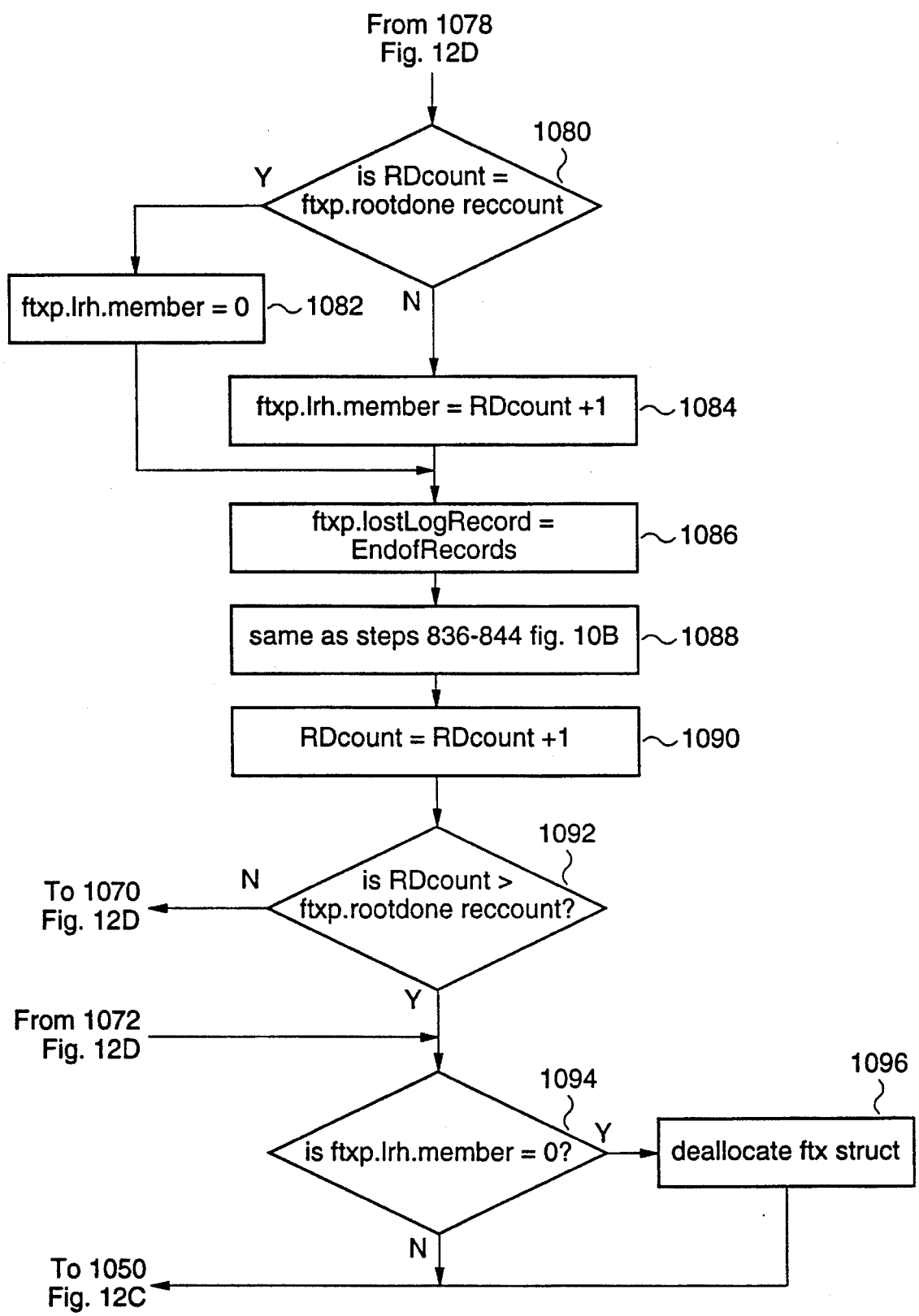

A check is then made at step 1072 to learn whether this particular done record is for a node action at the same recovery pass as the present recovery pass. If the recovery pass variables are the same, the routine branches to step 1094 (FIG. 12E). However, if the recovery pass variables do not agree, the routine drops to step 36 where various fields in are set in the ftx structure's header area, which fields include recovery pass, and the agent id obtained from the buffered root done record.

As shown by step 1076, the routine then invokes the root__done procedure for this record's agent id, and passes that information as the ftxHandle parameter, and as a pointer to the buffered rootdone record. See APPENDIX 1, 81:693- 698. At step 1078 the routine sets the log descriptor needed to write the log record to point to the particular log record header.

In FIG. 12E, as shown by step 1080, a test is made to determine whether the RD counter variable equals the rootdone record count. If yes, then by definition the routine is at the last root done record, and all root done records have been buffered. Thus, in this situation the member number is set to zero at step 1082, designating that no further root done records are present. On the other hand, if step 1080 does not indicate that the last root done record is at hand, at step 1084 the member field count is incremented by one.

Regardless of the outcome of the test at step 1080, the routine will go to step 1086 where the last log record field is initialized to the to the end of record. At step 1088, the routine copies the procedures of steps 836–846 (FIG. 10B), essentially creating a backlink since no backlink exists for the rootdone records in the log.

At step 1090 the routine increments the root done count by one and tests at step 1092 whether now all root done records have been processed. If not, the routine branches back to step 1070 (FIG. 12D) for further processing. However if step 1092 determines all root done records have been executed, then the routine drops to step 1094.

At step 1094 the routine tests whether the member number is zero. A non-zero member number implies that records were skipped because they were at an improper recovery pass level. However if for such skipped records, eventually the member number will be zero, whereupon the procedure is complete. Upon completion, at step 1096 the ftx structure (having served its purpose) is deallocated, and the routine loops back to step 1050 (FIG. 12C) to learn whether there are further incomplete ftx structures to be dealt with.

Modifications and variations may be made to the disclosed embodiments without departing from the subject and spirit of the invention as defined by the following claims.

What is claimed is:

1. A computer system, comprising:

a central processor capable of executing a data processing program;

a volatile memory; and a storage device for persistently storing data and said data processing program;

said storage device storing said data processing program as a plurality of agent programs, each said agent program having an associated transaction or subtransaction to be executed;

said storage device further storing:

an agent-callable first service program for establishing a sequential relationship among each said transaction and subtransaction within a fault tolerant data structure;

an agent-callable second service program for storing on said storage device a log containing information necessary to enable recovery from a transaction or subtransaction encountering a fault;

at least a subset of said agent programs each including program portions that when executed by said central processing unit executes said associated transaction or subtransaction by calling said first and second agent-callable service programs, wherein said execution of said associated transaction or subtransaction can generate a further subtransaction, and wherein said second agent-callable service program stores recovery information in said log when data modification for said transaction or subtransaction is completed;

distinct first agent-specific fault recovery procedures, for each of a plurality of said agent programs, for redoing data modifications produced by execution of said each agent program; and distinct second agent-specific fault recovery procedures, for each of said plurality of said agent programs, for undoing said data modifications produced by execution of said each agent program; and a fault recovery program for execution by said central processing unit when said data processing program is recovering from a fault during execution of said data processing program, said fault recovery program including program portions for sequentially executing said first agent-specific fault recovery procedures for those of said agent programs having recovery information stored in said log when predefined fault recovery criteria are met and for sequentially executing said second agent-specific fault recovery procedures for those of said agent programs having recovery information stored in said log when said predefined fault recovery criteria are not met.

2. The computer system of claim 1, said storage device further storing:

for at least a subset of said plurality of said agent programs, distinct third agent-specific programs for completing data modifications made by said each agent; and an update manager that, when each said transaction is committed, calls said third agent-specific procedure for completing data modifications produced by execution of said each agent program associated with said transaction and any subtransactions of said transaction.

* * * * *